(12) United States Patent
Saxena et al.

(10) Patent No.: US 10,726,346 B2
(45) Date of Patent: *Jul. 28, 2020

(54) SYSTEM FOR PERFORMING COMPLIANCE OPERATIONS USING COGNITIVE BLOCKCHAINS

(71) Applicant: Cognitive Scale, Inc., Austin, TX (US)

(72) Inventors: Manoj Saxena, Austin, TX (US);
Matthew Sanchez, Austin, TX (US);
Richard Knuszka, Hampshire (GB)

(73) Assignee: Cognitive Scale, Inc., Austin, TX (US)

( * ) Notice: Subject to any disclaimer, the term of this patent is extended or adjusted under 35 U.S.C. 154(b) by 619 days.

This patent is subject to a terminal disclaimer.

(21) Appl. No.: 15/347,039

(22) Filed: Nov. 9, 2016

(65) Prior Publication Data
US 2018/0129953 A1 May 10, 2018

(51) Int. Cl.
*G06N 5/04* (2006.01)
*G06Q 50/26* (2012.01)
*G06N 20/00* (2019.01)

(52) U.S. Cl.
CPC ............. *G06N 5/048* (2013.01); *G06N 20/00* (2019.01); *G06Q 50/26* (2013.01)

(58) Field of Classification Search
CPC ............................ G06F 16/9024; G06N 5/048
See application file for complete search history.

(56) References Cited

U.S. PATENT DOCUMENTS 8,170,971 B1  5/2012  Wilson et al.
9,569,771 B2  2/2017  Lesavich et al.

(Continued)

FOREIGN PATENT DOCUMENTS

| CN | 104065471 A | 9/2014 |
|---|---|---|
| WO | WO 2017004574 A1 | 1/2017 |
| WO | WO2018098598 A1 | 6/2018 |

OTHER PUBLICATIONS

Jason Brownlee, "Supervised and Unsupervised Machine Learning Algorithms," Mar. 2016, [retrieved on Apr. 18, 2019], Retrieved from Internet < URL: https://machinelearning.com/supervised-and-unsupervised-machine-earning-algorithms/> (Year: 2016).

(Continued)

*Primary Examiner* — Li Wu Chang
(74) *Attorney, Agent, or Firm* — Terrile, Cannatti & Chambers; Stephen A. Terrile

(57) ABSTRACT

A cognitive information processing system comprising a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: receiving data from a plurality of data sources, the plurality of data sources comprising a blockchain data source, the blockchain data source providing blockchain data; processing the blockchain data to generate a plurality of knowledge elements; processing the blockchain data to generate cognitive blockchain data; storing the plurality of knowledge elements and the cognitive blockchain data within a cognitive graph; and, processing the plurality of knowledge elements to generate a cognitive insight associated with a compliance requirement.

12 Claims, 14 Drawing Sheets

(56) References Cited

U.S. PATENT DOCUMENTS

| | | | |
|---|---|---|---|
| 9,824,031 | B1 | 11/2017 | Ganti et al. |
| 10,026,082 | B2 | 7/2018 | Davis |
| 10,142,312 | B2* | 11/2018 | Johnsrud .............. H04L 63/08 |
| 10,375,079 | B2 | 8/2019 | Infante-Lopez et al. |
| 2003/0120681 | A1 | 6/2003 | Baclawski |
| 2004/0054610 | A1 | 3/2004 | Amstutz et al. |
| 2006/0036564 | A1 | 2/2006 | Yan et al. |
| 2007/0136326 | A1 | 6/2007 | McClement et al. |
| 2010/0179930 | A1 | 7/2010 | Teller et al. |
| 2010/0306095 | A1 | 12/2010 | Olson et al. |
| 2012/0030076 | A1 | 2/2012 | Checco et al. |
| 2012/0290427 | A1 | 11/2012 | Reed et al. |
| 2014/0330867 | A1 | 11/2014 | Sarkar et al. |
| 2015/0081485 | A1 | 3/2015 | Angelovski et al. |
| 2015/0245084 | A1 | 8/2015 | Downing |
| 2015/0278779 | A1 | 10/2015 | Pfeifer |
| 2015/0317337 | A1 | 11/2015 | Edgar |
| 2015/0332283 | A1 | 11/2015 | Witchey |
| 2015/0348169 | A1 | 12/2015 | Harris et al. |
| 2015/0356135 | A1 | 12/2015 | Sanchez et al. |
| 2015/0356423 | A1 | 12/2015 | Sanchez et al. |
| 2015/0356439 | A1 | 12/2015 | Faith et al. |
| 2015/0356440 | A1 | 12/2015 | Faith et al. |
| 2015/0356441 | A1* | 12/2015 | Faith .................. G06F 16/287 706/55 |
| 2016/0117471 | A1 | 4/2016 | Belt |
| 2016/0283494 | A1 | 9/2016 | Krishnaswamy et al. |
| 2016/0300223 | A1 | 10/2016 | Grey et al. |
| 2016/0321654 | A1 | 11/2016 | Lesavich et al. |
| 2016/0342978 | A1 | 11/2016 | Davis et al. |
| 2016/0342989 | A1 | 11/2016 | Davis |
| 2016/0344737 | A1 | 11/2016 | Anton |
| 2017/0011460 | A1* | 1/2017 | Molinari .............. G06Q 40/04 |
| 2017/0031874 | A1 | 2/2017 | Boudville |
| 2017/0034217 | A1 | 2/2017 | Anton |
| 2017/0046732 | A1 | 2/2017 | Elmachtoub et al. |
| 2017/0053295 | A1 | 2/2017 | Tiell |
| 2017/0083571 | A1 | 3/2017 | Shankar et al. |
| 2017/0109735 | A1* | 4/2017 | Sheng ................ G06Q 20/3678 |
| 2017/0132625 | A1 | 5/2017 | Kennedy |
| 2017/0132630 | A1* | 5/2017 | Castinado .......... G06Q 20/4014 |
| 2017/0132636 | A1* | 5/2017 | Caldera .............. G06Q 20/4016 |
| 2017/0140394 | A1 | 5/2017 | Cao et al. |
| 2017/0193619 | A1* | 7/2017 | Rollins ................ G06Q 50/184 |
| 2017/0212781 | A1 | 7/2017 | Dillenberger et al. |
| 2017/0222892 | A1 | 8/2017 | Brown |
| 2017/0243193 | A1 | 8/2017 | Manian |
| 2017/0302663 | A1 | 10/2017 | Nainar et al. |
| 2017/0323294 | A1 | 11/2017 | Rohlfing et al. |
| 2018/0007055 | A1 | 1/2018 | Infante-Lopez et al. |
| 2018/0053161 | A1* | 2/2018 | Bordash ................ G06Q 20/02 |
| 2018/0060927 | A1* | 3/2018 | Gupta ................ G06Q 30/0601 |
| 2018/0089638 | A1* | 3/2018 | Christidis .............. G06Q 20/02 |
| 2018/0109541 | A1 | 4/2018 | Gleichauf |
| 2018/0129700 | A1 | 5/2018 | Naccache et al. |
| 2018/0285879 | A1 | 10/2018 | Gadnis |

OTHER PUBLICATIONS

Cachin et al., "Architecture of the Hyperledger Blockchain Fabric" Jul. 2016 IBM Research. (Year: 2016).

Github, "Hyperledger Fabric" screen shot, date uncertain. (Year: 2016).

Battista et al., "BitConeView: Visualization of Flows in the Bitcoin Transaction Graph" Oct. 25, 2015 IEEE Symposium on Visualization for Cyber Security (VizSec). (Year: 2015).

Fleder et al., "Bitcoin Transaction Graph Analysis" Feb. 5, 2015, pp. 1-8. (Year: 2015).

Hardjono et al, "Cloud-Based Commissioning of Constrained Devices using Permissioned Blockchains" May 30, 2016 ACM, pp. 29-36. (Year: 2016).

Dubey et al., "Weaver: A High-Performance, Transactional Graph Database Based on Refinable Timestamps" Jul. 1, 2016, Proceedings of the VLDB Endowment, vol. 9, No. 11, pp. 852-863. (Year: 2016).

Zhao, Chen, "Graph-Based forensic investigation of Bitcoin transactions" 2014 Iowa State University, pp. i-70. (Year: 2014).

Kosba et al., "Hawk: The Blockchain Model of Cryptography and Privacy-Preserving Smart Contracts" May 22-26, 2016, IEEE Symposium on Security and Privacy (SP), pp. 839-858. (Year: 2016).

McConaghy et al, "BigchainDB: A Scalable Blockchain Database" Jun. 8, 2016, pp. 1-65. (Year: 2016).

Rubin, Jeremy, "BTCSpark: Scalable Analysis of the Bitcoin Blockchain using Spark" Dec. 16, 2015, pp. 1-14. (Year: 2015).

Olivier Corby et al., (KGRAM Versatile Inference and Query Engine for the Web of Linked Data, IEEE/WIC/ACM International Conference on Web Intelligence, Dec. 2012, Macao, China. pp. 1-8. hal-00746772). (Year: 2012).

Michael Mainelli et al., (Swift Institute Working Paper No. 2015-007, The Impact and Potential of Blockchain on the Securities Transaction Lifecycle, May 9, 2016). (Year: 2016).

Xueping Peng, (Enhanced Web Log Based Recommendation by Personalized Retrieval, Faculty of Engineering and Information Technology; A thesis submitted for the degree of Doctor of Philosophy, Feb. 2015). (Year: 2015).

Gareth W. Peters et al., (Understanding Modern Banking Ledgers through Blockchain Technologies: Future of Transaction Processing and Smart Contracts on the Internet of Money, Nov. 19, 2015). (Year: 2015).

* cited by examiner

SYSTEM FOR PERFORMING COMPLIANCE OPERATIONS USING COGNITIVE BLOCKCHAINS

BACKGROUND OF THE INVENTION

Field of the Invention

The present invention relates in general to the field of computers and similar technologies, and in particular to software utilized in this field. Still more particularly, it relates to a method, system and computer-usable medium for performing cognitive inference and learning operations.

Description of the Related Art

In general, "big data" refers to a collection of datasets so large and complex that they become difficult to process using typical database management tools and traditional data processing approaches. These datasets can originate from a wide variety of sources, including computer systems, mobile devices, credit card transactions, television broadcasts, and medical equipment, as well as infrastructures associated with cities, sensor-equipped buildings and factories, and transportation systems. Challenges commonly associated with big data, which may be a combination of structured, unstructured, and semi-structured data, include its capture, curation, storage, search, sharing, analysis and visualization. In combination, these challenges make it difficult to efficiently process large quantities of data within tolerable time intervals.

Nonetheless, big data analytics hold the promise of extracting insights by uncovering difficult-to-discover patterns and connections, as well as providing assistance in making complex decisions by analyzing different and potentially conflicting options. As such, individuals and organizations alike can be provided new opportunities to innovate, compete, and capture value.

One aspect of big data is "dark data," which generally refers to data that is either not collected, neglected, or underutilized. Examples of data that is not currently being collected includes location data prior to the emergence of companies such as Foursquare or social data prior to the advent companies such as Facebook. An example of data that is being collected, but is difficult to access at the right time and place, includes data associated with the side effects of certain spider bites while on a camping trip. As another example, data that is collected and available, but has not yet been productized of fully utilized, may include disease insights from population-wide healthcare records and social media feeds. As a result, a case can be made that dark data may in fact be of higher value than big data in general, especially as it can likely provide actionable insights when it is combined with readily-available data.

SUMMARY OF THE INVENTION

In one embodiment, the invention relates to a cognitive information processing system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: receiving data from a plurality of data sources, the plurality of data sources comprising a blockchain data source, the blockchain data source providing blockchain data; processing the blockchain data to generate a plurality of knowledge elements; processing the blockchain data to generate cognitive blockchain data; storing the plurality of knowledge elements and the cognitive blockchain data within a cognitive graph; and, processing the plurality of knowledge elements to generate a cognitive insight associated with a compliance requirement.

In another embodiment, the invention relates to a non-transitory, computer-readable storage medium embodying computer program code, the computer program code comprising computer executable instructions configured for: receiving data from a plurality of data sources, the plurality of data sources comprising a blockchain data source, the blockchain data source providing blockchain data; processing the blockchain data to generate a plurality of knowledge elements; processing the blockchain data to generate cognitive blockchain data; storing the plurality of knowledge elements and the cognitive blockchain data within a cognitive graph; and, processing the plurality of knowledge elements to generate a cognitive insight associated with a compliance requirement.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
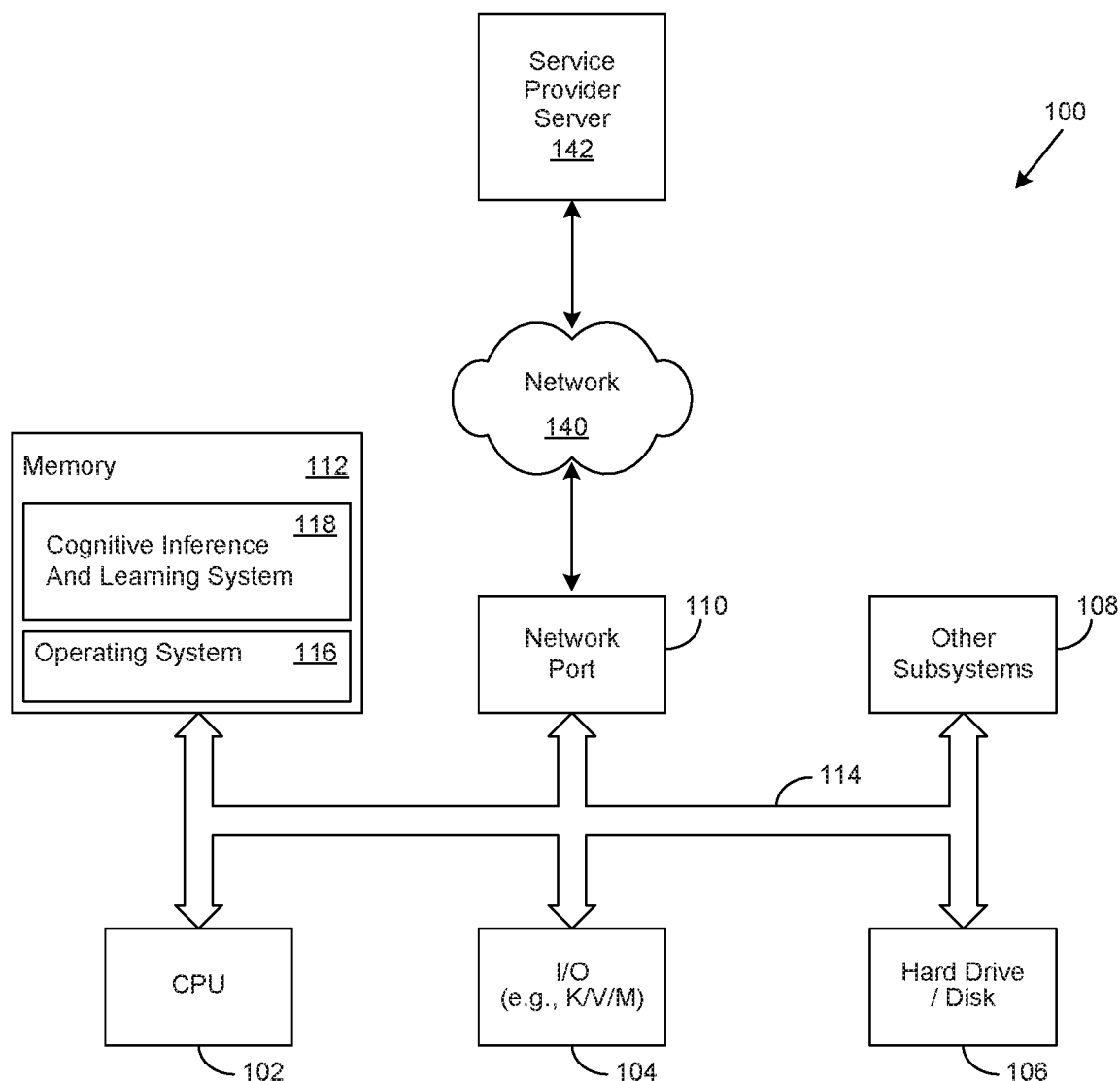
FIG. 1 depicts an exemplary client computer in which the present invention may be implemented.

A method, system and computer-usable medium are disclosed for cognitive inference and learning operations. The present invention may be a system, a method, and/or a computer program product. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 is a generalized illustration of an information processing system 100 that can be used to implement the system and method of the present invention. The information processing system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information processing system 100 also includes network port 110 operable to connect to a network 140, which is likewise accessible by a service provider server 142. The information processing system 100 likewise includes system memory 112, which is interconnected to the foregoing via one or more buses 114. System memory 112 further comprises operating system (OS) 116 and in various embodiments may also comprise cognitive inference and learning system (CILS) 118. In one embodiment, the information processing system 100 is able to download the CILS 118 from the service provider server 142. In another embodiment, the CILS 118 is provided as a service from the service provider server 142.

In various embodiments, the CILS 118 is implemented to perform various cognitive computing operations described in greater detail herein. As used herein, cognitive computing broadly refers to a class of computing involving self-learning systems that use techniques such as spatial navigation, machine vision, and pattern recognition to increasingly mimic the way the human brain works. To be more specific, earlier approaches to computing typically solved problems by executing a set of instructions codified within software. In contrast, cognitive computing approaches are data-driven, sense-making, insight-extracting, problem-solving systems that have more in common with the structure of the human brain than with the architecture of contemporary, instruction-driven computers.

To further differentiate these distinctions, traditional computers must first be programmed by humans to perform specific tasks, while cognitive systems learn from their interactions with data and humans alike, and in a sense, program themselves to perform new tasks. To summarize the difference between the two, traditional computers are designed to calculate rapidly. Cognitive systems are designed to quickly draw inferences from data and gain new knowledge.

Cognitive systems achieve these abilities by combining various aspects of artificial intelligence, natural language processing, dynamic learning, and hypothesis generation to render vast quantities of intelligible data to assist humans in making better decisions. As such, cognitive systems can be characterized as having the ability to interact naturally with people to extend what either humans, or machines, could do on their own. Furthermore, they are typically able to process natural language, multi-structured data, and experience much in the same way as humans. Moreover, they are also typically able to learn a knowledge domain based upon the best available data and get better, and more immersive, over time.

It will be appreciated that more data is currently being produced every day than was recently produced by human beings from the beginning of recorded time. Deep within this ever-growing mass of data is a class of data known as "dark data," which includes neglected information, ambient signals, and insights that can assist organizations and individuals in augmenting their intelligence and deliver actionable insights through the implementation of cognitive applications. As used herein, cognitive applications, or "cognitive apps," broadly refer to cloud-based, big data interpretive applications that learn from user engagement and data interactions. Such cognitive applications extract patterns and insights from dark data sources that are currently almost completely opaque. Examples of such dark data include disease insights from population-wide healthcare records and social media feeds, or from new sources of information, such as sensors monitoring pollution in delicate marine environments.

Over time, it is anticipated that cognitive applications will fundamentally change the ways in which many organizations operate as they invert current issues associated with data volume and variety to enable a smart, interactive data supply chain. Ultimately, cognitive applications hold the promise of receiving a user query and immediately providing a data-driven answer from a masked data supply chain in response. As they evolve, it is likewise anticipated that cognitive applications may enable a new class of "sixth sense" applications that intelligently detect and learn from relevant data and events to offer insights, predictions and advice rather than wait for commands. Just as web and mobile applications changed the way people access data, cognitive applications may change the way people listen to, and become empowered by, multi-structured data such as emails, social media feeds, doctors notes, transaction records, and call logs.

However, the evolution of such cognitive applications has associated challenges, such as how to detect events, ideas, images, and other content that may be of interest. For example, assuming that the role and preferences of a given user are known, how is the most relevant information discovered, prioritized, and summarized from large streams of multi-structured data such as news feeds, blogs, social media, structured data, and various knowledge bases? To further the example, what can a healthcare executive be told about their competitor's market share? Other challenges include the creation of a contextually-appropriate visual summary of responses to questions or queries.

Figure 2:
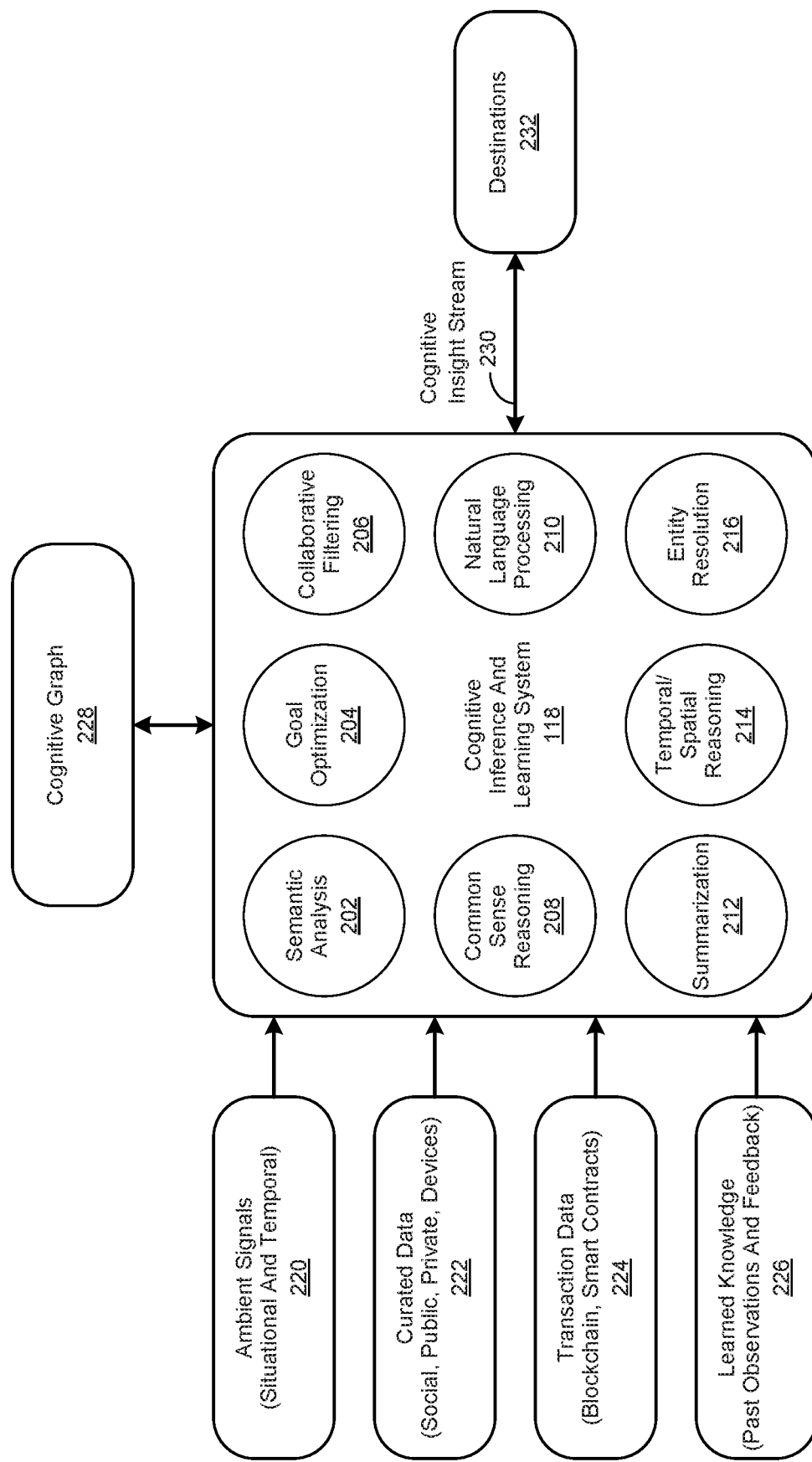
FIG. 2 is a simplified block diagram of a cognitive inference and learning system (CILS)

FIG. 2 is a simplified block diagram of a cognitive inference and learning system (CILS) implemented in accordance with an embodiment of the invention. In various embodiments, the CILS 118 is implemented to incorporate a variety of processes, including semantic analysis 202, goal optimization 204, collaborative filtering 206, common sense reasoning 208, natural language processing 210, summarization 212, temporal/spatial reasoning 214, and entity resolution 216 to generate cognitive insights.

As used herein, semantic analysis 202 broadly refers to performing various analysis operations to achieve a semantic level of understanding about language by relating syntactic structures. In various embodiments, various syntactic structures are related from the levels of phrases, clauses, sentences and paragraphs, to the level of the body of content as a whole, and to its language-independent meaning. In certain embodiments, the semantic analysis 202 process includes processing a target sentence to parse it into its individual parts of speech, tag sentence elements that are related to predetermined items of interest, identify dependencies between individual words, and perform co-reference resolution. For example, if a sentence states that the author really likes the hamburgers served by a particular restaurant, then the name of the "particular restaurant" is co-referenced to "hamburgers."

As likewise used herein, goal optimization 204 broadly refers to performing multi-criteria decision making operations to achieve a given goal or target objective. In various embodiments, one or more goal optimization 204 processes are implemented by the CILS 118 to define predetermined goals, which in turn contribute to the generation of a cognitive insight. For example, goals for planning a vacation trip may include low cost (e.g., transportation and accommodations), location (e.g., by the beach), and speed (e.g., short travel time). In this example, it will be appreciated that certain goals may be in conflict with another. As a result, a cognitive insight provided by the CILS 118 to a traveler may indicate that hotel accommodations by a beach may cost more than they care to spend.

Collaborative filtering 206, as used herein, broadly refers to the process of filtering for information or patterns through the collaborative involvement of multiple agents, viewpoints, data sources, and so forth. The application of such collaborative filtering 206 processes typically involves very large and different kinds of data sets, including sensing and monitoring data, financial data, and user data of various kinds. Collaborative filtering 206 may also refer to the process of making automatic predictions associated with predetermined interests of a user by collecting preferences or other information from many users. For example, if person 'A' has the same opinion as a person 'B' for a given issue 'x', then an assertion can be made that person 'A' is more likely to have the same opinion as person 'B' opinion on a different issue 'y' than to have the same opinion on issue 'y' as a randomly chosen person. In various embodiments, the collaborative filtering 206 process is implemented with various recommendation engines familiar to those of skill in the art to make recommendations.

As used herein, common sense reasoning 208 broadly refers to simulating the human ability to make deductions from common facts they inherently know. Such deductions may be made from inherent knowledge about the physical properties, purpose, intentions and possible behavior of ordinary things, such as people, animals, objects, devices, and so on. In various embodiments, common sense reasoning 208 processes are implemented to assist the CILS 118 in understanding and disambiguating words within a predetermined context. In certain embodiments, the common sense reasoning 208 processes are implemented to allow the CILS 118 to generate text or phrases related to a target word or phrase to perform deeper searches for the same terms. It will be appreciated that if the context of a word is better understood, then a common sense understanding of the word can then be used to assist in finding better or more accurate information. In certain embodiments, this better or more accurate understanding of the context of a word, and its related information, allows the CILS 118 to make more accurate deductions, which are in turn used to generate cognitive insights.

As likewise used herein, natural language processing (NLP) 210 broadly refers to interactions with a system, such as the CILS 118, through the use of human, or natural, languages. In various embodiments, various NLP 210 processes are implemented by the CILS 118 to achieve natural language understanding, which enables it to not only derive meaning from human or natural language input, but to also generate natural language output.

Summarization 212, as used herein, broadly refers to processing a set of information, organizing and ranking it, and then generating a corresponding summary. As an example, a news article may be processed to identify its primary topic and associated observations, which are then extracted, ranked, and then presented to the user. As another example, page ranking operations may be performed on the same news article to identify individual sentences, rank them, order them, and determine which of the sentences are most impactful in describing the article and its content. As yet another example, a structured data record, such as a patient's electronic medical record (EMR), may be processed using the summarization 212 process to generate sentences and phrases that describes the content of the EMR. In various embodiments, various summarization 212 processes are implemented by the CILS 118 to generate summarizations of content streams, which are in turn used to generate cognitive insights.

As used herein, temporal/spatial reasoning 214 broadly refers to reasoning based upon qualitative abstractions of temporal and spatial aspects of common sense knowledge, described in greater detail herein. For example, it is not uncommon for a predetermined set of data to change over time. Likewise, other attributes, such as its associated metadata, may likewise change over time. As a result, these changes may affect the context of the data. To further the example, the context of asking someone what they believe they should be doing at 3:00 in the afternoon during the workday while they are at work may be quite different than asking the same user the same question at 3:00 on a Sunday afternoon when they are at home. In various embodiments, various temporal/spatial reasoning 214 processes are implemented by the CILS 118 to determine the context of queries, and associated data, which are in turn used to generate cognitive insights.

As likewise used herein, entity resolution 216 broadly refers to the process of finding elements in a set of data that refer to the same entity across different data sources (e.g., structured, non-structured, streams, devices, etc.), where the target entity does not share a common identifier. In various embodiments, the entity resolution 216 process is implemented by the CILS 118 to identify significant nouns, adjectives, phrases or sentence elements that represent various predetermined entities within one or more domains. From the foregoing, it will be appreciated that the implementation of one or more of the semantic analysis 202, goal optimization 204, collaborative filtering 206, common sense reasoning 208, natural language processing 210, summarization 212, temporal/spatial reasoning 214, and entity resolution 216 processes by the CILS 118 can facilitate the generation of a semantic, cognitive model.

In various embodiments, the CILS 118 receives ambient signals 220, curated data 222, transaction data 224, and learned knowledge 226, which is then processed by the CILS 118 to generate one or more cognitive graphs 228. In turn, the one or more cognitive graphs 228 are further used by the CILS 118 to generate cognitive insight streams 230, which are then delivered to one or more destinations 232, as described in greater detail herein. As used herein, ambient signals 220 broadly refer to input signals, or other data streams, that may contain data providing additional insight or context to the curated data 222, transaction data 224, and learned knowledge 226 received by the CILS 118. For example, ambient signals may allow the CILS 118 to understand that a user is currently using their mobile device, at location 'x', at time 'y', doing activity 'z'. To continue the example, there is a difference between the user using their mobile device while they are on an airplane versus using their mobile device after landing at an airport and walking between one terminal and another.

To extend the example, ambient signals may add additional context, such as the user is in the middle of a three leg trip and has two hours before their next flight. Further, they may be in terminal A1, but their next flight is out of C1, it is lunchtime, and they want to know the best place to eat. Given the available time the user has, their current location, restaurants that are proximate to their predicted route, and other factors such as food preferences, the CILS 118 can perform various cognitive operations and provide a cognitive insight that includes a recommendation for where the user can eat.

To extend the example even further, the user may receive a notification while they are eating lunch at a recommended restaurant that their next flight has been canceled due to the previously-scheduled aircraft being grounded. As a result, the user may receive two cognitive insights suggesting alternative flights on other carriers. The first cognitive insight is related to a flight that leaves within a half hour. The second cognitive insight is blockchain-associated and related to a second flight that leaves in an hour but requires immediate booking and payment of additional fees. Knowing that they would be unable to make the first flight in time, the user elects to use the blockchain-associated cognitive insight, as described in greater detail herein, to not only automatically book the flight, but to also pay the additional fees through the use of a digital currency transaction.

In various embodiments, the curated data 222 may include structured, unstructured, social, public, private, streaming, device or other types of data described in greater detail herein. In certain embodiments, the transaction data 224 may include blockchain-associated data, described in greater detail herein, smart contract data, likewise described in greater detail herein, or any combination thereof. In various embodiments, the transaction data 224 may likewise include credit or debit card transaction data, financial services data of all kinds (e.g., mortgages, insurance policies, stock transfers, etc.), purchase order data, invoice data, shipping data, receipt data, or any combination thereof. Skilled practitioners of the art will realize that many such examples of transaction data 224 are possible. Accordingly, the foregoing is not intended to limit the spirit, scope or intent of the invention. In certain embodiments, the learned knowledge 226 is based upon past observations and feedback from the presentation of prior cognitive insight streams and recommendations. In various embodiments, the learned knowledge 226 is provided via a feedback look that provides the learned knowledge 226 in the form of a learning stream of data.

As likewise used herein, a cognitive graph 228 refers to a representation of expert knowledge, associated with individuals and groups over a period of time, to depict relationships between people, places, and things using words, ideas, audio and images. As such, it is a machine-readable formalism for knowledge representation that provides a common framework allowing data and knowledge to be shared and reused across user, application, organization, and community boundaries.

In various embodiments, the information contained in, and referenced by, a cognitive graph 228 is derived from many sources (e.g., public, private, social, device), such as curated data 222 and transaction data 224. In certain of these embodiments, the cognitive graph 228 assists in the identification and organization of information associated with how people, places and things are related to one other. In various embodiments, the cognitive graph 228 enables automated agents, described in greater detail herein, to access the Web more intelligently, enumerate inferences through utilization of curated, structured data 222, and provide answers to questions by serving as a computational knowledge engine.

In certain embodiments, the cognitive graph 228 not only elicits and maps expert knowledge by deriving associations from data, it also renders higher level insights and accounts for knowledge creation through collaborative knowledge modeling. In various embodiments, the cognitive graph 228 is a machine-readable, declarative memory system that stores and learns both episodic memory (e.g., specific personal experiences associated with an individual or entity), and semantic memory, which stores factual information (e.g., geo location of an airport or restaurant).

For example, the cognitive graph 228 may know that a given airport is a place, and that there is a list of related places such as hotels, restaurants and departure gates. Furthermore, the cognitive graph 228 may know that people such as business travelers, families and college students use the airport to board flights from various carriers, eat at various restaurants, or shop at certain retail stores. The cognitive graph 228 may also have knowledge about the key attributes from various retail rating sites that travelers have used to describe the food and their experience at various venues in the airport over the past six months.

In certain embodiments, the cognitive insight stream 230 is bidirectional, and supports flows of information both to and from destinations 232. In these embodiments, the first flow is generated in response to receiving a query, and subsequently delivered to one or more destinations 232. The second flow is generated in response to detecting information about a user of one or more of the destinations 232. Such use results in the provision of information to the CILS 118. In response, the CILS 118 processes that information, in the context of what it knows about the user, and provides additional information to the user, such as a recommendation. In various embodiments, the cognitive insight stream 230 is configured to be provided in a "push" stream configuration familiar to those of skill in the art. In certain embodiments, the cognitive insight stream 230 is implemented to use natural language approaches familiar to skilled practitioners of the art to support interactions with a user.

In various embodiments, the cognitive insight stream 230 may include a stream of visualized insights. As used herein, visualized insights broadly refers to cognitive insights that are presented in a visual manner, such as a map, an infographic, images, and so forth. In certain embodiments, these visualized insights may include various cognitive insights, such as "What happened?", "What do I know about it?", "What is likely to happen next?", or "What should I do about it?" In these embodiments, the cognitive insight stream is generated by various cognitive agents, which are applied to various sources, datasets, and cognitive graphs. As used herein, a cognitive agent broadly refers to a computer program that performs a task with minimum specific directions from users and learns from each interaction with data and human users.

In various embodiments, the CILS 118 delivers Cognition as a Service (CaaS). As such, it provides a cloud-based development and execution platform that allow various cognitive applications and services to function more intelligently and intuitively. In certain embodiments, cognitive applications powered by the CILS 118 are able to think and interact with users as intelligent virtual assistants. As a result, users are able to interact with such cognitive applications by asking them questions and giving them commands. In response, these cognitive applications will be able to assist the user in completing tasks and managing their work more efficiently.

In these and other embodiments, the CILS 118 can operate as an analytics platform to process big data, and dark data as well, to provide data analytics through a public, private or hybrid cloud environment. As used herein, cloud analytics broadly refers to a service model wherein data sources, data models, processing applications, computing power, analytic models, and sharing or storage of results are implemented within a cloud environment to perform one or more aspects of analytics.

In various embodiments, users submit queries and computation requests in a natural language format to the CILS 118. In response, they are provided with a ranked list of relevant answers and aggregated information with useful links and pertinent visualizations through a graphical representation. In these embodiments, the cognitive graph 228 generates semantic and temporal maps to reflect the organization of unstructured data and to facilitate meaningful learning from potentially millions of lines of text, much in the same way as arbitrary syllables strung together create meaning through the concept of language.

Figure 3:
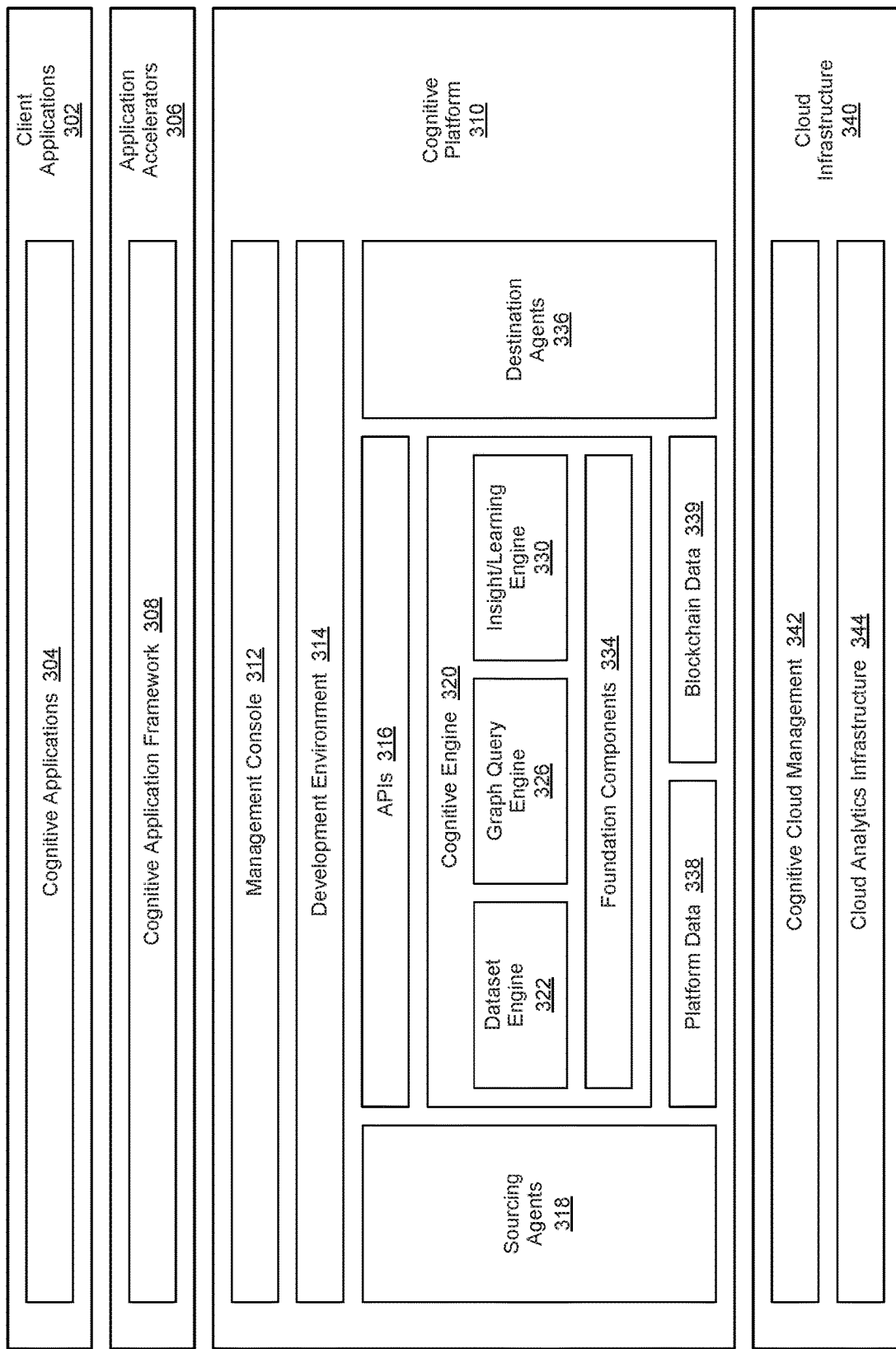
FIG. 3 is a simplified block diagram of a CILS reference model implemented in accordance with an embodiment of the invention.

FIG. 3 is a simplified block diagram of a cognitive inference and learning system (CILS) reference model implemented in accordance with an embodiment of the invention. In this embodiment, the CILS reference model is associated with the CILS 118 shown in FIG. 2. As shown in FIG. 3, the CILS reference model includes client applications 302, application accelerators 306, a cognitive platform 310, and cloud infrastructure 340. In various embodiments, the client applications 302 include cognitive applications 304, which are implemented to understand and adapt to the user, not the other way around, by natively accepting and understanding human forms of communication, such as natural language text, audio, images, video, and so forth.

In these and other embodiments, the cognitive applications 304 possess situational and temporal awareness based upon ambient signals from users and data, which facilitates understanding the user's intent, content, context and meaning to drive goal-driven dialogs and outcomes. Further, they are designed to gain knowledge over time from a wide variety of structured, non-structured, transactional and device data sources, continuously interpreting and autonomously reprogramming themselves to better understand a given domain. As such, they are well-suited to support human decision making, by proactively providing trusted advice, offers and recommendations while respecting user privacy and permissions.

In various embodiments, the application accelerators 306 include a cognitive application framework 308. In certain embodiments, the application accelerators 306 and the cognitive application framework 308 support various plug-ins and components that facilitate the creation of client applications 302 and cognitive applications 304. In various embodiments, the application accelerators 306 include widgets, user interface (UI) components, reports, charts, and back-end integration components familiar to those of skill in the art.

As likewise shown in FIG. 3, the cognitive platform 310 includes a management console 312, a development environment 314, application program interfaces (APIs) 316, sourcing agents 318, a cognitive engine 320, destination agents 336, platform data 338, and blockchain data 339, all of which are described in greater detail herein. In various embodiments, the management console 312 is implemented to manage accounts and projects, along with user-specific metadata that is used to drive processes and operations within the cognitive platform 310 for a predetermined project.

In certain embodiments, the development environment 314 is implemented to create custom extensions to the CILS 118 shown in FIG. 2. In various embodiments, the development environment 314 is implemented for the development of a custom application, which may subsequently be deployed in a public, private or hybrid cloud environment. As an example, the custom application may be configured to receive and process a blockchain transaction. In certain embodiments, the receipt and processing of a blockchain transaction results in the generation of blockchain data 339. In various embodiments, the blockchain data is used to provide visibility into various transactions used for the generation of a block-chain associated cognitive insight. As an example, individual blockchain transactions used to generate a particular blockchain-associated cognitive insight may be provided to a user, in detail or summary form, as evidence of the basis for the generation of the blockchain-associated cognitive insight.

In various embodiments, the custom application may be configured to generate a smart contract, described in greater detail herein. In certain embodiments, the generation of a smart contract may be associated with the generation of a blockchain-associated cognitive insight, likewise described in greater detail herein. In various embodiments, the development environment 314 is implemented for the development of a custom sourcing agent, a custom bridging agent, a custom destination agent, or various analytics applications or extensions.

In certain embodiments, the APIs 316 are implemented to build and manage certain cognitive applications 304, described in greater detail herein, which are then executed on the cognitive platform 310 to generate cognitive insights. Likewise, the sourcing agents 318 are implemented in various embodiments to source a variety of multi-site, multi-structured source streams of data described in greater detail herein. In various embodiments, the cognitive engine 320 includes a dataset engine 322, a graph query engine 326, an insight/learning engine 330, and foundation components 334. In certain embodiments, the dataset engine 322 is implemented to establish and maintain a dynamic data ingestion and enrichment pipeline. In various embodiments, the dataset engine 322 is configured to source data from one or more blockchains. In certain embodiments, the blockchains may be a public blockchain, a private blockchain, or a combination thereof, as described in greater detail herein. In these and other embodiments, the dataset engine 322 may be implemented to orchestrate one or more sourcing agents 318 to source data. Once the data is sourced, the data set engine 322 performs data enriching and other data processing operations, described in greater detail herein, and generates one or more sub-graphs that are subsequently incorporated into a target cognitive graph.

In various embodiments, the graph query engine 326 is implemented to receive and process queries such that they can be bridged into a cognitive graph, as described in greater detail herein, through the use of a bridging agent. In certain embodiments, the graph query engine 326 performs various natural language processing (NLP), familiar to skilled practitioners of the art, to process the queries. In various embodiments, the insight/learning engine 330 is implemented to encapsulate a predetermined algorithm, which is then applied to a cognitive graph to generate a result, such as a recommendation, a cognitive insight, or a blockchain-associated cognitive insight, described in greater detail herein. In certain embodiments, one or more such algorithms may contribute to answering a specific question and provide additional recommendations, cognitive insights, blockchain-associated cognitive insights, or a combination thereof. In various embodiments, two or more of the dataset engine 322, the graph query engine 326, and the insight/learning engine 330 may be implemented to operate collaboratively to generate a recommendation, cognitive insight, blockchain-associated cognitive insight, or a combination thereof. In certain embodiments, one or more of the dataset engine 322, the graph query engine 326, and the insight/learning engine 330 may operate autonomously to generate a recommendation, cognitive insight, blockchain-associated cognitive insight, or a combination thereof.

The foundation components 334 shown in FIG. 3 include various reusable components, familiar to those of skill in the art, which are used in various embodiments to enable the dataset engine 322, the graph query engine 326, and the insight/learning engine 330 to perform their respective operations and processes. Examples of such foundation components 334 include natural language processing (NLP) components and core algorithms, such as cognitive algorithms.

In various embodiments, the platform data 338 includes various data repositories, described in greater detail herein, that are accessed by the cognitive platform 310 to generate cognitive insights. In certain embodiments, the blockchain data 339 includes blockchain data associated with one or more public blockchains, one or more private blockchains, or a combination thereof, as described in greater detail herein. In various embodiments, the blockchain data 339 is used to generate a blockchain-associated cognitive insight. In certain embodiments, the platform data 338 and the blockchain data 339 are used in combination to generate a blockchain-associated cognitive insight.

In various embodiments, the destination agents 336 are implemented to publish cognitive insights to a consumer of cognitive insight data. Examples of such consumers of cognitive insight data include target databases, public or private blockchains, business intelligence applications, and mobile applications. It will be appreciated that many such examples of cognitive insight data consumers are possible. Accordingly, the foregoing is not intended to limit the spirit, scope or intent of the invention. In certain embodiments, as described in greater detail herein, the cloud infrastructure 340 includes cognitive cloud management 342 components and cloud analytics infrastructure components 344.

Figure 4A:
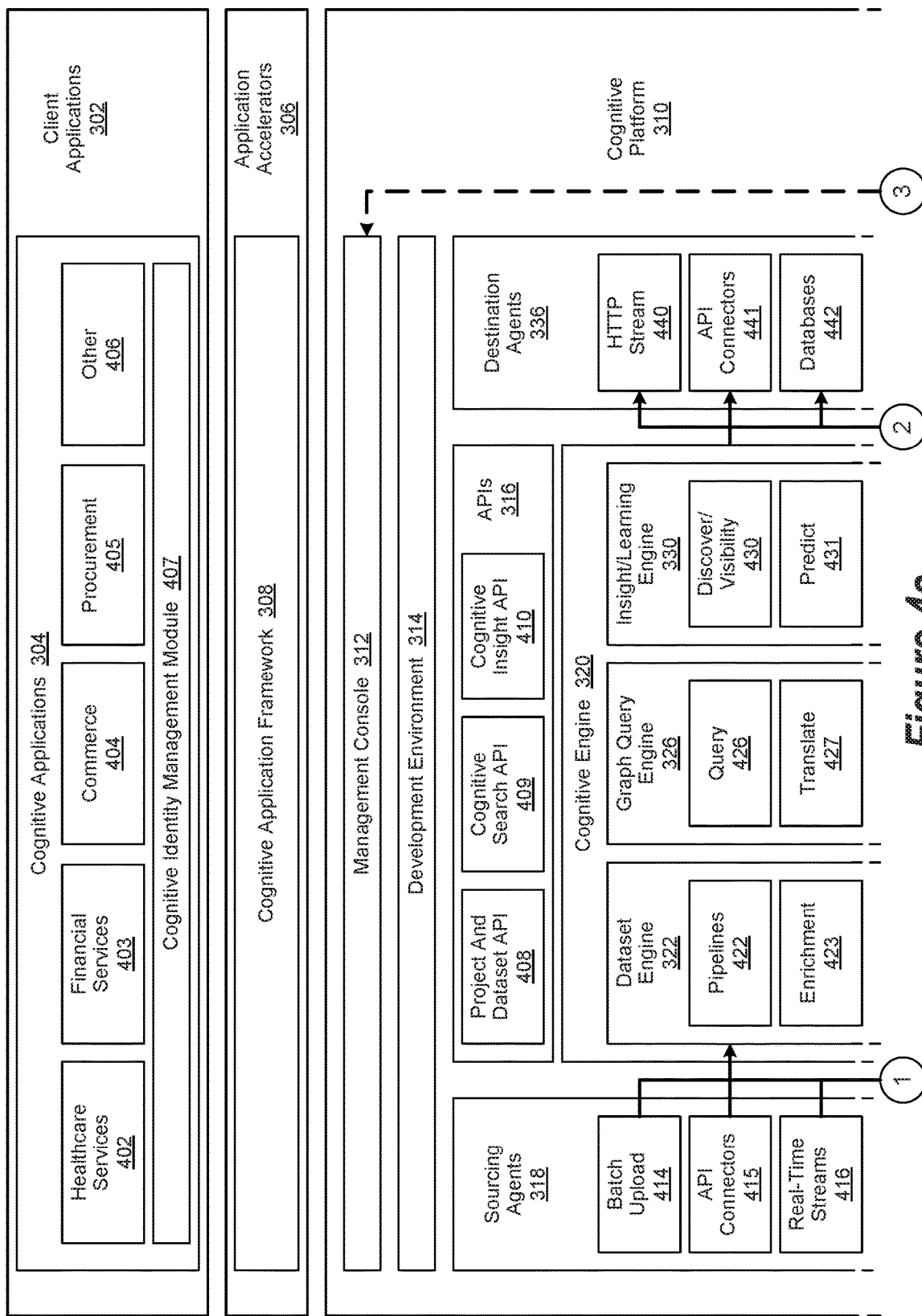
FIGS. 4a through 4c depict additional components of the CILS reference model shown in FIG. 3.
Figure 4B:
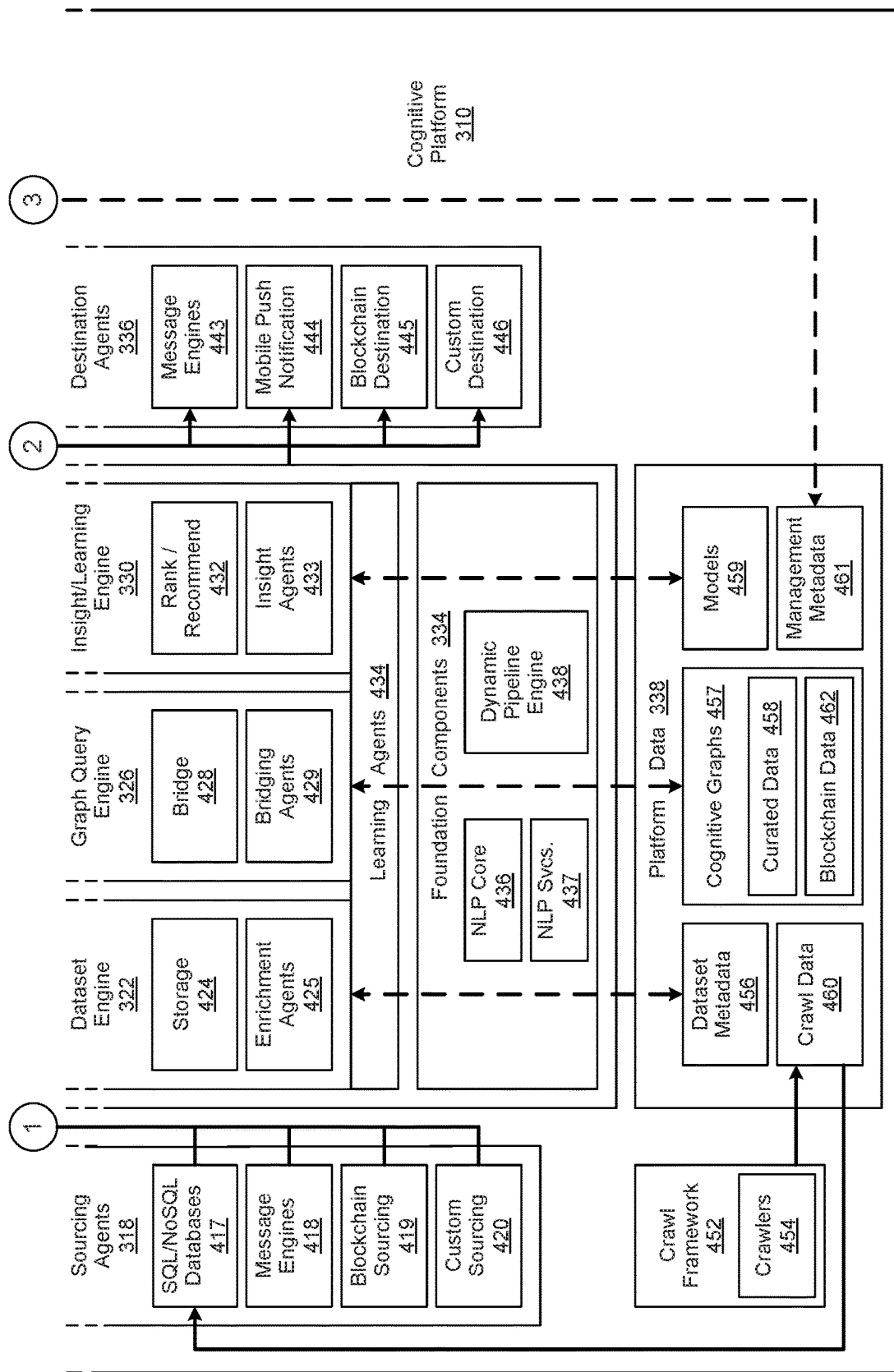
Figure 4C:
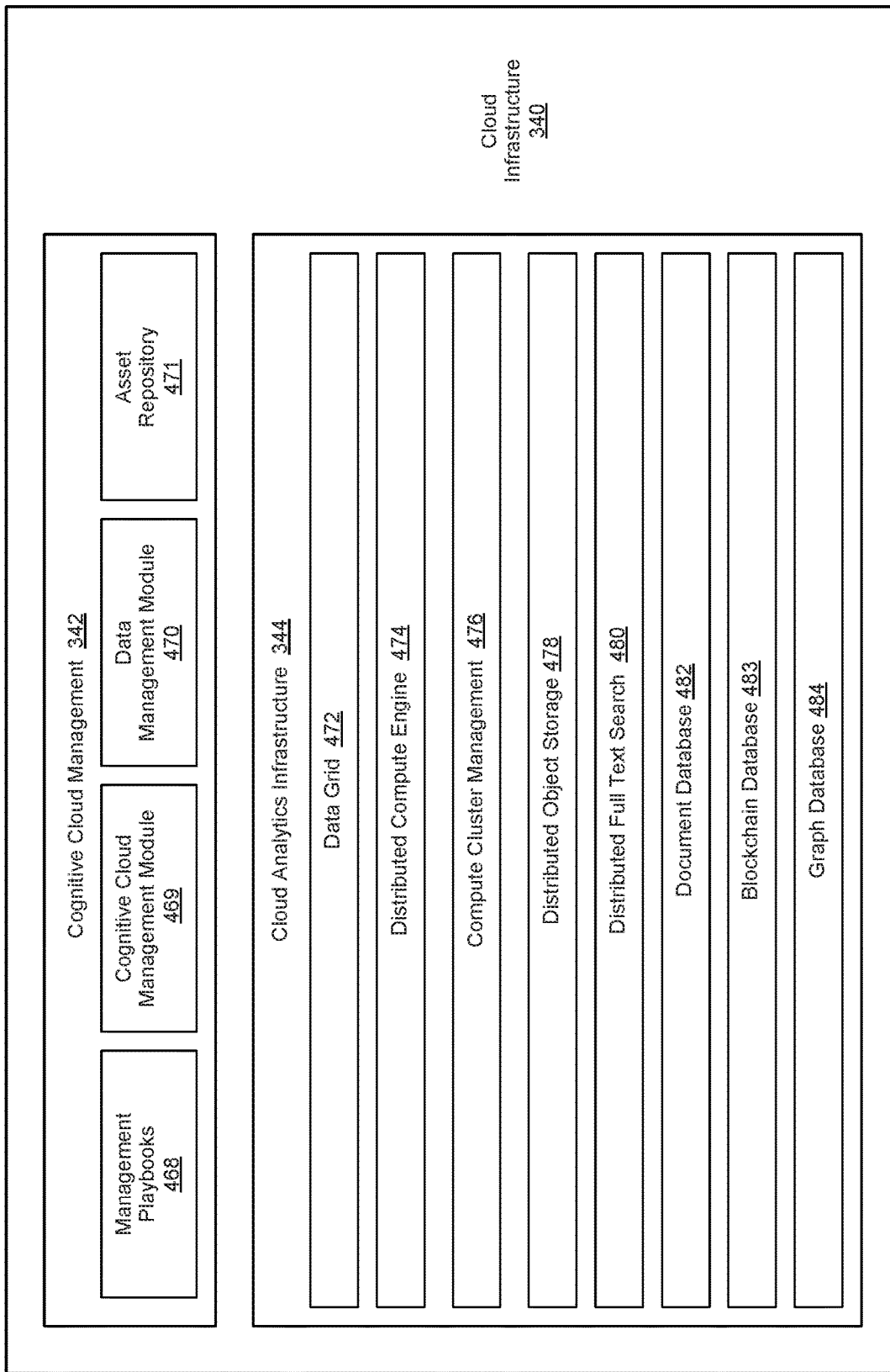

FIGS. 4a through 4c depict additional cognitive inference and learning system (CILS) components implemented in accordance with an embodiment of the CILS reference model shown in FIG. 3. In this embodiment, the CILS reference model includes client applications 302, application accelerators 306, a cognitive platform 310, and cloud infrastructure 340. As shown in FIG. 4a, the client applications 302 include cognitive applications 304. In various embodiments, the cognitive applications 304 are implemented to natively accept and understand human forms of communication, such as natural language text, audio, images, video, and so forth. In certain embodiments, the cognitive applications 304 may include healthcare services 402, financial services 403, commerce 404, procurement, 405 and various other 406 applications familiar to skilled practitioners of the art. As such, the foregoing is only provided as examples of such cognitive applications 304 and is not intended to limit the intent, spirit of scope of the invention.

In various embodiments, the cognitive applications 304 may include a cognitive identity management module 407. In certain embodiments, the cognitive identity management module 407 is implemented to create, revise, append, delete, and otherwise manage a cognitive persona, described in greater detail herein, associated with one or more users. In various embodiments, the cognitive identity management module 407 is implemented to create, revise, append, delete, and otherwise manage a cognitive profile, described in greater detail herein, associated with a particular user. In certain embodiments, the cognitive identity management module 407 is implemented to manage cognitive persona information, cognitive profile information, or some combination thereof, that is provided as part of a blockchain-associated cognitive insight.

In various embodiments, the application accelerators 306 include a cognitive application framework 308. In certain embodiments, the application accelerators 306 and the cognitive application framework 308 support various plug-ins and components that facilitate the creation of client applications 302 and cognitive applications 304. In various embodiments, the application accelerators 306 include widgets, user interface (UI) components, reports, charts, and back-end integration components familiar to those of skill in the art. It will be appreciated that many such application accelerators 306 are possible and their provided functionality, selection, provision and support are a matter of design choice. As such, the application accelerators 306 described in greater detail herein are not intended to limit the spirit, scope or intent of the invention.

As shown in FIGS. 4a and 4b, the cognitive platform 310 includes a management console 312, a development environment 314, application program interfaces (APIs) 316, sourcing agents 318, a cognitive engine 320, destination agents 336, platform data 338, and a crawl framework 452. In various embodiments, the management console 312 is implemented to manage accounts and projects, along with management metadata 461 that is used to drive processes and operations within the cognitive platform 310 for a predetermined project.

In various embodiments, the management console 312 is implemented to run various services on the cognitive platform 310. In certain embodiments, the management console 312 is implemented to manage the configuration of the cognitive platform 310. In various embodiments, the management console 312 is implemented to establish the development environment 314. In certain embodiments, the management console 312 may be implemented to manage the development environment 314 once it is established. Skilled practitioners of the art will realize that many such embodiments are possible. Accordingly, the foregoing is not intended to limit the spirit, scope or intent of the invention.

In various embodiments, the development environment 314 is implemented to create custom extensions to the CILS 118 shown in FIG. 2. In these and other embodiments, the development environment 314 is implemented to support various programming languages, such as Python, Java, R, and others familiar to skilled practitioners of the art. In various embodiments, the development environment 314 is implemented to allow one or more of these various programming languages to be used to create a variety of analytic models and applications. As an example, the development environment 314 may be implemented to support the R programming language, which in turn can be used to create an analytic model that is then hosted on the cognitive platform 310.

In certain embodiments, the development environment 314 is implemented for the development of various custom applications or extensions related to the cognitive platform 310, which may subsequently be deployed in a public, private or hybrid cloud environment. In various embodiments, the development environment 314 is implemented for the development of various custom sourcing agents 318, custom enrichment agents 425, custom bridging agents 429, custom insight agents 433, custom destination agents 336, and custom learning agents 434, which are described in greater detail herein.

In various embodiments, the APIs 316 are implemented to build and manage predetermined cognitive applications 304, described in greater detail herein, which are then executed on the cognitive platform 310 to generate cognitive insights. In these embodiments, the APIs 316 may include one or more of a project and dataset API 408, a cognitive search API 409, a cognitive insight API 410, and other APIs. The selection of the individual APIs 316 implemented in various embodiments is a matter design choice. Accordingly, the foregoing is not intended to limit the spirit, scope or intent of the invention.

In various embodiments, the project and dataset API 408 is implemented with the management console 312 to enable the management of a variety of data and metadata associated with various cognitive insight projects and user accounts hosted or supported by the cognitive platform 310. In one embodiment, the data and metadata managed by the project and dataset API 408 are associated with billing information familiar to those of skill in the art. In one embodiment, the project and dataset API 408 is used to access a data stream that is created, configured and orchestrated, as described in greater detail herein, by the dataset engine 322.

In various embodiments, the cognitive search API 409 uses natural language processes familiar to those of skill in the art to search a target cognitive graph. Likewise, the cognitive insight API 410 is implemented in various embodiments to configure the insight/learning engine 330 to provide access to predetermined outputs from one or more cognitive graph algorithms that are executing in the cognitive platform 310. In certain embodiments, the cognitive insight API 410 is implemented to subscribe to, or request, such predetermined outputs.

In various embodiments, the sourcing agents 318 may include a batch upload 414 agent, an API connectors 415 agent, a real-time streams 416 agent, a Structured Query Language (SQL)/Not Only SQL (NoSQL) databases 417 agent, a message engines 418 agent, a blockchain sourcing 419 agent, and one or more custom sourcing 420 agents. Skilled practitioners of the art will realize that other types of sourcing agents 318 may be used in various embodiments. Accordingly, the foregoing is not intended to limit the spirit, scope or intent of the invention. In various embodiments, the sourcing agents 318 are implemented to source a variety of multi-site, multi-structured source streams of data described in greater detail herein. In certain embodiments, each of the sourcing agents 318 has a corresponding API.

In various embodiments, the batch uploading 414 agent is implemented for batch uploading of data to the cognitive platform 310. In these embodiments, the uploaded data may include a single data element, a single data record or file, or a plurality of data records or files. In certain embodiments, the data may be uploaded from more than one source and the uploaded data may be in a homogenous or heterogeneous form. In various embodiments, the API connectors 415 agent is implemented to manage interactions with one or more predetermined APIs that are external to the cognitive platform 310. As an example, Associated Press® may have their own API for news stories, Expedia® for travel information, or the National Weather Service for weather information. In these examples, the API connectors 415 agent would be implemented to determine how to respectively interact with each organization's API such that the cognitive platform 310 can receive information.

In various embodiments, the real-time streams 416 agent is implemented to receive various streams of data, such as social media streams (e.g., Twitter feeds) or other data streams (e.g., device data streams). In these embodiments, the streams of data are received in near-real-time. In certain embodiments, the data streams include temporal attributes. As an example, as data is added to a blog file, it is time-stamped to create temporal data. Other examples of a temporal data stream include Twitter feeds, stock ticker streams, device location streams from a device that is tracking location, medical devices tracking a patient's vital signs, and intelligent thermostats used to improve energy efficiency for homes.

In certain embodiments, the temporal attributes define a time window, which can be correlated to various elements of data contained in the stream. For example, as a given time window changes, associated data may have a corresponding change. In various embodiments, the temporal attributes do not define a time window. As an example, a social media feed may not have predetermined time windows, yet it is still temporal. As a result, the social media feed can be processed to determine what happened in the last 24 hours, what happened in the last hour, what happened in the last 15 minutes, and then determine related subject matter that is trending.

In various embodiments, the SQL/NoSQL databases 417 agent is implemented to interact with one or more target databases familiar to those of skill in the art. For example, the target database may include a SQL, NoSQL, delimited flat file, or other form of database. In various embodiments, the message engines 418 agent is implemented to provide data to the cognitive platform 310 from one or more message engines, such as a message queue (MQ) system, a message bus, a message broker, an enterprise service bus (ESB), and so forth. Skilled practitioners of the art will realize that there are many such examples of message engines with which the message engines 418 agent may interact. Accordingly, the foregoing is not intended to limit the spirit, scope or intent of the invention. In various embodiments, the blockchain sourcing 419 agent is implemented to provide blockchain data to the cognitive platform 310 from one or more public blockchains, one or more private blockchains, or some combination thereof. In certain embodiments, the blockchain data may include blockchain metadata, blockchain transaction data, blockchain payload data, such as a cognitive insight, blockchain user data, blockchain temporal data, smart contract data, or some combination thereof.

In various embodiments, the custom sourcing agents 420, which are purpose-built, are developed through the use of the development environment 314, described in greater detail herein. Examples of custom sourcing agents 420 include sourcing agents for various electronic medical record (EMR) systems at various healthcare facilities. Such EMR systems typically collect a variety of healthcare information, much of it the same, yet it may be collected, stored and provided in different ways. In this example, the custom sourcing agents 420 allow the cognitive platform 310 to receive information from each disparate healthcare source.

In various embodiments, the cognitive engine 320 includes a dataset engine 322, a graph engine 326, an insight/learning engine 330, learning agents 434, and foundation components 334. In these and other embodiments, the dataset engine 322 is implemented as described in greater detail to establish and maintain a dynamic data ingestion and enrichment pipeline. In various embodiments, the dataset engine 322 may include a pipelines 422 component, an enrichment 423 component, a storage component 424, and one or more enrichment agents 425.

In various embodiments, the pipelines 422 component is implemented to ingest various data provided by the sourcing agents 318. Once ingested, this data is converted by the pipelines 422 component into streams of data for processing. In certain embodiments, these managed streams are provided to the enrichment 423 component, which performs data enrichment operations familiar to those of skill in the art. As an example, a data stream may be sourced from Associated Press® by a sourcing agent 318 and provided to the dataset engine 322. The pipelines 422 component receives the data stream and routes it to the enrichment 423 component, which then enriches the data stream by performing sentiment analysis, geotagging, and entity detection operations to generate an enriched data stream. In certain embodiments, the enrichment operations include filtering operations familiar to skilled practitioners of the art. To further the preceding example, the Associated Press® data stream may be filtered by a predetermined geography attribute to generate an enriched data stream.

The enriched data stream is then subsequently stored, as described in greater detail herein, in a predetermined location. In various embodiments, the enriched data stream is cached by the storage 424 component to provide a local version of the enriched data stream. In certain embodiments, the cached, enriched data stream is implemented to be "replayed" by the cognitive engine 320. In one embodiment, the replaying of the cached, enriched data stream allows incremental ingestion of the enriched data stream instead of ingesting the entire enriched data stream at one time. In various embodiments, one or more enrichment agents 425 are implemented to be invoked by the enrichment component 423 to perform one or more enrichment operations described in greater detail herein.

In various embodiments, the graph query engine 326 is implemented to receive and process queries such that they can be bridged into a cognitive graph, as described in greater detail herein, through the use of a bridging agent. In these embodiments, the graph query engine may include a query 426 component, a translate 427 component, a bridge 428 component, and one or more bridging agents 429.

In various embodiments, the query 426 component is implemented to support natural language queries. In these and other embodiments, the query 426 component receives queries, processes them (e.g., using NLP processes), and then maps the processed query to a target cognitive graph. In various embodiments, the translate 427 component is implemented to convert the processed queries provided by the query 426 component into a form that can be used to query a target cognitive graph. To further differentiate the distinction between the functionality respectively provided by the query 426 and translate 427 components, the query 426 component is oriented toward understanding a query from a user. In contrast, the translate 427 component is oriented to translating a query that is understood into a form that can be used to query a cognitive graph.

In various embodiments, the bridge 428 component is implemented to generate an answer to a query provided by the translate 427 component. In certain embodiments, the bridge 428 component is implemented to provide domain-specific responses when bridging a translated query to a cognitive graph. For example, the same query bridged to a target cognitive graph by the bridge 428 component may result in different answers for different domains, dependent upon domain-specific bridging operations performed by the bridge 428 component.

To further differentiate the distinction between the translate 427 component and the bridging 428 component, the translate 427 component relates to a general domain translation of a question. In contrast, the bridging 428 component allows the question to be asked in the context of a specific domain (e.g., healthcare, financial services, commerce, procurement, etc.), given what is known about the data. In certain embodiments, the bridging 428 component is implemented to process what is known about the translated query, in the context of the user, to provide an answer that is relevant to a specific domain.

As an example, a user may ask, "Where should I eat today?" If the user has been prescribed a particular health regimen, the bridging 428 component may suggest a restaurant with a "heart healthy" menu. However, if the user is a business traveler, the bridging 428 component may suggest the nearest restaurant that has the user's favorite food. In various embodiments, the bridging 428 component may provide answers, or suggestions, that are composed and ranked according to a specific domain of use. In various embodiments, the bridging agent 429 is implemented to interact with the bridging component 428 to perform bridging operations described in greater detail herein. In these embodiments, the bridging agent interprets a translated query generated by the query 426 component within a predetermined user context, and then maps it to predetermined nodes and links within a target cognitive graph.

In various embodiments, the insight/learning engine 330 is implemented to encapsulate a predetermined algorithm, which is then applied to a target cognitive graph to generate a result, such as a recommendation, a cognitive insight, a blockchain-associated cognitive insight, or some combination thereof. In certain embodiments, one or more such algorithms may contribute to answering a specific question and provide additional cognitive insights or recommendations. In these and other embodiments, the insight/learning engine 330 is implemented to perform insight/learning operations, described in greater detail herein. In various embodiments, the insight/learning engine 330 may include a discover/visibility 430 component, a predict 431 component, a rank/recommend 432 component, and one or more insight 433 agents.

In various embodiments, the discover/visibility 430 component is implemented to provide detailed information related to a predetermined topic, such as a subject or an event, along with associated historical information. In certain embodiments, the historical information may be contained in one or more public blockchains, one or more private blockchains, or some combination thereof. In various embodiments, the historical information may be related to a particular industry sector, process, or operation, such as financial services, healthcare, commerce, procurement, and so forth. In certain embodiments, the predict 431 component is implemented to perform predictive operations to provide insight into what may next occur for a predetermined topic. In various embodiments, the rank/recommend 432 component is implemented to perform ranking and recommendation operations to provide a user prioritized recommendations associated with a provided cognitive insight.

In certain embodiments, the insight/learning engine 330 may include additional components. For example the additional components may include classification algorithms, clustering algorithms, and so forth. Skilled practitioners of the art will realize that many such additional components are possible. Accordingly, the foregoing is not intended to limit the spirit, scope or intent of the invention. In various embodiments, the insights agents 433 are implemented to create a visual data story, highlighting user-specific insights, relationships and recommendations. As a result, it can share, operationalize, or track business insights in various embodiments. In various embodiments, the learning agent 434 work in the background to continually update the cognitive graph, as described in greater detail herein, from each unique interaction with data and users.

In various embodiments, the destination agents 336 are implemented to publish cognitive insights to a consumer of cognitive insight data. Examples of such consumers of cognitive insight data include target databases, business intelligence applications, and mobile applications. In certain embodiments, the destination agents 336 may include a Hypertext Transfer Protocol (HTTP) stream 440 agent, an API connectors 441 agent, a databases 442 agent, a message engines 443 agent, a mobile push notification 444 agent, one or more blockchain destination 445 agents, and one or more custom destination 446 agents. Skilled practitioners of the art will realize that other types of destination agents 318 may be used in various embodiments of the invention. Accordingly, the foregoing is not intended to limit the spirit, scope or intent of the invention. In certain embodiments, each of the destination agents 318 has a corresponding API.

In various embodiments, the HTTP stream 440 agent is implemented for providing various HTTP streams of cognitive insight data to a predetermined cognitive data consumer. In these embodiments, the provided HTTP streams may include various HTTP data elements familiar to those of skill in the art. In certain embodiments, the HTTP streams of data are provided in near-real-time. In various embodiments, the API connectors 441 agent is implemented to manage interactions with one or more predetermined APIs that are external to the cognitive platform 310. As an example, various target databases, business intelligence applications, and mobile applications may each have their own unique API.

In various embodiments, the databases 442 agent is implemented for provision of cognitive insight data to one or more target databases familiar to those of skill in the art. For example, the target database may include a SQL, NoSQL, delimited flat file, or other form of database. In these embodiments, the provided cognitive insight data may include a single data element, a single data record or file, or a plurality of data records or files. In certain embodiments, the data may be provided to more than one cognitive data consumer and the provided data may be in a homogenous or heterogeneous form. In various embodiments, the message engines 443 agent is implemented to provide cognitive insight data to one or more message engines, such as a message queue (MQ) system, a message bus, a message broker, an enterprise service bus (ESB), and so forth. In various embodiments, the one or more blockchain destination 445 agents are implemented to provide one or more cognitive insights, one or more smart contracts, or some combination thereof, in the form of a blockchain-associated cognitive insight, described in greater detail herein. Skilled practitioners of the art will realize that there are many such examples of databases with which the databases 442 agent may interact, public and private blockchains with which the blockchain destination 445 agent may interact, and message engines with which the message engines 443 agent may interact. Accordingly, the foregoing is not intended to limit the spirit, scope or intent of the invention.

In various embodiments, the custom destination 446 agents, which are purpose-built, are developed through the use of the development environment 314, described in greater detail herein. Examples of custom destination agents 446 include destination agents for various electronic medical record (EMR) systems at various healthcare facilities. Such EMR systems typically collect a variety of healthcare information, much of it the same, yet it may be collected, stored and provided in different ways. In this example, the custom destination agents 446 allow such EMR systems to receive cognitive insight data in a form they can use. Other examples of custom destination agents 446 include destination agents for various financial services systems (e.g., banking, insurance, securities and commodities exchanges, etc.), destination agents for commerce entities (e.g., physical and online retailers, etc.), and destination agents for procurement processes.

In various embodiments, data that has been cleansed, normalized and enriched by the dataset engine, as described in greater detail herein, is provided by a destination agent 336 to a predetermined destination, likewise described in greater detail herein. In these embodiments, neither the graph query engine 326 nor the insight/learning engine 330 are implemented to perform their respective functions.

In various embodiments, the foundation components 334 are implemented to enable the dataset engine 322, the graph query engine 326, and the insight/learning engine 330 to perform their respective operations and processes. In these and other embodiments, the foundation components 334 may include an NLP core 436 component, an NLP services 437 component, and a dynamic pipeline engine 438. In various embodiments, the NLP core 436 component is implemented to provide a set of predetermined NLP components for performing various NLP operations described in greater detail herein.

In these embodiments, certain of these NLP core components are surfaced through the NLP services 437 component, while some are used as libraries. Examples of operations that are performed with such components include dependency parsing, parts-of-speech tagging, sentence pattern detection, and so forth. In various embodiments, the NLP services 437 component is implemented to provide various internal NLP services, which are used to perform entity detection, summarization, and other operations, likewise described in greater detail herein. In these embodiments, the NLP services 437 component is implemented to interact with the NLP core 436 component to provide predetermined NLP services, such as summarizing a target paragraph.

In various embodiments, the dynamic pipeline engine 438 is implemented to interact with the dataset engine 322 to perform various operations related to receiving one or more sets of data from one or more sourcing agents, apply enrichment to the data, and then provide the enriched data to a predetermined destination. In these and other embodiments, the dynamic pipeline engine 438 manages the distribution of these various operations to a predetermined compute cluster and tracks versioning of the data as it is processed across various distributed computing resources. In certain embodiments, the dynamic pipeline engine 438 is implemented to perform data sovereignty management operations to maintain sovereignty of the data.

In various embodiments, the platform data 338 includes various data repositories, described in greater detail herein, that are accessed by the cognitive platform 310 to generate cognitive insights. In these embodiments, the platform data 338 repositories may include repositories of dataset metadata 456, cognitive graphs 457, models 459, crawl data 460, and management metadata 461. In various embodiments, the dataset metadata 456 is associated with curated data 458 and blockchain data 462 contained in the repository of cognitive graphs 457. In these and other embodiments, the repository of dataset metadata 456 contains dataset metadata that supports operations performed by the storage 424 component of the dataset engine 322. For example, if a Mongo® NoSQL database with ten million items is being processed, and the cognitive platform 310 fails after ingesting nine million of the items, then the dataset metadata 456 may be able to provide a checkpoint that allows ingestion to continue at the point of failure instead restarting the ingestion process.

Those of skill in the art will realize that the use of such dataset metadata 456 in various embodiments allows the dataset engine 322 to be stateful. In certain embodiments, the dataset metadata 456 allows support of versioning. For example, versioning may be used to track versions of modifications made to data, such as in data enrichment processes described in greater detail herein. As another example, geotagging information may have been applied to a set of data during a first enrichment process, which creates a first version of enriched data. Adding sentiment data to the same set of data during a second enrichment process creates a second version of enriched data. In this example, the dataset metadata stored in the dataset metadata 456 provides tracking of the different versions of the enriched data and the differences between the two.

In various embodiments, the repository of cognitive graphs 457 is implemented to store cognitive graphs generated, accessed, and updated by the cognitive engine 320 in the process of generating cognitive insights. In various embodiments, the repository of cognitive graphs 457 may include one or more repositories of curated data 458, one or more repositories of blockchain data 462, of some combination thereof. In certain embodiments, the repositories of curated data 458 includes data that has been curated by one or more users, machine operations, or a combination of the two, by performing various sourcing, filtering, and enriching operations described in greater detail herein. In these and other embodiments, the curated data 458 is ingested by the cognitive platform 310 and then processed, as likewise described in greater detail herein, to generate cognitive insights.

In various embodiments, the one or more repositories of blockchain data 462 may contain certain data residing in one or more public blockchains, one or more private blockchains, or some combination thereof. In certain embodiments, the repositories of blockchain data 462 may contain recommendations, cognitive insights, smart contracts, or any combination thereof, that are contained within previous generated blockchain-associated cognitive insights. In various embodiments, the repository of models 459 is implemented to store models that are generated, accessed, and updated by the cognitive engine 320 in the process of generating cognitive insights. As used herein, models broadly refer to machine learning models. In certain embodiments, the models include one or more statistical models.

In various embodiments, the crawl framework 452 is implemented to support various crawlers 454 familiar to skilled practitioners of the art. In certain embodiments, the crawlers 454 are custom configured for various target domains. For example, different crawlers 454 may be used for various healthcare, financial services, commerce, or procurement forums, blogs, news and other related sites. As another example, different crawlers 454 may be used to collect blockchain data associated with various public and private blockchains. In various embodiments, data collected by the crawlers 454 is provided by the crawl framework 452 to the repository of crawl data 460. In these embodiments, the collected crawl data is processed and then stored in a normalized form in the repository of crawl data 460. The normalized data is then provided to SQL/NoSQL database 417 agent, which in turn provides it to the dataset engine 322. In one embodiment, the crawl database 460 is a NoSQL database, such as Mongo®.

In various embodiments, the repository of management metadata 461 is implemented to store user-specific metadata used by the management console 312 to manage accounts (e.g., billing information) and projects. In certain embodiments, the user-specific metadata stored in the repository of management metadata 461 is used by the management console 312 to drive processes and operations within the cognitive platform 310 for a predetermined project. In various embodiments, the user-specific metadata stored in the repository of management metadata 461 is used to enforce data sovereignty. It will be appreciated that many such embodiments are possible. Accordingly, the foregoing is not intended to limit the spirit, scope or intent of the invention.

Referring now to FIG. 4c, the cloud infrastructure 340 may include a cognitive cloud management 342 component and a cloud analytics infrastructure 344 component in various embodiments. Current examples of a cloud infrastructure 340 include Amazon Web Services (AWS®), available from Amazon.com® of Seattle, Wash., IBM® Softlayer, available from International Business Machines of Armonk, N.Y., and Nebula/Openstack, a joint project between Raskspace Hosting®, of Windcrest, Tex., and the National Aeronautics and Space Administration (NASA). In these embodiments, the cognitive cloud management 342 component may include a management playbooks 468 sub-component, a cognitive cloud management module 469 sub-component, a data management module 470 sub-component, and an asset repository 471 sub-component. In certain embodiments, the cognitive cloud management 342 component may include various other sub-components.

In various embodiments, the management playbooks 468 sub-component is implemented to automate the creation and management of the cloud analytics infrastructure 344 component along with various other operations and processes related to the cloud infrastructure 340. As used herein, "management playbooks" broadly refers to any set of instructions or data, such as scripts and configuration data, that is implemented by the management playbooks 468 sub-component to perform its associated operations and processes.

In various embodiments, the cognitive cloud management module 469 sub-component is implemented to provide a user visibility and management controls related to the cloud analytics infrastructure 344 component along with various other operations and processes related to the cloud infrastructure 340. In various embodiments, the data management module 470 sub-component is implemented to manage platform data 338, described in greater detail herein. In various embodiments, the asset repository 471 sub-component is implemented to provide access to various cognitive cloud infrastructure assets, such as asset configurations, machine images, and cognitive insight stack configurations.

In various embodiments, the cloud analytics infrastructure 344 component may include a data grid 472 sub-component, a distributed compute engine 474 sub-component, and a compute cluster management 476 sub-component. In these embodiments, the cloud analytics infrastructure 344 component may also include a distributed object storage 478 sub-component, a distributed full text search 480 sub-component, a document database 482 sub-component, a blockchain database 483 sub-component, a graph database 484 sub-component, and various other sub-components. In various embodiments, the data grid 472 sub-component is implemented to provide distributed and shared memory that allows the sharing of objects across various data structures. One example of a data grid 472 sub-component is Redis, an open-source, networked, in-memory, key-value data store, with optional durability, written in ANSI C. In various embodiments, the distributed compute engine 474 sub-component is implemented to allow the cognitive platform 310 to perform various cognitive insight operations and processes in a distributed computing environment. Examples of such cognitive insight operations and processes include batch operations and streaming analytics processes.

In various embodiments, the compute cluster management 476 sub-component is implemented to manage various computing resources as a compute cluster. One such example of such a compute cluster management 476 sub-component is Mesos/Nimbus, a cluster management platform that manages distributed hardware resources into a single pool of resources that can be used by application frameworks to efficiently manage workload distribution for both batch jobs and long-running services. In various embodiments, the distributed object storage 478 sub-component is implemented to manage the physical storage and retrieval of distributed objects (e.g., binary file, image, text, etc.) in a cloud environment. Examples of a distributed object storage 478 sub-component include Amazon S3®, available from Amazon.com of Seattle, Wash., and Swift, an open source, scalable and redundant storage system.

In various embodiments, the distributed full text search 480 sub-component is implemented to perform various full text search operations familiar to those of skill in the art within a cloud environment. In various embodiments, the document database 482 sub-component is implemented to manage the physical storage and retrieval of structured data in a cloud environment. Examples of such structured data include social, public, private, and device data, as described in greater detail herein. In certain embodiments, the structured data includes data that is implemented in the JavaScript Object Notation (JSON) format. One example of a document database 482 sub-component is Mongo, an open source cross-platform document-oriented database.

In various embodiments, the blockchain database 483 sub-component is implemented to manage the creation and ongoing administration of public blockchains, private blockchains, or some combination thereof. In certain embodiments, the blockchain database 483 sub-component is implemented to perform various operations associated with a blockchain, such as the generation of new blocks, receiving blocks generated by other entities, generating new blockchain transactions for existing blocks, and appending existing blocks with new transactions generated by others. In various embodiments, the graph database 484 sub-component is implemented to manage the physical storage and retrieval of cognitive graphs. One example of a graph database 484 sub-component is GraphDB, an open source graph database familiar to those of skill in the art.

Figure 5:
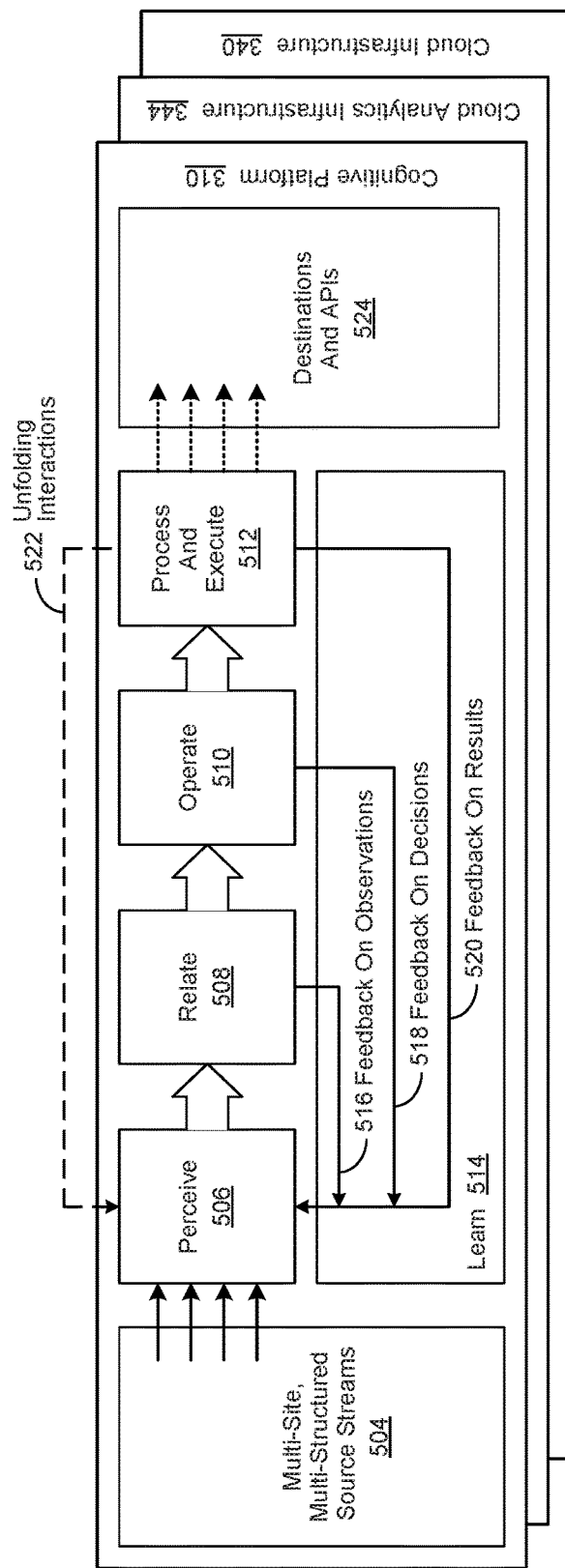
FIG. 5 is a simplified process diagram of CILS operations.

FIG. 5 is a simplified process diagram of cognitive inference and learning system (CILS) operations performed in accordance with an embodiment of the invention. In various embodiments, these CILS operations may include a perceive 506 phase, a relate 508 phase, an operate 510 phase, a process and execute 512 phase, and a learn 514 phase. In these and other embodiments, the CILS 118 shown in FIG. 2 is implemented to mimic cognitive processes associated with the human brain. In various embodiments, the CILS operations are performed through the implementation of a cognitive platform 310, described in greater detail herein. In these and other embodiments, the cognitive platform 310 may be implemented within a cloud analytics infrastructure 344, which in turn is implemented within a cloud infrastructure 340, likewise described in greater detail herein.

In various embodiments, multi-site, multi-structured source streams 504 are provided by sourcing agents, as described in greater detail herein. In these embodiments, the source streams 504 are dynamically ingested in real-time during the perceive 506 phase, and based upon a predetermined context, extraction, parsing, and tagging operations are performed on language, text and images contained in the source streams 504. Automatic feature extraction and modeling operations are then performed with the previously processed source streams 504 during the relate 508 phase to generate queries to identify related data (i.e., corpus expansion).

In various embodiments, operations are performed during the operate 510 phase to discover, summarize and prioritize various concepts, which are in turn used to generate actionable recommendations and notifications associated with predetermined plan-based optimization goals. The resulting actionable recommendations and notifications are then processed during the process and execute 512 phase to provide cognitive insights, such as recommendations, to various predetermined destinations and associated application programming interfaces (APIs) 524.

In various embodiments, features from newly-observed data are automatically extracted from user feedback during the learn 514 phase to improve various analytical models. In these embodiments, the learn 514 phase includes feedback on observations 516 generated during the relate 508 phase, which is provided to the perceive 506 phase. Likewise, feedback on decisions 518 resulting from operations performed during the operate 510 phase, and feedback on results 520 resulting from operations performed during the process and execute 512 phase, are also provided to the perceive 506 phase.

In various embodiments, user interactions result from operations performed during the process and execute 512 phase. In these embodiments, data associated with the user interactions are provided to the perceive 506 phase as unfolding interactions 522, which include events that occur external to the CILS operations described in greater detail herein. As an example, a first query from a user may be submitted to the CILS system, which in turn generates a first cognitive insight, which is then provided to the user. In response, the user may respond by providing a first response, or perhaps a second query, either of which is provided in the same context as the first query. The CILS receives the first response or second query, performs various CILS operations, and provides the user a second cognitive insight. As before, the user may respond with a second response or a third query, again in the context of the first query. Once again, the CILS performs various CILS operations and provides the user a third cognitive insight, and so forth. In this example, the provision of cognitive insights to the user, and their various associated responses, results in unfolding interactions 522, which in turn result in a stateful dialog that evolves over time. Skilled practitioners of the art will likewise realize that such unfolding interactions 522, occur outside of the CILS operations performed by the cognitive platform 310.

Figure 6:
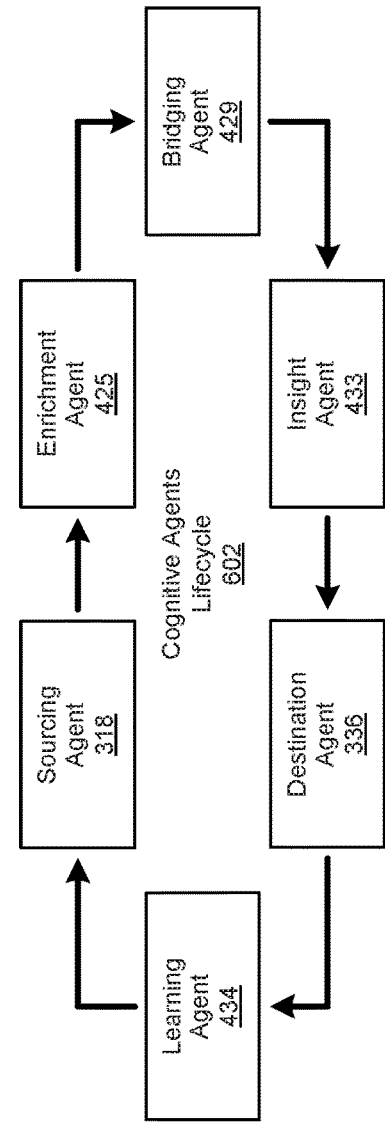
FIG. 6 depicts the lifecycle of CILS agents implemented to perform CILS operations.

FIG. 6 depicts the lifecycle of CILS agents implemented in accordance with an embodiment of the invention to perform CILS operations. In various embodiments, the CILS agents lifecycle 602 may include implementation of a sourcing 318 agent, an enrichment 425 agent, a bridging 429 agent, an insight 433 agent, a destination 336 agent, and a learning 434 agent. In these embodiments, the sourcing 318 agent is implemented to source a variety of multi-site, multi-structured source streams of data described in greater detail herein. These sourced data streams are then provided to an enrichment 425 agent, which then invokes an enrichment component to perform enrichment operations to generate enriched data streams, likewise described in greater detail herein.

The enriched data streams are then provided to a bridging 429 agent, which is used to perform bridging operations described in greater detail herein. In turn, the results of the bridging operations are provided to an insight 433 agent, which is implemented as described in greater detail herein to create a visual data story, highlighting user-specific insights, relationships and recommendations. The resulting visual data story is then provided to a destination 336 agent, which is implemented to publish cognitive insights to a consumer of cognitive insight data, likewise as described in greater detail herein. In response, the consumer of cognitive insight data provides feedback to a learning 434 agent, which is implemented as described in greater detail herein to provide the feedback to the sourcing agent 318, at which point the CILS agents lifecycle 602 is continued. From the foregoing, skilled practitioners of the art will recognize that each iteration of the cognitive agents lifecycle 602 provides more informed cognitive insights.

Figure 7:
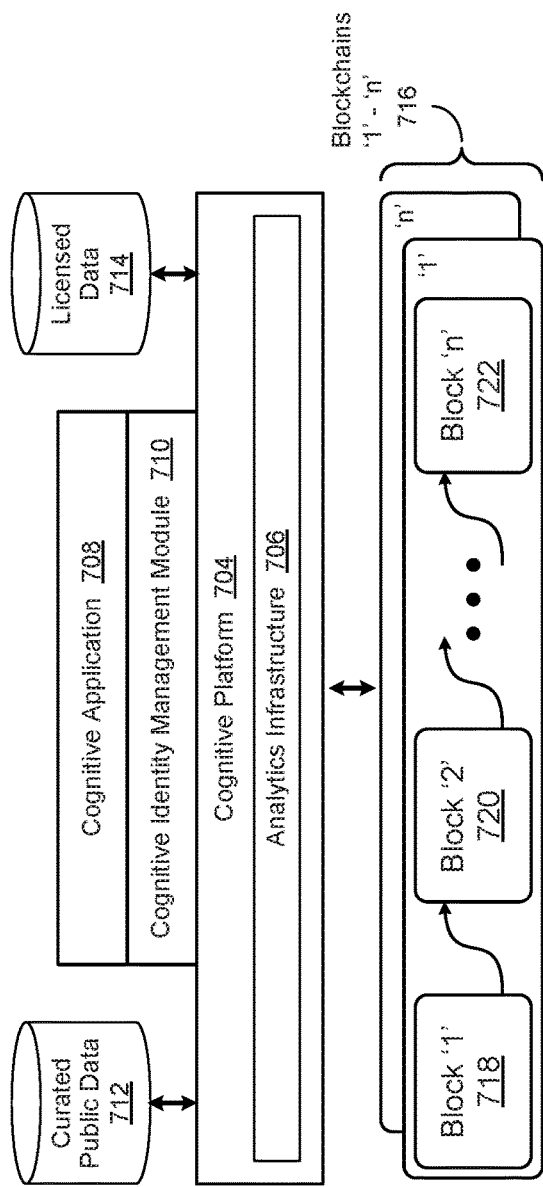
FIG. 7 is a simplified block diagram of the use of a blockchain by a CILS to perform blockchain-associated cognitive insight and learning operations.

FIG. 7 is a simplified block diagram of the use of a blockchain by a cognitive insight and learning system (CILS) to perform blockchain-associated cognitive insight and learning operations in accordance with an embodiment of the invention. In various embodiments, a cognitive platform 704, described in greater detail herein, includes an analytics infrastructure 706, likewise described in greater detail herein. In these embodiments, the cognitive platform 704 is implemented to use data associated with one or more blockchains '1'-'n' 716 to perform blockchain-associated cognitive insight and learning operations. As used herein, a blockchain broadly refers to a decentralized, distributed data structure whose contents are replicated across a number of systems. These contents are stored in a chain of fixed structures commonly referred to as "blocks," such as block '1' 718, block '2', and so forth, through block 'n' 722. Each of these blocks contains certain information about itself, such as a unique identifier, a reference to its previous block, and a hash value generated from the data it contains. As an example, block '2' 720 would contain a reference to block '1 718, yet their respective hashes values would be different as they contain different data.

Skilled practitioners of the art will be aware that blockchains may be implemented in different ways and for different purposes. However, they typically have certain characteristics in common. For example, a blockchain is digitally distributed across a number of systems, each of which maintains a copy of the blockchain. Updates to one copy of the blockchain, such as the addition of a block 'n' 722, results in corresponding, near-real-time updates to the other copies. Accordingly, the contents of the blockchain, including its most recent updates, are available to all participating users of the blockchain, who in turn use their own systems to authenticate and verify each new block. This authentication and verification ensures that the same transaction does not occur more than once. Furthermore, the legitimacy of a block, and its associated contents, is only certified once a majority of participants agree to its validity.

Likewise, known blockchain approaches typically use various cryptography and digital signature approaches known to those of the art to prove the identity of various blockchain participants. As a result, individual blockchain transactions can be traced back to the digital identities of their creators. In certain implementations, the digital identity is anonymized, while others are tied to a certifiable identity of an individual, a group, an organization, such as a corporation. As an example, a trusted third party, such as an industry or governmental entity, may authenticate the identity of an individual, group or organization. In one embodiment, the authentication is performed by a Registration Authority (RA) operating as a component of a Public Key Infrastructure (PKI). The resulting authentication may then be used as the basis for creating a set of digital credentials, such as a public/private key pair or digital certificate, which in turn can be used to perform various blockchain operations familiar to those of skill in the art.

In general, the distributed and replicated nature of a blockchain makes it difficult to modify historical records. In particular, while prior records can be read and new data can be written to a blockchain, existing transactions cannot be altered unless the protocol associated with a given blockchain implementation allows it. For example, existing data may be revised if there is consensus within a group of participants to do so. More particularly, a change in one copy of the blockchain would typically require all other participants agree to have corresponding changes made to their own copy.

As a result, the data a given blockchain contains is essentially immutable. However, this immutability of data related to a given blockchain, and the digital certification of the identities involved with a given transaction, does not necessarily ensure that what was recorded in the blockchain can be accepted as an incontrovertible truth. Instead, it simply means that what was originally recorded was agreed upon by a majority of the blockchain's participants.

Additionally, every transaction in a blockchain is timestamped, which is useful for tracking interactions between participants and verifying various information contained in, or related to, a blockchain. Furthermore, instructions can be embedded within individual blocks of a blockchain. These instructions, in the form of computer-executable code, allow transactions or other operations to be initiated if certain conditions are met. For example, a particular good or service can be provided in exchange for the receipt of a monetary amount. In certain embodiments, the computer-executable code is in the form of a smart contract, described in greater detail herein.

In various embodiments, data associated with blockchains '1'-'n' 716 is used by the cognitive platform 704, in combination with one or more cognitive applications 708 and a cognitive identity module 710, to perform a variety of blockchain-associated cognitive insight and learning operations. In certain embodiments, the performance of these cognitive insight and learning operations results in the generation of a blockchain-associated cognitive insight. As used herein, a blockchain-associated cognitive insight broadly refers to a cognitive insight that is generated at least in part through the use of blockchain data, or alternatively, provided in the form of a blockchain transaction, described in greater detail herein. As likewise used herein, blockchain data broadly refers to any data associated with a given blockchain, whether it is related to the data structure of the blockchain as a whole or its individual elements, the individual data elements it may contain, or its associated metadata. Likewise, blockchain data also broadly refers to the rules and parameters of a corresponding blockchain's operation, the protocols related to its interaction with applications and other blockchains, or its corresponding Application Program Interface (API).

As an example, blockchain data residing in blocks '1' 718, '2' 720, through 'n' 722 may be used by the cognitive platform 704, in combination with curated public data 712 and licensed data 714, to generate a blockchain-associated cognitive insight related to a particular subject. As another example, blockchain data residing in blocks '1' 718, '2' 720, through 'n' 722 may be used by the cognitive platform 704, in combination with curated public data 712 and licensed data 714, to generate a blockchain-associated cognitive insight related to a particular user, group or organization. In various embodiments, the cognitive platform 704 is used in combination with a cognitive identity management module 710, described in greater detail herein, to identify blockchain data residing in blocks '1' 718, '2' 720, through 'n' 722 of a given blockchain '1' through 'n' 716 related to a particular user, group or organization. In certain of these embodiments, the identified data is then used by itself, with curated public data 712, with licensed data 714, or some combination thereof to generate the blockchain-associated cognitive insight. In one embodiment, the identified data is used by itself, with curated public data 712, with licensed data 714, or some combination thereof, to validate the veracity of a particular blockchain transaction, described in greater detail herein.

In various embodiments, the resulting blockchain-associated cognitive insight is provided to a cognitive application 708. In one embodiment, the cognitive application 708 is used to provide the blockchain-associated cognitive insight to a user. In another embodiment, the resulting blockchain-associated cognitive insight is used by a cognitive application 708 to perform processing operations resulting in the generation of a result, such as an answer to a user query. In yet another embodiment, the resulting blockchain-assisted cognitive insight is delivered as part of a blockchain transaction, as described in greater detail herein. Skilled practitioners of the art will recognize that many such embodiments are possible. Accordingly, the foregoing is not intended to limit the spirit, scope or intent of the invention.

In certain embodiments, the resulting blockchain-associated cognitive insight is provided a part of a blockchain transaction, described in greater detail herein. In these embodiments, blockchain data related to the data structure of an individual blockchain within blockchains '1'-'n' 716 may be used in the provision of the resulting blockchain-associated cognitive insight. Likewise, blockchain-associated data related to the rules and parameters of the operation of the blockchain, the protocols related to its interaction with applications and other blockchains, its corresponding API, or some combination thereof, may be used in the provision of the blockchain-associated cognitive insight. In various embodiments, the performance of certain cognitive insight and learning operations results in the performance of blockchain-associated cognitive learning operations, described in greater detail herein.

Figure 8:
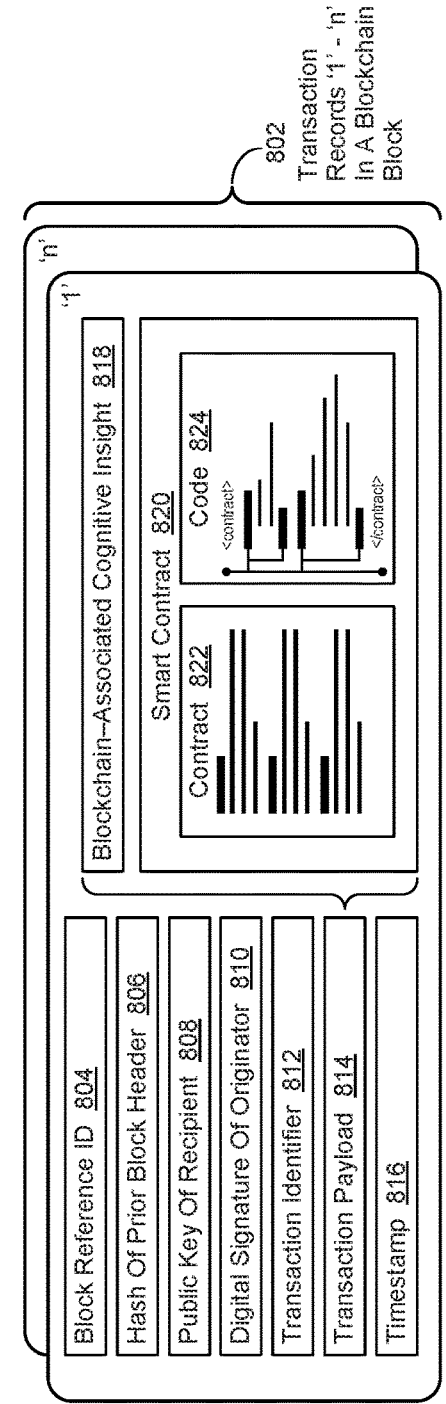
FIG. 8 is a simplified block diagram of a blockchain transaction implemented to deliver a blockchain-associated cognitive insight.

FIG. 8 is a simplified block diagram of a blockchain transaction implemented to deliver a blockchain-associated cognitive insight in accordance with an embodiment of the invention. In various embodiments, a blockchain block may contain multiple transactions records, such as transactions '1' through 'n' 802 shown in FIG. 8. In these embodiments, each transaction record may include data and metadata, such as a block reference identifier (ID) 804, a hash value of the prior block's header 806 information, the public key of the recipient 808 of the transaction, and the digital signature of the originator 810 of the transaction. The transaction record may likewise include additional data and metadata, such as a transaction identifier 812, a transaction payload 814, and a transaction timestamp 816. In certain embodiments, the transaction payload 814 may include one or more blockchain-associated cognitive insights 818, one or more smart contracts 820, or a combination thereof.

In various embodiments, the transaction record may also contain a list of validated digital assets and instruction statements, such as transactions made, their associated financial amounts, and the addresses of the parties to those transactions. In various embodiments, the addresses may be a crytopgraphic key, familiar to those of skill in the art, or a physical address. As an example, in one embodiment, the public key of a recipient 808 is used as an address. In another embodiment, the public key of the recipient is used for the delivery of a digital asset, the transfer of digital currency, or a combination thereof. In yet another embodiment, the address may be a street address, which can be used for the delivery of physical goods.

In certain embodiments, virtually any type of information associated with a transaction may be digitized, codified and placed on a blockchain. As an example, a blockchain-associated cognitive insight 818 may contain confidential information that is only intended for a particular recipient. In one embodiment, the private key of the sender and the public key of the recipient may be used to perform cryptographic operations to encrypt a particular blockchain-associated cognitive insight 818. The resulting encrypted blockchain-associated cognitive insight 818 can then be added to a particular transaction record '1'-'n' 802. While the encrypted blockchain-associated cognitive insight 818 may be viewable in its encrypted form by all participants in the blockchain, it can only be decrypted by its intended recipient. In this example, the encrypted blockchain-associated cognitive insight 818 may be decrypted by its intended recipient through the use of their private key and the sender's public key.

In various embodiments, a blockchain-associated cognitive insight 818 is implemented in combination with a smart contract 820 to perform one or more associated operations or processes. As used herein, a smart contract 820 broadly refers to executable computer code 824 configured to generate instructions for downstream processes. Examples of downstream processes include delivery of digital or physical goods, transfer of digital currencies between participants, performing a one-step assurance process or notification, performing operations to conform to a compliance requirement, and so forth, if certain conditions are met. In certain embodiments, the smart contract 820 may contain the terms and conditions of a contract 822 in clear text, executable computer code 824, or a combination thereof. In various embodiments, the text of a contract 822 may be encrypted for confidentiality. In certain embodiments, the execution of the computer code 824 results in the generation of another blockchain transaction.

In various embodiments, the smart contract is configured to perform a one-step assurance operation. As used herein, a one-step assurance operation broadly refers to assuring that operations associated with a blockchain-associated cognitive insight 818 are performed through a single interaction. In certain embodiments, the single interaction is performed by a user. In various embodiments, the one-step assurance operation is tailored to a particular industry or process, such as financial services, healthcare services, physical or online commerce, procurement, and so forth. In certain embodiments, the operations associated with a blockchain-associated cognitive insight 818 are performed by the executable code 824 associated with a smart contract 820. In various embodiments, the executable code 824 is configured to provide a notification (e.g., an email message) to a user, providing assurance the operations have been performed. In certain embodiments, the executable code 824 is configured to provide a notification to a cognitive application 708, such as shown in FIG. 7, which in turn provides notification to a user, assuring them the operations have been performed.

In various embodiments, the smart contract is configured to perform one or more operations or processes associated with a compliance requirement. As used herein, a compliance requirement broadly refers to a requirement to conform to a policy, standard, regulation, or law. In certain embodiments, the compliance requirement may be associated with a governance compliance requirement, a regulatory compliance requirement, an anti-fraud compliance requirement, or some combination thereof. In various embodiments, the policy or standard may be internal or external to an organization. As an example, an organization may have internal policies limiting the amount an executive can spend on lodging during a business trip to a particular city. In this example, a blockchain-associated cognitive insight 818 suggesting a recommended hotel may be provided to an executive. Furthermore, the nightly cost of the hotel may comply with the internal travel policies of the executive's employer. By accepting the recommendation in the blockchain-associated cognitive insight 818, an associated smart contract 820 is executed, which results in the hotel being booked and lodging costs being paid for.

In certain embodiments, the regulation or law may be external to the organization. As an example, a blockchain-associated cognitive insight 818 may be provided to an healthcare insurance claims processor, recommending that an insurance claim associated with a particular patient be paid to a healthcare provider. In this example, the blockchain-associated cognitive insight 818 may contain two smart contracts 820. The first smart contract may initiate a process to inform the patient that the claim has been paid and to also provide an explanation of benefits (EOB). The second smart contract may initiate payment to the healthcare as well as provide claim payment information, including medical codes. In both cases, the information respectively provided to the patient and provider may be structured to conform to the confidentiality requirements of the Health Insurance Portability and Accountability Act of 1996 (HIPAA). To continue the example, the information respectively provided to the patient and provider in a blockchain transaction may be encrypted, as described in greater detail herein.

In various embodiments, the smart contract code 824 may include a Uniform Resource Locator (URL). In certain of these embodiments, accessing and interacting with content associated with the URL may initiate a downstream process. In one embodiment, the interaction with the content associated with the URL is performed by a user. In another embodiment, the interaction with the content associated with the URL is performed by an application, such as a cognitive application 708, described in greater detail herein. In various embodiments, the URL is encrypted for confidentiality or to maintain the integrity of a downstream process. It will be appreciated that the larger the size of the one or more blockchain-associated cognitive insights 818 and smart contracts 820, the fewer transaction records '1'-'n' 802 can fit within a given block. Skilled practitioners of the art will recognize that many such embodiments are possible. Accordingly, the foregoing is not intended to limit the spirit, scope or intent of the invention.

Figure 9:
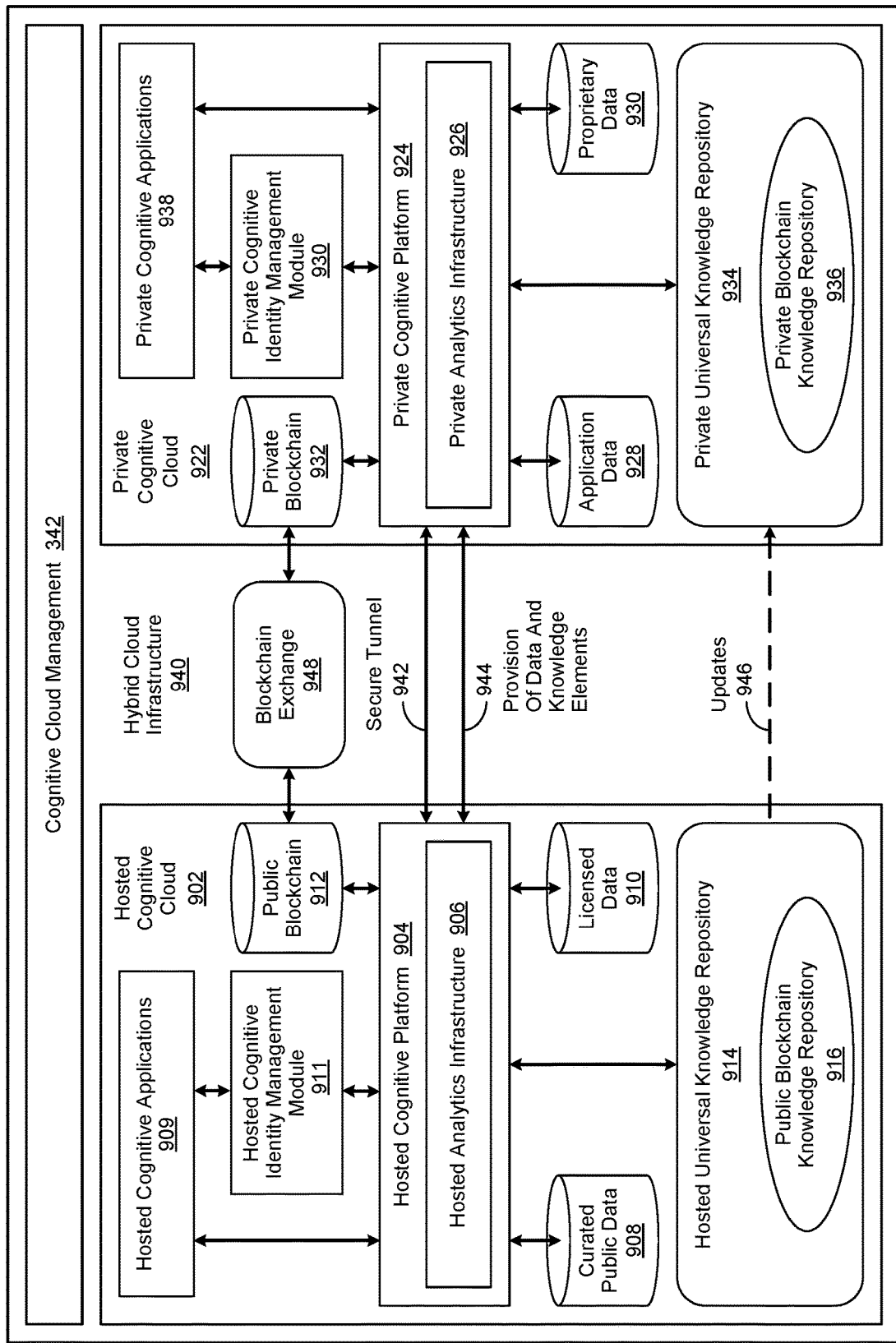
FIG. 9 is a simplified block diagram of a plurality of cognitive platforms implemented in a hybrid cloud environment.

FIG. 9 is a simplified block diagram of a plurality of cognitive platforms implemented in accordance with an embodiment of the invention within a hybrid cloud infrastructure. In this embodiment, the hybrid cloud infrastructure 940 includes a cognitive cloud management 342 component, a hosted 902 cognitive cloud environment, and a private 922 cognitive cloud environment. In various embodiments, the private 922 cognitive cloud environment is implemented in a private network, such as commonly implemented by corporation or government organization. As shown in FIG. 9, the hosted 902 cognitive cloud environment includes a hosted 904 cognitive platform, such as the cognitive platform 310 shown in FIGS. 3, 4a, and 4b. In various embodiments, the hosted 902 cognitive cloud environment may also include a hosted 914 universal knowledge repository, and one or more repositories of curated public data 908, licensed data 910, and public blockchain data 912. In certain embodiments, the hosted 902 cognitive cloud environment may likewise include one or more hosted 909 cognitive applications, hosted cognitive identity management modules 911, or some combination thereof, implemented to interact with the hosted 904 cognitive platform. Likewise, the hosted 904 cognitive platform may also include a hosted 906 analytics infrastructure, such as the cloud analytics infrastructure 344 shown in FIGS. 3 and 4c.

As likewise shown in FIG. 9, the private 922 cognitive cloud environment includes a private 924 cognitive platform, such as the cognitive platform 310 shown in FIGS. 3, 4a, and 4b. In various embodiments, the private 922 cognitive cloud environment may also include a private 934 universal knowledge repository, and one or more repositories of application data 928, proprietary data 930, and private blockchain data 932. In certain embodiments, the private 922 cognitive cloud environment may likewise include one or more private 938 cognitive applications, private cognitive identity management modules 930, or some combination thereof, implemented to interact with the private 924 cognitive platform. Likewise, the private 924 cognitive platform may also include a private 926 analytics infrastructure, such as the cloud analytics infrastructure 344 shown in FIGS. 3 and 4c.

As used herein, a public blockchain 914 broadly refers to a blockchain that has been implemented as a permissionless blockchain, meaning anyone can read or write to it. One advantage of such a public blockchain 912 is it allows individuals who do not know each other to trust a shared record of events without the involvement of an intermediary or third party. Conversely, a private blockchain 932 broadly refers to a blockchain where its participants are known and are granted read and write permissions by an authority that governs the use of the blockchain. For example, the private blockchain 932 participants may belong to the same or different organizations within an industry sector. In various embodiments, these relationships may be governed by informal relationships, formal contracts, or confidentiality agreements.

Skilled practitioners of the art will recognize that while many transactions may benefit from the decentralized approach typically implemented by a public blockchain 912, others are more suited to being handled by an intermediary. Such intermediaries, while possibly adding additional complexities and regulation, can often provide demonstrable value. In various embodiments, an intermediary associated with a private blockchain 932 may have the ability to veto or rescind suspect transactions, provide guarantees and indemnities, and deliver various services not generally available through a public blockchain 912.

Furthermore, private blockchains 932 have several advantages, including the use of cryptographic approaches known to those of skill in the art for identity management and verification of transactions. These approaches not only prevent the same transaction taking place twice, such as double-spending a digital currency, they also provide protection against malicious activities intended to compromise a transaction by changing its details. Moreover, permission controls typically associated with private blockchains can provide dynamic control over who can connect, send, receive and enact individual transactions, based upon any number of parameters that may not be available or implementable in public blockchains. Accordingly, full control can be asserted over every aspect of a blockchain's operation, not only in accordance with the consensus of its various participants, but its administrative intermediary as well.

In various embodiments, a hosted 911 or private 932 identity management module is respectively implemented in the hosted 902 or private 922 cognitive cloud environment to manage the identity of a user, group or organization in the performance of blockchain-associated cognitive insight operations. In certain of these embodiments, the identity management operations may include the use of cognitive personas, cognitive profiles, or a combination thereof, to perform blockchain-associated cognitive insight operations associated with a particular user, group or organization. In various embodiments, the hosted 911 or private 932 identity management module may be implemented to verify the identity of a user, group or organization in the performance of a blockchain-associated cognitive insight operation.

In these various embodiments, the identity management operations may involve the generation, and ongoing management, of private keys, shared keys, public/private key pairs, digital signatures, digital certificates, or any combination thereof, associated with a particular user, group or organization. Likewise, in certain embodiments, the identity management operations may involve the encryption of one or more cognitive insights, one or more smart contracts, or some combination thereof, during the generation of a blockchain-associated cognitive insight. Those of skill in the art will recognize that many such embodiments are possible. Accordingly, the foregoing is not intended to limit the spirit, scope or intent of the invention.

As used herein, a hosted 914 or private 934 universal knowledge repository broadly refers to a collection of knowledge elements that can be used in various embodiments to generate one or more cognitive insights described in greater detail herein. In various embodiments, these knowledge elements may include facts (e.g., milk is a dairy product), information (e.g., an answer to a question), descriptions (e.g., the color of an automobile), skills (e.g., the ability to install plumbing fixtures), and other classes of knowledge familiar to those of skill in the art. In these embodiments, the knowledge elements may be explicit or implicit. As an example, the fact that water freezes at zero degrees centigrade would be an explicit knowledge element, while the fact that an automobile mechanic knows how to repair an automobile would be an implicit knowledge element.

In certain embodiments, the knowledge elements within a hosted 914 or private 934 universal knowledge repository may also include statements, assertions, beliefs, perceptions, preferences, sentiments, attitudes or opinions associated with a person or a group. As an example, user 'A' may prefer the pizza served by a first restaurant, while user 'B' may prefer the pizza served by a second restaurant. Furthermore, both user 'A' and 'B' are firmly of the opinion that the first and second restaurants respectively serve the very best pizza available. In this example, the respective preferences and opinions of users 'A' and 'B' regarding the first and second restaurant may be included in a universal knowledge repository as they are not contradictory. Instead, they are simply knowledge elements respectively associated with the two users and can be used in various embodiments for the generation of certain cognitive insights, as described in greater detail herein.

In various embodiments, individual knowledge elements respectively associated with the hosted 914 and private 934 universal knowledge repositories may be distributed. In one embodiment, the distributed knowledge elements may be stored in a plurality of data stores familiar to skilled practitioners of the art. In this embodiment, the distributed knowledge elements may be logically unified for various implementations of the hosted 914 and private 934 universal knowledge repositories. In certain embodiments, the hosted 914 and private 934 universal knowledge repositories may be respectively implemented in the form of a hosted or private universal cognitive graph. In these embodiments, nodes within the hosted or private universal graph contain one or more knowledge elements.

In various embodiments, a secure tunnel 942, such as a virtual private network (VPN) tunnel, is implemented to allow the hosted 904 cognitive platform and the private 924 cognitive platform to communicate with one another. In these various embodiments, the ability to communicate with one another allows the hosted 904 and private 924 cognitive platforms to work collaboratively when generating cognitive insights described in greater detail herein. In certain embodiments, data associated with one or more public 912 blockchains and one or more private 932 blockchains can be exchanged through the implementation of a blockchain exchange 948. In these embodiments, the implementation of such a blockchain exchange allows the hosted 904 cognitive platform access data associated with one or more private 932 blockchains, and conversely, the private 924 cognitive platform to access data associated with one or more public 912 blockchains. In certain of these embodiments, the blockchain exchange 948 may be implemented with permission and identity management controls to determine the degree to which data associated with the public 912 and private 932 blockchains can be respectively accessed by the private 924 and hosted 904 cognitive platforms.

In various embodiments, data associated with one or more public blockchains 912 is stored as knowledge elements in the public 916 blockchain knowledge repository. In certain embodiments, the public 916 blockchain knowledge repository is implemented as a cognitive graph. In certain embodiments, the hosted 904 cognitive platform accesses knowledge elements stored in the hosted 914 universal knowledge repository, data stored in the repositories of curated public data 908 or licensed data 910, or some combination thereof, to generate various cognitive insights. In various embodiments, the hosted 904 cognitive platform accesses knowledge elements stored in the hosted 914 universal knowledge repository, public blockchain knowledge repository 916, data stored in the repositories of curated public data 908, licensed data 910, public blockchain data 912, or some combination thereof, to generate various blockchain-associated cognitive insights. In certain embodiments, the resulting cognitive insights, or blockchain-associated cognitive insights, are then provided to the private 924 cognitive platform, which in turn provides them to the one or more private 938 cognitive applications.

In various embodiments, data associated with one or more private blockchains 932 is stored as knowledge elements in the private 936 blockchain knowledge repository. In certain embodiments, the private 924 cognitive platform accesses knowledge elements stored in the private 934 universal knowledge repository, data stored in the repositories of application data 928 or proprietary data 930, or some combination thereof, to generate various cognitive insights. In various embodiments, the private 924 cognitive platform accesses knowledge elements stored in the private 934 universal knowledge repository, private blockchain knowledge repository 936, data stored in the repositories of application data 928, proprietary data 930, private blockchain data 932, or some combination thereof, to generate various blockchain-associated cognitive insights. In certain embodiments, the resulting cognitive insights, or blockchain-associated cognitive insights, are then provided to the private 924 cognitive platform, which in turn provides them to the one or more private 938 cognitive applications.

In various embodiments, the private 924 cognitive platform accesses knowledge elements stored in the hosted 914 and private 934 universal knowledge repositories and data stored in the repositories of curated public data 908, licensed data 910, application data 928 and proprietary data 930 to generate various cognitive insights. In certain embodiments, the private 924 cognitive platform accesses knowledge elements stored in the hosted 914 and private 934 universal knowledge repositories, knowledge elements stored in the public 916 and private 936 blockchain knowledge repositories, data stored in the repositories of curated public data 908, licensed data 910, public blockchain data 912, application data 928, proprietary data 930, private blockchain data 932, or some combination thereof to generate various blockchain-associated cognitive insights. In these embodiments, the resulting cognitive insights, or blockchain-associated cognitive insights, are in turn provided to the one or more private 938 cognitive applications.

In various embodiments, the secure tunnel 942 is implemented for the hosted 904 cognitive platform to provide 944 predetermined data and knowledge elements to the private 924 cognitive platform. In one embodiment, the provision 944 of predetermined knowledge elements allows the hosted 914 universal knowledge repository to be replicated as the private 934 universal knowledge repository, and by extension, the public 916 blockchain knowledge repository as the private 936 blockchain knowledge repository. In another embodiment, the provision 944 of predetermined knowledge elements allows the hosted 914 universal knowledge repository to provide updates 946 to the private 934 universal knowledge repository, and by extension, allows the public 916 blockchain knowledge repository to provide updates 946 to the private 936 blockchain knowledge repository. In certain embodiments, the updates 946 to the private 934 universal knowledge repository or the private 936 blockchain knowledge repository do not overwrite other data. Instead, the updates 946 are simply added to the private 934 universal knowledge repository or the private 936 blockchain knowledge repository.

In one embodiment, knowledge elements that are added to the private 934 universal knowledge repository or the private 936 blockchain knowledge repository are not respectively provided to the hosted 914 universal knowledge repository or the public 916 blockchain knowledge repository. As an example, an airline may not wish to share private information related to its customer's flights, the price paid for tickets, their awards program status, and so forth. In another embodiment, predetermined knowledge elements that are added to the private 934 universal knowledge repository may be provided to the hosted 914 universal knowledge repository. In yet another embodiment, predetermined knowledge elements that are added to the private 936 blockchain knowledge repository may be provided to the hosted 916 blockchain knowledge repository. As an example, the operator of the private 924 cognitive platform may decide to license predetermined knowledge elements stored in the private 934 universal knowledge repository, or the private 936 blockchain knowledge repository, to the operator of the hosted 904 cognitive platform. To continue the example, certain knowledge elements stored in the private 934 universal knowledge repository, or the private 936 blockchain knowledge repository, may be anonymized prior to being respectively provided for inclusion in the hosted 914 universal knowledge repository or the public 916 blockchain knowledge repository.

In one embodiment, only private knowledge elements are stored in the private 934 universal knowledge repository or the private 936 blockchain knowledge repository. In this embodiment, the private 924 cognitive platform may use knowledge elements stored in both the hosted 914 and private 934 universal knowledge repositories to generate cognitive insights. In another embodiment, the private 924 cognitive platform may use knowledge elements stored in both the hosted 914 and private 934 universal knowledge repositories, and the public 916 and private 936 blockchain knowledge repositories, to generate blockchain-associated cognitive insights. Skilled practitioners of the art will recognize that many such embodiments are possible. Accordingly, the foregoing is not intended to limit the spirit, scope or intent of the invention.

Figure 10:
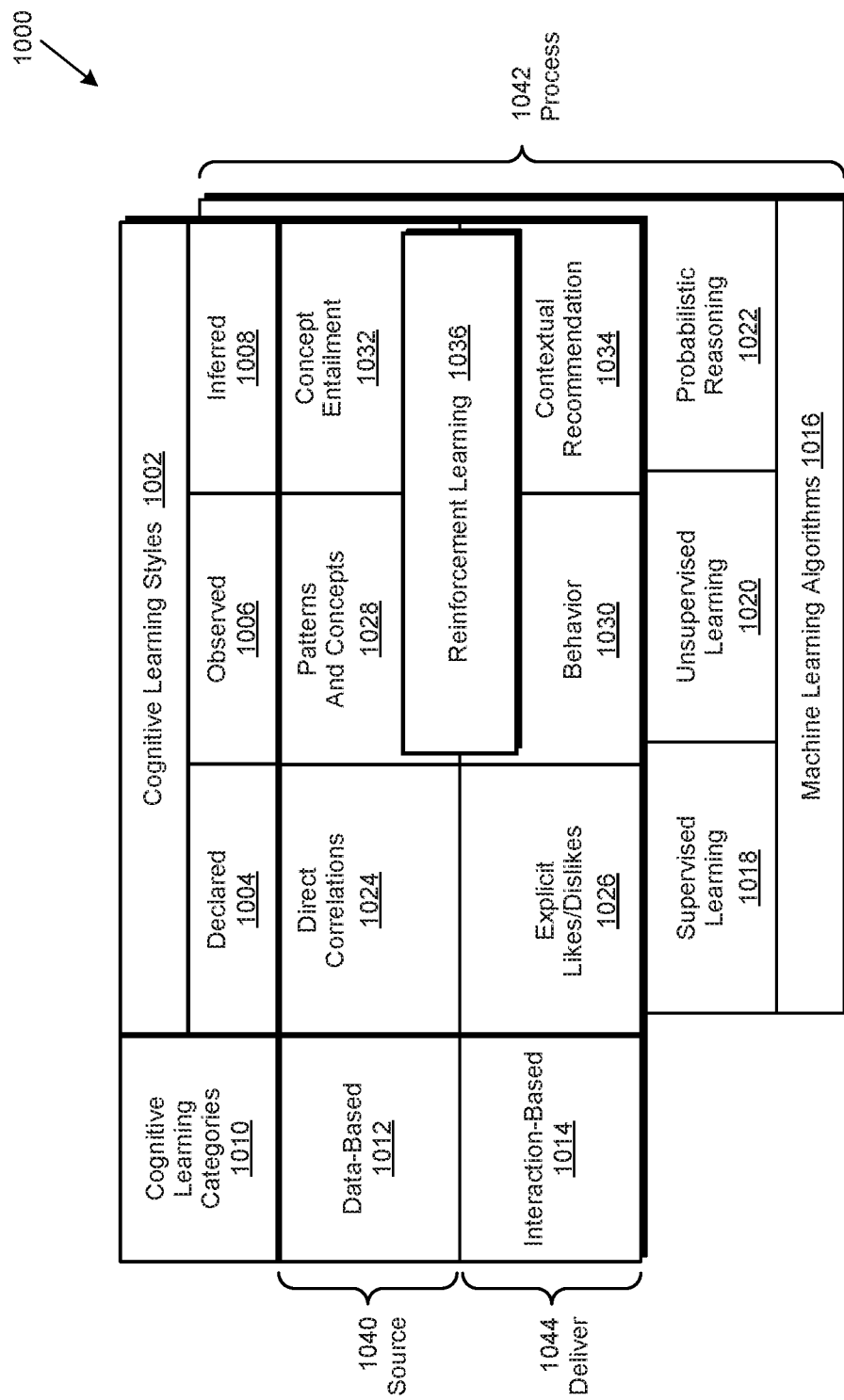
FIG. 10 depicts a cognitive learning framework.

FIG. 10 depicts a cognitive learning framework implemented in accordance with an embodiment of the invention to perform cognitive learning operations. As used herein, a cognitive learning operation broadly refers to the implementation of a cognitive learning technique, described in greater detail herein, to generate a cognitive learning result. In various embodiments, the implementation of the learning technique is performed by a Cognitive Inference and Learning System (CILS), likewise described in greater detail herein.

In certain embodiments, the cognitive learning result is used by the CILS to update a knowledge model, described in greater detail herein. In various embodiments, the knowledge model is implemented as a universal knowledge repository, such as the hosted 914 and private 934 universal knowledge repositories depicted in FIG. 9, or the universal knowledge repositories 1118 and 1280 respectively depicted in FIGS. 11*b* and 12*a*. In certain embodiments, the knowledge model is implemented as a cognitive graph.

In various embodiments, the cognitive learning framework 1000 may include various cognitive learning styles 1002 and cognitive learning categories 1010. As used herein, a cognitive learning style broadly refers to a generalized learning approach implemented by a CILS to perform a cognitive learning operation. In various embodiments, the cognitive learning styles 1002 may include a declared 1004 cognitive learning style, an observed 1006 cognitive learning style, and an inferred 1008 cognitive learning style.

As used herein, a declared 1004 cognitive learning style broadly refers to the use of declarative data by a CILS to perform a corresponding cognitive learning operation. In various embodiments, the declarative data may be processed by the CILS as a statement, an assertion, or a verifiable fact. For example, an electronic medical record (EMR) may contain declarative data asserting that John Smith has Type 1 diabetes, which is a verifiable fact. As another example, a user may explicitly make a declarative statement that they do not like sushi. As yet another example, a blockchain familiar to those of skill in the art may contain declarative data associated with a particular transaction representing an exchange of value between two blockchain participants.

Likewise, as used herein, an observed 1006 cognitive learning style broadly refers to the use of observed data by CILS to perform a corresponding cognitive learning operation. In various embodiments, the observed data may include a pattern, a concept, or some combination thereof. As an example, a CILS may receive and process a stream of information, and over time, observe the formation of a discernable pattern, such as a user always ordering Chinese or Thai food for delivery at lunchtime. In this example, the discerned pattern of the user's ordering behavior may correspond to the concept that the user's lunchtime food preference is Asian cuisine. As another example, a series of transactions may be iteratively appended to a given blockchain. In this example, the discerned pattern of the transactions may correspond to buying patterns of an individual, a group of users, or an organization.

In certain embodiments, a concept may include an observation of the use of certain words in a particular context. For example, the use of the word "haircut" in a financial text may refer to the difference between the market value of an asset used as loan collateral and the amount of the loan, as opposed to a service performed by a hair stylist. In this example, natural language processing (NLP) approaches known to those of skill in the art are implemented by the CILS during the performance of cognitive learning operations to determine the context in which the word "haircut" is used.

As likewise used herein, an inferred 1008 cognitive learning style broadly refers to the use of inferred data by a CILS to perform a corresponding cognitive learning operation. In various embodiments the inferred data may include data inferred from the processing of source data. In certain embodiments, the source data may include data associated with one or more blockchains. In various embodiments, the inferred data may include concepts that are inferred from the processing of other concepts. In these embodiments, the inferred data resulting from the processing of the source data, the concepts, or a combination thereof, may result in the provision of new information that was not in the source data or other concepts. In certain embodiments, this new information is provided as a blockchain-associated cognitive insight, described in greater detail herein.

As an example, a user's selection of a particular accommodation in a resort area during a holiday may result in an inference they prefer staying at a bed and breakfast while on personal travel. Likewise, the selection of a four star accommodation in a downtown area on a weekday may result in an inference the same user prefers a luxury hotel while on business travel. In this example, the user may not declaratively state an accommodation preference for a given type of travel. To continue the example, the inference that the user prefers a luxury hotel while on business travel may result in a blockchain-associated cognitive insight containing a smart contract that can be executed at the discretion of the user to automatically book and pay for a room at a selected hotel. However, there may be insufficient data to observe a particular accommodation preference, regardless of the type of travel.

In various embodiments, each of the cognitive learning styles 1002 may be associated with the use of a particular set of processing resources to perform a corresponding cognitive learning operation. As an example, the observed 1006 cognitive learning style may require more, or different, processing resources than the declared 1004 cognitive learning style. Likewise, the inferred 1008 cognitive learning style may require more, or different, processing resources than either the declared 1004 or observed 1006 cognitive learning styles. The particular resources used by each of cognitive learning styles 1002 is a matter of design choice.

As used herein, a cognitive learning category 1010 broadly refers to a source of information used by a CILS to perform cognitive learning operations. In various embodiments, the cognitive learning categories 1010 may include a data-based 1012 cognitive learning category and an interaction-based 1014 cognitive learning category. As used herein, a data-based 1012 cognitive learning_category broadly refers to the use of data as a source of information in the performance of a cognitive learning operation by a CILS.

In various embodiments, the data may be provided to the CILS in real-time, near real-time, or batch mode as it is performing cognitive learning operations. In certain embodiments, the data may be provided to the CILS as a result of a query generated by the CILS. In various embodiments, the data is provided to the CILS by a cognitive agent, described in greater detail herein. In one embodiment, the cognitive agent is a learning agent, likewise described in greater detail herein.

In certain embodiments, the data may be multi-structured data. In these embodiments, the multi-structured data may include unstructured data (e.g., a document), semi-structured data (e.g., a social media post), and structured data (e.g., a string, an integer, etc.), such as data stored in a relational database management system (RDBMS). In various embodiments, the data may be sourced from a blockchain. In certain embodiments, the data may be public, private, or a combination thereof. In various embodiments the data may be provided by a device, stored in a data lake, a data warehouse, or some combination thereof.

As likewise used herein, an interaction-based 1014 cognitive learning category broadly refers to the use of one or more results of an interaction as a source of information used by a CILS to perform a cognitive learning operation. In various embodiments, the interaction may be between any combination of devices, applications, services, processes, or users. In certain embodiments, the results of the interaction may be provided in the form of feedback data to the CILS.

In various embodiments, the interaction may be explicitly or implicitly initiated by the provision of input data to the devices, applications, services, processes or users. In certain embodiments, the input data may be provided in response to a blockchain-associated cognitive insight, or a composite cognitive insight, provided by a CILS. In one embodiment, the input data may include a user gesture, such as a key stroke, mouse click, finger swipe, or eye movement. In another embodiment, the input data may include a voice command from a user. In yet another embodiment, the input data may include data associated with a user, such as biometric data (e.g., retina scan, fingerprint, body temperature, pulse rate, etc.).

In yet still another embodiment, the input data may include environmental data (e.g., current temperature, etc.), location data (e.g., geographical positioning system coordinates, etc.), device data (e.g., telemetry data, etc.), blockchain data (e.g., transaction data associated with a blockchain), or other data provided by a device, application, service, process or user. Those of skill in the art will realize that many such embodiments of cognitive learning styles 1002 and cognitive learning categories 1010 are possible. Accordingly, the foregoing is not intended to limit the spirit, scope or intent of the invention.

As used herein, a cognitive learning technique refers to the use of a cognitive learning style, in combination with a cognitive learning category, to perform a cognitive learning operation. In various embodiments, individual cognitive learning techniques associated with a primary cognitive learning style are respectively bounded by an associated primary cognitive learning category. For example, as shown in FIG. 10, the direct correlations 1024 and explicit likes/dislikes 1026 cognitive learning techniques are both associated with the declared 1004 learning style and respectively bounded by the data-based 1012 and interaction-based 1014 cognitive learning categories.

As likewise shown in FIG. 10, the patterns and concepts 1028 and behavior 1030 cognitive learning techniques are both associated with the observed 1006 cognitive learning style and likewise respectively bounded by the data-based 1012 and interaction-based 1014 cognitive learning categories. Likewise, as shown in FIG. 10, the concept entailment 1032 and contextual recommendation 1034 cognitive learning techniques are both associated with the inferred 1008 cognitive learning style and likewise respectively bounded by the data-based 1012 and interaction-based 1014 cognitive learning categories.

As used herein, a direct correlations 1024 cognitive learning technique broadly refers to the implementation of a declared 1004 cognitive learning style, bounded by a data-based 1012 cognitive learning category, to perform cognitive learning operations related to direct correlations. Examples of direct correlation include statistical relationships involving dependence, such as the correlation between the stature or other physical characteristics of parents and their biological offspring. Another example of direct correlation would be the correlation between the resulting demand for a particular product offered at a particular price in a corresponding geographic market.

As yet another example, a spreadsheet may contain three columns of data, none of which have an associated column header. The first and second columns may contain names and the third column may contain dates. In this example, the first column may include names that are commonly used as first names (e.g., Bob, Mary, etc.) and the second column may include names that are commonly used as last names (e.g., Smith, Jones, etc.). As a result, there is a statistical likelihood that the third column may contain birthdates that directly correlate to the first and last names in the first and second columns.

As yet still another example, a blockchain may contain a series of transactions, each of which include a smart contract, described in greater detail herein. In this example, originators and recipients of the various transactions may be different, yet their associated smart contracts may essentially be the same. Accordingly, there is a statistical likelihood that that the originators and recipients of the transactions have a commonality that may be discerned from cognitive analysis of blockchain data associated with a blockchain transaction. As used herein, cognitive analysis of blockchain data broadly refers to the analysis of various data and metadata associated with an entire blockchain, individual blocks therein, blockchain transactions associated with a particular blockchain block, or a smart contract associated with a particular transaction. In various embodiments, the cognitive analysis of blockchain data is used in the performance of various cognitive learning styles 1002, described in greater detail herein.

As used herein, an explicit likes/dislikes 1026 cognitive learning technique broadly refers to the implementation of a declared 1012 cognitive learning style, bounded by an interaction-based 1014 cognitive learning category, to perform cognitive learning operations related to a user's explicit likes/dislikes. In various embodiments, a user's explicit likes/dislikes may be declaratively indicated through the receipt of user input data, described in greater detail herein.

For example, an online shopper may select a first pair of shoes that are available in a white, black and brown. The user then elects to view a larger photo of the first pair of shoes, first in white, then in black, but not brown. To continue the example, the user then selects a second pair of shoes that are likewise available in white, black and brown. As before, the user elects to view a larger photo of the second pair of shoes, first in white, then in black, but once again, not brown. In this example, the user's online interaction indicates an explicit like for white and black shoes and an explicit dislike for brown shoes.

As used herein, a patterns and concepts 1028 cognitive learning technique broadly refers to the implementation of an observed 1006 cognitive learning style, bounded by a data-based 1012 cognitive learning category, to perform cognitive learning operations related to the observation of patterns and concepts. As an example, a database record may include information related to various credit card or blockchain transactions associated with a user. In this example, a pattern may be observed within the credit card or blockchain transactions that the user always uses rental cars when traveling between cities in California, but always uses trains when traveling between cities in New York, New Jersey, or Pennsylvania. By extension, this pattern may correspond to a concept that the user prefers automobile transportation when traveling between cities on the West coast, but prefers train transportation when traveling between cities on the East coast.

As another example, a CILS may receive and process a stream of information, and over time, observe the formation of a discernable pattern, such as a user always selecting an Italian restaurant when searching online for nearby places to eat. To continue the example, the CILS may observe that the user consistently orders a Neapolitan pizza from a particular Italian restaurant when location data received from their mobile device indicates the user is in close proximity to the restaurant every Thursday. In this example, the discerned pattern of the user's behavior in consistently ordering a Neapolitan pizza from a particular restaurant when in close proximity on Thursdays may correspond to the concept that the user's food preference on Thursdays is Italian cuisine.

As used herein, a behavior 1030 cognitive learning technique broadly refers to the implementation of an observed 1012 cognitive learning style, bounded by an interaction-based 1008 cognitive learning category, to perform cognitive learning operations related to observed behaviors. In various embodiments, the observed behavior associated with an interaction corresponds to various input data, likewise described in greater detail herein. In certain embodiments, the observed behaviors may include observed behavior associated with interactions, described in greater detail herein.

For example, a user may consistently place an online order for Mexican, Thai or Indian food to be delivered to their home in the evening. To continue the example, promotional offers for fried chicken or seafood are consistently ignored in the evening, yet consistently accepted at lunchtime. Furthermore, the observed behavior of the user is to accept the promotional offer that provides the most food at the lowest cost. In this example, the user's observed online behavior indicates a preference for spicy food in the evenings, regardless of price. Likewise, the user's observed online behavior may indicate a preference for low cost, non-spicy foods for lunch.

As used herein, a concept entailment 1032 cognitive learning technique broadly refers to the implementation of an inferred 1008 cognitive learning style, bounded by a data-based 1012 cognitive learning category, to perform cognitive learning operations related to concept entailment. As likewise used herein, concept entailment broadly refers to the concept of understanding language, within the context of one piece of information being related to another. For example, if a statement is made that implies 'x', and 'x is known to imply 'y', then by extension, the statement may imply 'y' as well. In this example, there is a chaining of evidence between the statement, 'x', and 'y' that may result in a conclusion supported by the chain of evidence. As another example, based upon the study of philosophy, the statement that Socrates is a person, and all people are mortal, then the implication is that Socrates is mortal.

As yet another example, psycho-social healthcare notes associated with a special needs child may include information resulting from a care provider interviewing various family members. In this example, the concept entailment 1032 cognitive learning technique may be used by the CILS to process the notes. As a result, a set of risk factors, such as transportation challenges, education situations, the potential for domestic abuse, and so forth, may be inferred that were not in the original notes.

To continue the example, if the mother of a special needs child makes a statement that the family car is broken, then the statement implies that there may be a transportation issue. By extension, a transportation issue may imply that the mother may be unable to get the child to the healthcare facility. Further, the inability of the child to get to the healthcare facility may imply missing an appointment, which in turn may imply that the child may not receive the care they have been prescribed. Taking the example one step further, if the child misses their appointment, not only would they not receive their prescribed care, but healthcare resources may not be used as optimally as possible.

As used herein, a contextual recommendation 1034 cognitive learning technique broadly refers to the implementation of an inferred 1008 cognitive learning style, bounded by an interaction-based 1014 cognitive learning category, to perform cognitive learning operations related to contextual recommendations provided to a user. As likewise used herein, a contextual recommendation broadly refers to a recommendation made to a user based upon a particular context.

As an example, a user may perform an online search for a casual, affordable restaurant that is nearby. To continue the example, the user is currently on a low-sodium, gluten-free diet that has been prescribed by their healthcare provider. Additionally, the healthcare provider has recommended that the user walk at least two miles every day. To further continue the example, there may be five casual, affordable restaurants that are in close proximity to the location coordinates provided by the user's mobile device, all of which are presented to the user for consideration.

In response, the user further requests distance information to each of the restaurants, followed by a request to show only those restaurants offering low-sodium, gluten free menu items. As a result of the user interaction, the CILS responds with directions to the only restaurant offering low-sodium, gluten-free dishes. Further, the CILS may recommend the user try a Mediterranean dish, as past interactions has indicated that the user enjoys Mediterranean cuisine. In this example, the contextual recommendation is inferred from a series of interactions with the user.

As a continuation of a prior example, a special needs child may have an appointment at a healthcare facility for a prescribed procedure. However, there is a transportation issue, due to the family automobile being broken. In this example, the inference is the child will miss their appointment unless alternative transportation is arranged. Continuing the example, a contextual recommendation may be made to ask the healthcare facility to provide alternative transportation at their expense, which could then be interactively offered to the patient's mother, who in turn may accept the offer.

In various embodiments, machine learning algorithms 1016 are respectively implemented with a cognitive learning technique by a CILS when performing cognitive learning operations. In one embodiment, a supervised learning 1018 machine learning algorithm may be implemented with a direct correlations 1024 cognitive learning technique, an explicit likes/dislikes 1026 cognitive learning technique, or both.

In another embodiment, an unsupervised learning 1020 machine learning algorithm may be implemented with a patterns and concepts 1028 cognitive learning technique, a behavior 1030 cognitive learning technique, or both. In yet another embodiment, a probabilistic reasoning 1022 machine learning algorithm may be implemented with a concept entailment 1032 cognitive learning technique, a contextual recommendation 1034 cognitive learning technique, or both. Skilled practitioners of the art will recognize that many such embodiments are possible. Accordingly, the foregoing is not intended to limit the spirit, scope or intent of the invention.

As used herein, a supervised learning 1018 machine learning algorithm broadly refers to a machine learning approach for inferring a function from labeled training data. The training data typically consists of a set of training examples, with each example consisting of an input object (e.g., a vector) and a desired output value (e.g., a supervisory signal). In various embodiments, the training data is data associated with a blockchain. In certain embodiments, a supervised learning algorithm is implemented to analyze the training data and produce an inferred function, which can be used for mapping new examples.

As used herein, an unsupervised learning 1020 machine learning algorithm broadly refers to a machine learning approach for finding non-obvious or hidden structures within a set of unlabeled data. In various embodiments, the unsupervised learning 1020 machine learning algorithm is not given a set of training examples. Instead, it attempts to summarize and explain key features of the data it processes. In certain embodiments, the unlabeled data is associated with a blockchain. Examples of unsupervised learning approaches include clustering (e.g., k-means, mixture models, hierarchical clustering, etc.) and latent variable models (e.g., expectation-maximization algorithms, method of moments, blind signal separation techniques, etc.).

As used herein, a probabilistic reasoning 1022 machine learning algorithm broadly refers to a machine learning approach that combines the ability of probability theory to handle uncertainty with the ability of deductive logic to exploit structure. In various embodiments the exploited structure is associated with a blockchain. More specifically, probabilistic reasoning attempts to find a natural extension of traditional logic truth tables. The results they define are derived through probabilistic expressions instead.

In various embodiments, reinforcement learning 1036 approaches are implemented by a CILS in combination with a patterns and concepts 1028, a behavior 1030, a concept entailment 1032, or a contextualization recommendation 1034 cognitive learning technique when performing cognitive learning operations. As used herein, reinforcement learning broadly refers to machine learning approaches inspired by behaviorist psychology, where software agents take actions within an environment to maximize a notion of cumulative reward. Those of skill in the art will be familiar with such reinforcement approaches, which are commonly used in game theory, control theory, operations research, information theory, simulation-based optimization, multi-agent systems, swarm intelligence, statistics, and genetic algorithms.

In certain embodiments, a particular cognitive learning technique may include the implementation of certain aspects of a secondary cognitive learning style, aspects of a secondary learning category, or a combination thereof. As an example, the patterns and concepts 1028 cognitive learning technique may include implementation of certain aspects of the direct correlations 1024 and concept entailment 1032 cognitive learning techniques, and by extension, implementation of certain aspects of the declared 804 and inferred 1008 cognitive learning styles.

As another example, the explicit likes/dislikes 1026 cognitive learning technique may include implementation of certain aspects of the direct correlations 1024 learning technique, and by extension, implementation of certain aspects of the declared 1004 cognitive learning style. As yet another example, the behavior 1030 cognitive learning technique may include certain aspects of both the patterns an concepts 1028 and explicit likes/dislikes 1026 cognitive learning techniques, and by extension, implementation of certain aspects the data-based 1012 cognitive learning category. Skilled practitioners of art will recognize that many such examples are possible. Accordingly, the foregoing is not intended to limit the spirit, scope or intent of the invention.

In various embodiments, the data-based 1012 cognitive learning category, machine learning algorithms 1016, and the interaction-based 1014 cognitive learning category are respectively associated with the source 1040, process 1042 and deliver 1044 steps of a cognitive learning process. As used herein, a cognitive learning process broadly refers to a series of cognitive learning steps performed by a CILS to generate a cognitive learning result.

As likewise used herein, a source 1040 step of a cognitive learning process broadly refers to operations associated with the acquisition of data used by a CILS to perform a cognitive learning operation. Likewise, as used herein, a process 1042 step of a cognitive learning process broadly refers to the use of individual machine learning algorithms 1016 by a CILS to perform cognitive learning operations. As likewise used herein, a deliver 1044 step of a cognitive learning process broadly refers to the delivery of a cognitive insight, which results in an interaction, described in greater detail herein. Information related to, or resulting from, the interaction is then used by a CILS to perform cognitive learning operations.

In various embodiments, the cognitive insight is delivered to a device, an application, a service, a process, a blockchain, a user, or a combination thereof. In certain embodiments, the resulting interaction information is likewise received by a CILS from a device, an application, a service, a process, a blockchain, a user, or a combination thereof. In various embodiments, the resulting interaction information is provided in the form of feedback data to the CILS. In these embodiments, the method by which the cognitive learning process, and its associated cognitive learning steps, is implemented is a matter of design choice. Skilled practitioners of the art will recognize that many such embodiments are possible. Accordingly, the foregoing is not intended to limit the spirit, scope or intent of the invention.

Figure 11A:
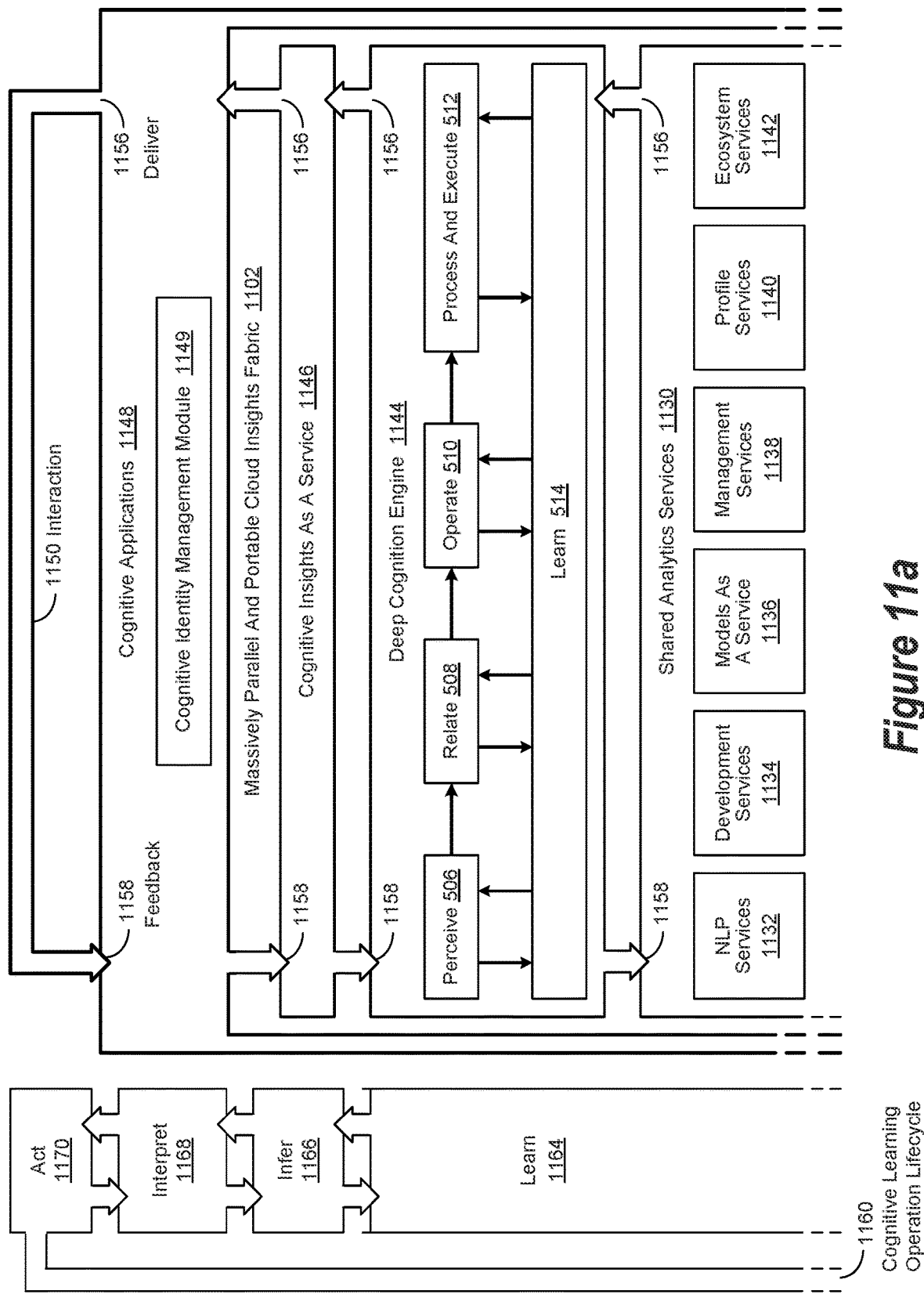
FIGS. 11a and 11b are a simplified block diagram of a CILS used to manage the performance of blockchain-associated cognitive learning operations throughout their lifecycle.
Figure 11B:
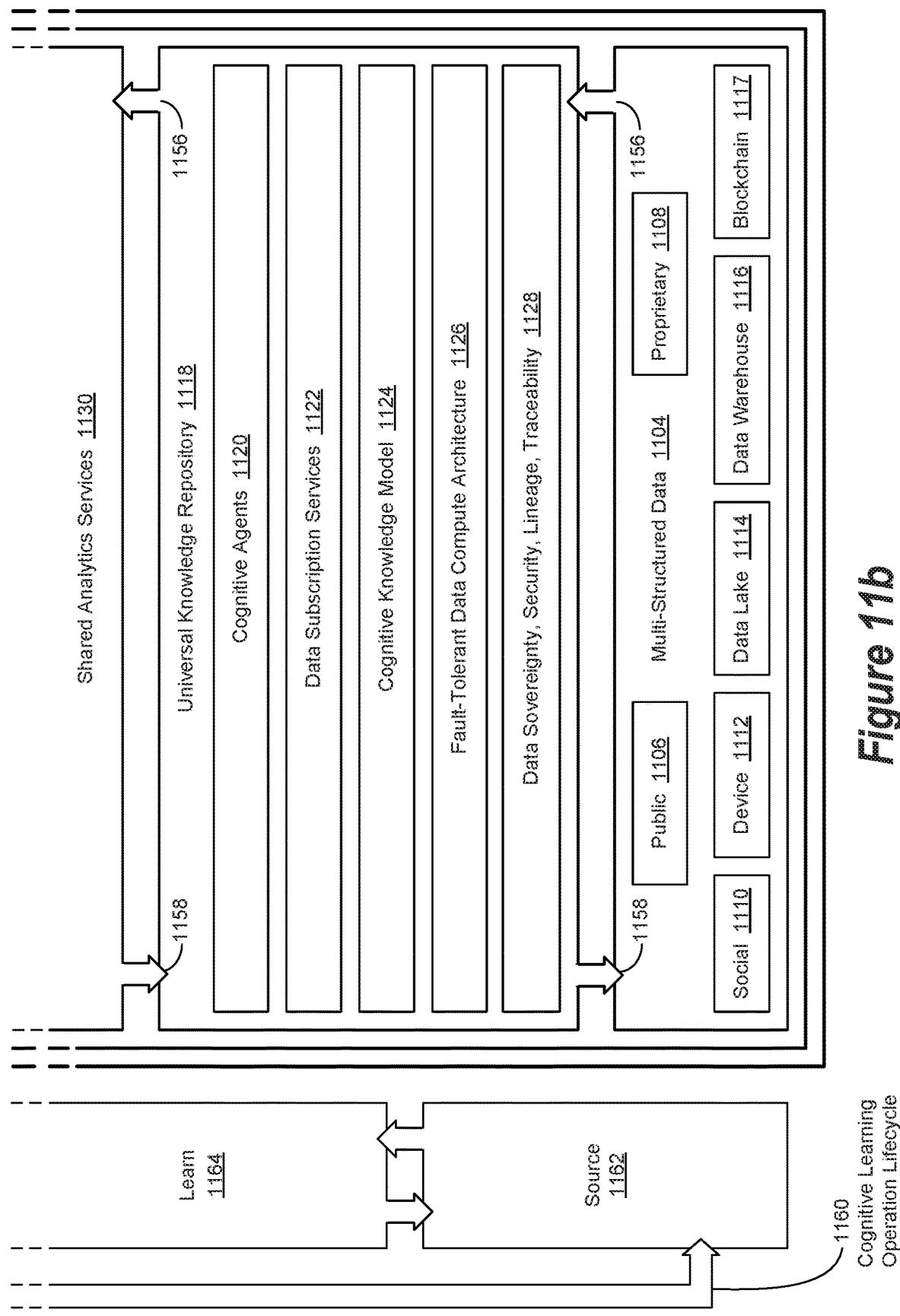

FIGS. 11a and 11b are a simplified block diagram of a Cognitive Learning and Inference System (CILS) implemented in accordance with an embodiment of the invention to manage the performance of blockchain-associated cognitive learning operations throughout their lifecycle. In various embodiments, individual elements of a CILS are implemented within a massively parallel and portable cloud insights fabric 1102. In this embodiment, the individual elements of the CILS include repositories of multi-structured data 1104, a universal knowledge repository 1118, various shared analytics services 1130, a deep cognition engine 1144, and a cognitive insights as a service 1146 module.

In various embodiments, the repositories of multi-structured data 1104 may include public 1106, proprietary 1108, social 1110, device 1112, and other types of data. Examples of such data include emails, social media feeds, news feeds, blogs, doctor's notes, transaction records, blockchain transactions, call logs, and device telemetry streams. In these embodiments, the repositories of multi-structured data 1104 may include unstructured data (e.g., a document), semi-structured data (e.g., a social media post), and structured data (e.g., a string, an integer, etc.), such as data stored in a relational database management system (RDBMS) or a blockchain. In various embodiments, such data may be stored in a data lake 1114, a data warehouse 1116, a blockchain 1117, or some combination thereof.

As shown in FIG. 11b, the universal knowledge repository 1118 includes various cognitive agents 1120, described in greater detail herein, data subscription services 1122, and a cognitive knowledge model 1124. In certain embodiments, the cognitive agents 1120 include a learning agent. As likewise shown in FIG. 11, the universal knowledge repository also includes a fault-tolerant data compute architecture 1126, familiar to those of skill in the art, and a data sovereignty, security, lineage and traceability system 1128.

In various embodiments, individual data subscription services 1122 are implemented to deliver 1156 data on an event-driven basis to the various shared analytics services 1130. In these embodiments, the data provided to the shared analytics services 1130 is retrieved from the cognitive knowledge model 1124. In various embodiments, the cognitive knowledge model 1124 is implemented as one or more cognitive graphs. In certain embodiments, the cognitive graph may be implemented as an application cognitive graph, a cognitive session graph, a cognitive persona, or a cognitive profile, all of which are described in greater detail herein. The method by which the data is provided to the shared analytics services 1130 by the individual data subscription services 1122 is a matter of design choice.

In various embodiments, the fault-tolerant data compute architecture 1126 is implemented to provide an operational framework capable of reliably supporting the other elements of the universal knowledge repository 1118. In these embodiments, fault-tolerant approaches familiar to those of skill in the art are implemented to accommodate needs to perform various cognitive learning operations described in greater detail herein. The method by which these approaches are implemented is a matter of design choice.

In various embodiments, the data sovereignty, security, lineage and traceability system 1128 is implemented to ensure that data ownership rights are observed, data privacy is safeguarded, and data integrity is not compromised. In certain embodiments, data sovereignty, security, lineage and traceability system 1128 is likewise implemented to provide a record of not only the source of the data throughout its lifecycle, but also how it has been used, by whom, and for what purpose. Those of skill in the art will recognize many such embodiments are possible. Accordingly, the foregoing is not intended to limit the spirit, scope or intent of the invention.

In this embodiment, the shared analytics services 1130 includes Natural Language Processing (NLP) 1132 services, development services 1134, models-as-a-service 1136, management services 1138, profile services 1140, and ecosystem services 1142. In various embodiments, the NLP 1132 services include services related to the provision and management of NLP approaches and processes known to skilled practitioners of the art. In these embodiments, NLP 1132 services are implemented by a CILS during the performance of cognitive learning operations, as described in greater detail herein. The method by which individual NLP 1132 services are implemented by the CILS is a matter of design choice.

In various embodiments, the development services 1134 include services related to the management of data and models as they relate to the development of various analytic approaches known skilled practitioners of the art. In certain embodiments, the models-as-a-service 1136 includes services for the management and provision of a model. In various embodiments, the models as a service 1136 may be implemented to create and provide a model composed of other models. In this embodiment, the method by which the models-as-a-service 1136 is implemented to create and provide such a composite model is a matter of design choice. In certain embodiments, the management services 1138 include services related to the management and provision of individual services associated with, or a part of, the shared analytics services 1130.

In various embodiments, the profile services 1140 include services related to the provision and management of cognitive personas and cognitive profiles used by a CILS when performing a cognitive learning operation. As used herein, a cognitive persona broadly refers to an archetype user model that represents a common set of attributes associated with a hypothesized group of users. In various embodiments, the common set of attributes may be described through the use of demographic, geographic, psychographic, behavioristic, and other information. As an example, the demographic information may include age brackets (e.g., 25 to 34 years old), gender, marital status (e.g., single, married, divorced, etc.), family size, income brackets, occupational classifications, educational achievement, and so forth. Likewise, the geographic information may include the cognitive persona's typical living and working locations (e.g., rural, semi-rural, suburban, urban, etc.) as well as characteristics associated with individual locations (e.g., parochial, cosmopolitan, population density, etc.).

The psychographic information may likewise include information related to social class (e.g., upper, middle, lower, etc.), lifestyle (e.g., active, healthy, sedentary, reclusive, etc.), interests (e.g., music, art, sports, etc.), and activities (e.g., hobbies, travel, going to movies or the theatre, etc.). Other psychographic information may be related to opinions, attitudes (e.g., conservative, liberal, etc.), preferences, motivations (e.g., living sustainably, exploring new locations, etc.), and personality characteristics (e.g., extroverted, introverted, etc.) Likewise, the behavioristic information may include information related to knowledge and attitude towards various manufacturers or organizations and the products or services they may provide.

In various embodiments, the behavioristic information is used by a behavior learning technique, described in greater detail herein, in the performance of a cognitive learning operation. To continue the example, the behavioristic information may be related to brand loyalty, interest in purchasing a product or using a service, usage rates, perceived benefits, and so forth. Skilled practitioners of the art will recognize that many such attributes are possible. Accordingly, the foregoing is not intended to limit the spirit, scope or intent of the invention.

In various embodiments, one or more cognitive personas may be associated with a particular user. In certain embodiments, a cognitive persona is selected and then used by a CILS to generate one or more blockchain-associated cognitive insights as described in greater detail herein. In these embodiments, the blockchain-associated cognitive insights that are generated for a user as a result of using a first cognitive persona may be different than the blockchain-associated cognitive insights that are generated as a result of using a second cognitive persona. In various embodiments, a cognitive identity management module 1149 is implemented to access cognitive persona and cognitive profile information associated with a user. In certain embodiments, the cognitive identity management module 1149 is implemented to verify the identity of a particular user.

In various embodiments, provision of blockchain-associated cognitive insights, or composite cognitive insights, results in the CILS receiving feedback 1158 data from various individual users and other sources, such as cognitive applications 1148. In one embodiment, the feedback 1158 data is used to revise or modify a cognitive persona. In another embodiment, the feedback 1158 data is used to create a new cognitive persona. In yet another embodiment, the feedback 1158 data is used to create one or more associated cognitive personas, which inherit a common set of attributes from a source cognitive persona. In one embodiment, the feedback 1158 data is used to create a new cognitive persona that combines attributes from two or more source cognitive personas. In another embodiment, the feedback 1158 data is used to create a cognitive profile, described in greater detail herein, based upon the cognitive persona. Those of skill in the art will realize that many such embodiments are possible. Accordingly, the foregoing is not intended to limit the spirit, scope or intent of the invention.

As used herein, a cognitive profile refers to an instance of a cognitive persona that references personal data associated with a particular user. In various embodiments, the personal data may include the user's name, address, Social Security Number (SSN), age, gender, marital status, occupation, employer, income, education, skills, knowledge, interests, preferences, likes and dislikes, goals and plans, and so forth. In certain embodiments, the personal data may include data associated with the user's interaction with a CILS and related blockchain-associated cognitive insights that are generated and provided to the user. In various embodiments, the user's interaction with a CILS may be provided to the CILS as feedback 1158 data.

In various embodiments, the personal data may be distributed. In certain of these embodiments, subsets of the distributed personal data may be logically aggregated to generate one or more cognitive profiles, each of which is associated with the user. In various embodiments, subsets of a cognitive persona or cognitive profile associated with a user are used in the generation of a blockchain-associated cognitive insight, as described in greater detail herein. In certain embodiments, the subsets of a cognitive persona or cognitive profile associated with a user are used in combination with a smart contract to conduct a blockchain transaction associated with a blockchain-associated cognitive insight. Skilled practitioners of the art will recognize that many such embodiments are possible. Accordingly, the foregoing is not intended to limit the spirit, scope or intent of the invention.

In various embodiments, a cognitive persona or cognitive profile is defined by a first set of nodes in a weighted cognitive graph. In these embodiments, the cognitive persona or cognitive profile is further defined by a set of attributes that are respectively associated with a set of corresponding nodes in the weighted cognitive graph. In various embodiments, an attribute weight is used to represent a relevance value between two attributes. For example, a higher numeric value (e.g., '5.0') associated with an attribute weight may indicate a higher degree of relevance between two attributes, while a lower numeric value (e.g., '0.5') may indicate a lower degree of relevance.

In various embodiments, the numeric value associated with attribute weights may change as a result of the performance of blockchain-associated cognitive insight and feedback 1158 operations described in greater detail herein. In one embodiment, the changed numeric values associated with the attribute weights may be used to modify an existing cognitive persona or cognitive profile. In another embodiment, the changed numeric values associated with the attribute weights may be used to generate a new cognitive persona or cognitive profile. In certain embodiments, various ecosystem services 1142 are implemented to manage various aspects of the CILS infrastructure, such as interaction with external services. The method by which these various aspects are managed is a matter of design choice.

In various embodiments, the deep cognition engine 1144 is implemented to provide deep contextual understanding and interpretation as various cognitive learning operations, described in greater detail herein, are being performed by a CILS. In certain embodiments, the deep cognition engine 1144 may include a perceive 506 phase, a relate 508 phase, an operate 510 phase, a process and execute 512 phase, and a learn 514 phase. In various embodiments, streams of data are sourced from the repositories of multi-structured data 1104 are delivered 1156 by sourcing agents, described in greater detail herein to the deep cognition engine 1144. In these embodiments, the source streams of data are dynamically ingested in real-time during the perceive 506 phase, and based upon a particular context, extraction, parsing, and tagging operations are performed on language, text and images contained therein.

Automatic feature extraction and modeling operations are then performed with the previously processed source streams of data during the relate 508 phase to generate queries to identify related data. In various embodiments, cognitive learning operations are performed during the operate 510 phase to discover, summarize and prioritize various concepts, described in greater detail herein, which are in turn used to generate actionable recommendations and notifications associated. The resulting actionable recommendations and notifications are then processed during the process and execute 512 phase to deliver 1156 blockchain-associated cognitive insights, such as recommendations, to the cognitive insights as a service 1146 module.

In various embodiments, features from newly-observed data are automatically extracted from user interaction 950 during the learn 514 phase to improve various analytical models. In these embodiments, the learn 514 phase includes feedback 1158 data associated with observations generated during the relate 508 phase, which is provided to the perceive 506 phase. Likewise, feedback 1158 data on decisions resulting from operations performed during the operate 510 phase, and feedback 1158 data related to results resulting from operations performed during the process and execute 512 phase, are also provided to the perceive 506 phase.

In various embodiments, user interactions 950 result from operations performed during the process and execute 512 phase. In these embodiments, data associated with the user interactions 1150 is provided as feedback 1158 data to the perceive 506 phase. As an example, a first query from a user may be submitted to the CILS system, which in turn generates a first cognitive insight, which is then provided to the user. In response, the user may respond by providing a first response, or perhaps a second query, either of which is provided in the same context as the first query. The CILS receives the first response or second query, performs various cognitive learning operations, and provides the user a second cognitive insight. As before, the user may respond with a second response or a third query, in the context of the first or second query. Once again, the CILS performs various cognitive learning operations and provides the user a third cognitive insight, and so forth.

In various embodiments, data may be delivered 1156 from the repositories of multi-structured data 1104 to the universal knowledge repository 1118, which in turn may deliver 1156 data to individual shared analytics services 1130. In turn, individual shared analytics services 1130 may deliver 1156 resulting data to the deep cognition engine 1144. Likewise, the deep cognition engine 1144 may in turn deliver 1156 data to the cognitive insights as a service 1146. In turn, the cognitive insights as a service 1146 module may deliver data to various cognitive applications 1148.

In certain embodiments, the data delivered 1156 by the cognitive insights as a service 1146 to the various cognitive applications 1148 includes blockchain-associated cognitive insights, described in greater detail herein. In various embodiments, the various cognitive applications 1148 may provide data, including blockchain-associated cognitive insights and composite cognitive insights for interaction 1150, described in greater detail herein. In certain embodiments, the interaction may include user interaction resulting in the provision of user input data, likewise described in greater detail herein.

In various embodiments, the interaction results in the provision of feedback 1158 data to the various cognitive applications 1148, where it may be provided as feedback 1158 data to the cognitive insights as a service 1146 module. Likewise, the cognitive insights as a service 1146 module may provide resulting feedback 1158 data to the deep cognition engine 1144 for processing. In turn, the deep cognition engine 1144 may provide resulting feedback 1158 data to individual shared analytics services 1130, which likewise may provide resulting feedback 1158 data to the universal knowledge repository 1118.

In certain embodiments, the feedback 1158 data provided to the universal knowledge repository 1118 is used, as described in greater detail herein, to update the cognitive knowledge model 1124. In various embodiments, the universal knowledge repository 1118 may likewise provide feedback 1158 data to various repositories of multi-structured data 1104. In certain embodiments, the feedback 1158 data is used to update repositories of multi-structured data 1104. In these embodiments, the feedback 1158 data may include updated data, new data, metadata, or a combination thereof.

In various embodiments, a first CILS element may iteratively deliver 1156 data to, and receive resulting feedback 1158 data from, a second CILS element prior to the second CILS element delivers data to a third CILS element. As an example, the universal knowledge repository 1118 may deliver 1156 a first set of data to the NLP services 1132, which results in a first set of feedback 1158 data being returned to the universal knowledge repository 1118. As a result of receiving the first set of feedback 1158 data, the universal knowledge repository 1118 may provide a second set of data to the models-as-a-service 1136, which results in the generation of a second set of data. In this example, the second set of data is then delivered 1156 to the deep cognition engine 1144.

In one embodiment, the feedback 1158 data received as a result of an interaction 1150 is provided to each of the individual CILS elements. In another embodiment, feedback 1158 data received from one CILS element is modified before it is provided as modified feedback 1158 data to another CILS element. In yet another embodiment, feedback 1158 data received from one CILS element is not modified before it is provided as unmodified feedback 1158 data to another CILS element. Skilled practitioners will recognize that many such embodiments are possible. Accordingly, the foregoing is not intended to limit the spirit, scope or intent of the invention.

In various embodiments, the CILS is implemented to manage the lifecycle 1160 of a cognitive learning operation. In this embodiment, the cognitive learning operation lifecycle 1160 includes a source 1162, a learn 1165, an infer 1166, an interpret 1168 and an act 1170 lifecycle phase. As shown in FIG. 11, the source 1162, the learn 1165, the infer 1166, the interpret 1168, and act 1170 lifecycle phases can interact with one another by providing and receiving data between adjacent phases. In addition, the act 1170 phase can provide data to the source 1162 phase. In certain embodiments, the data the act 1107 phase provides to the source 1162 phase included feedback data resulting from an interaction, described in greater detail herein.

In various embodiments, the source 1162 lifecycle phase is implemented to acquire data from the repositories of multi-structured data 1104, which in turn is provided to the universal knowledge repository 1118. In one embodiment, the data is provided to the cognitive knowledge model 1124 via the implementation of the fault-tolerant data compute architecture 1126. In another embodiment, the data sovereignty, security, lineage and traceability system 1128 is implemented to ensure that data ownership rights are observed, data privacy is safeguarded, and data integrity is not compromised during the source 1162 lifecycle phase. In certain embodiments, data sovereignty, security, lineage and traceability system 1128 is likewise implemented to provide a record of not only the source of the data throughout its lifecycle, but also how it has been used, by whom, and for what purpose.

In various embodiments, the learn 1164 lifecycle phase is implemented to manage cognitive learning operations being performed by a CILS, as described in greater detail herein. In certain embodiments, cognitive agents 1120 are used in the performance of these cognitive learning operations. In one embodiment, a learning agent is used in the performance of certain cognitive learning operations, as described in greater detail herein.

In various embodiments, the infer 1166 lifecycle phase is implemented to perform cognitive learning operations, described in greater detail herein. In certain embodiments, an inferred learning style, described in greater detail herein, is implemented by the CILS to perform these cognitive learning operations. In one embodiment, a concept entailment cognitive learning technique is implemented by the CILS to perform a cognitive learning operation in the infer 1166 lifecycle phase. In another embodiment, a contextual recommendation cognitive learning technique is implemented by the CILS to perform a cognitive learning operation in the infer 1166 lifecycle phase.

In these embodiments, the CILS may implement a probabilistic reasoning machine learning algorithm, described in greater detail herein, in combination with the concept entailment or contextual recommendation cognitive learning technique. In certain embodiments, the CILS may implement a reinforcement learning approach, likewise described in greater detail herein, in combination with the concept entailment or contextual recommendation cognitive learning technique. Skilled practitioners of the art will recognize that many such embodiments are possible. Accordingly, the foregoing is not intended to limit the spirit, scope or intent of the invention.

In various embodiments, the interpret 1168 lifecycle phase is implemented to interpret the results of a cognitive learning operation such that they are consumable by a recipient, and by extension, present it in a form that is actionable in the act 1170 lifecycle phase. In various embodiments, the act 1170 lifecycle phase is implemented to support an interaction 1150, described in greater detail herein. In certain embodiments, the interaction 1150 includes interactions with a user, likewise described in greater detail herein. Skilled practitioners of the art will recognize that many such embodiments are possible. Accordingly, the foregoing is not intended to limit the spirit, scope or intent of the invention.

Figure 12A:
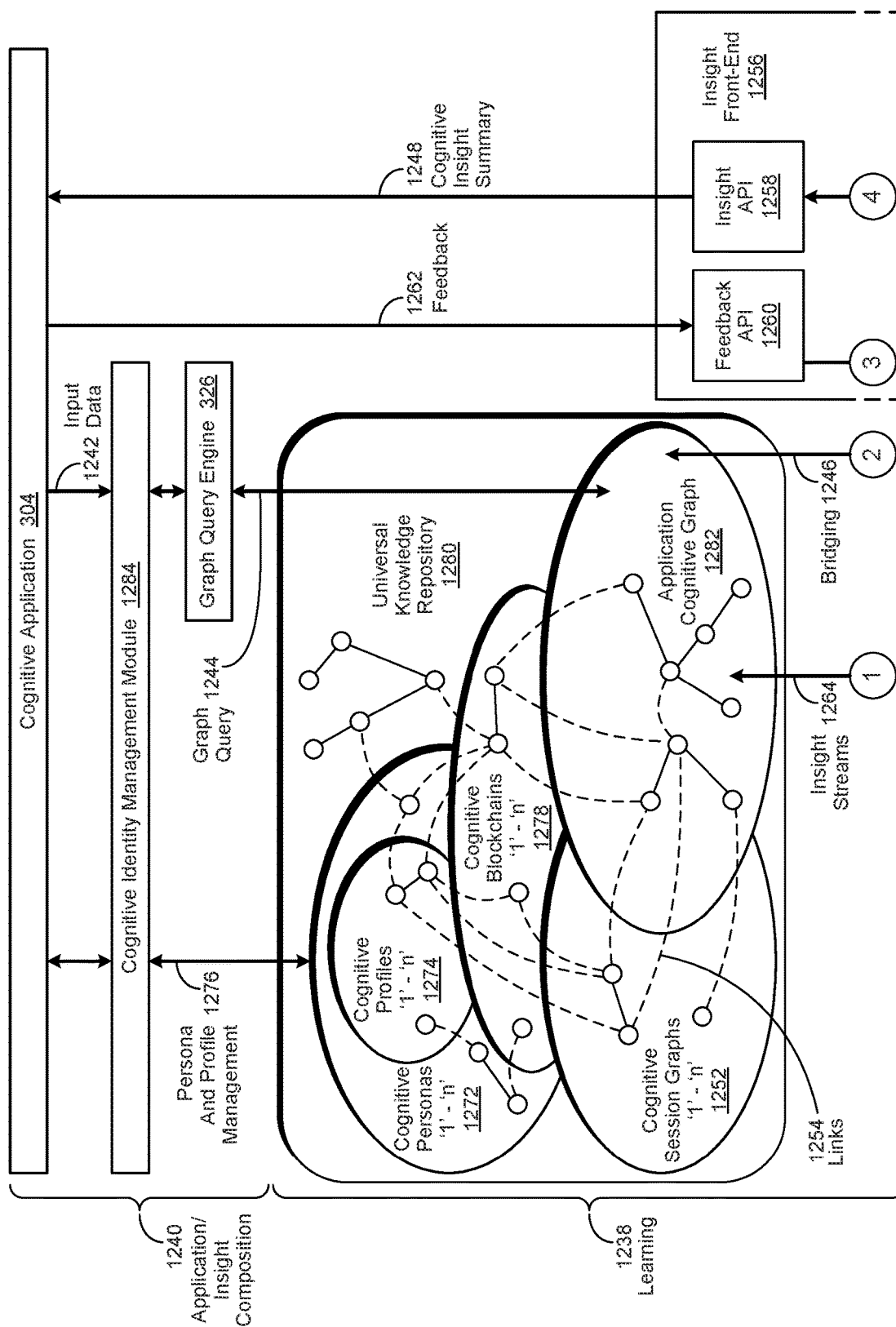
FIGS. 12a and 12b are a simplified process flow diagram showing the generation of blockchain-associated cognitive insights by a CILS.
Figure 12B:
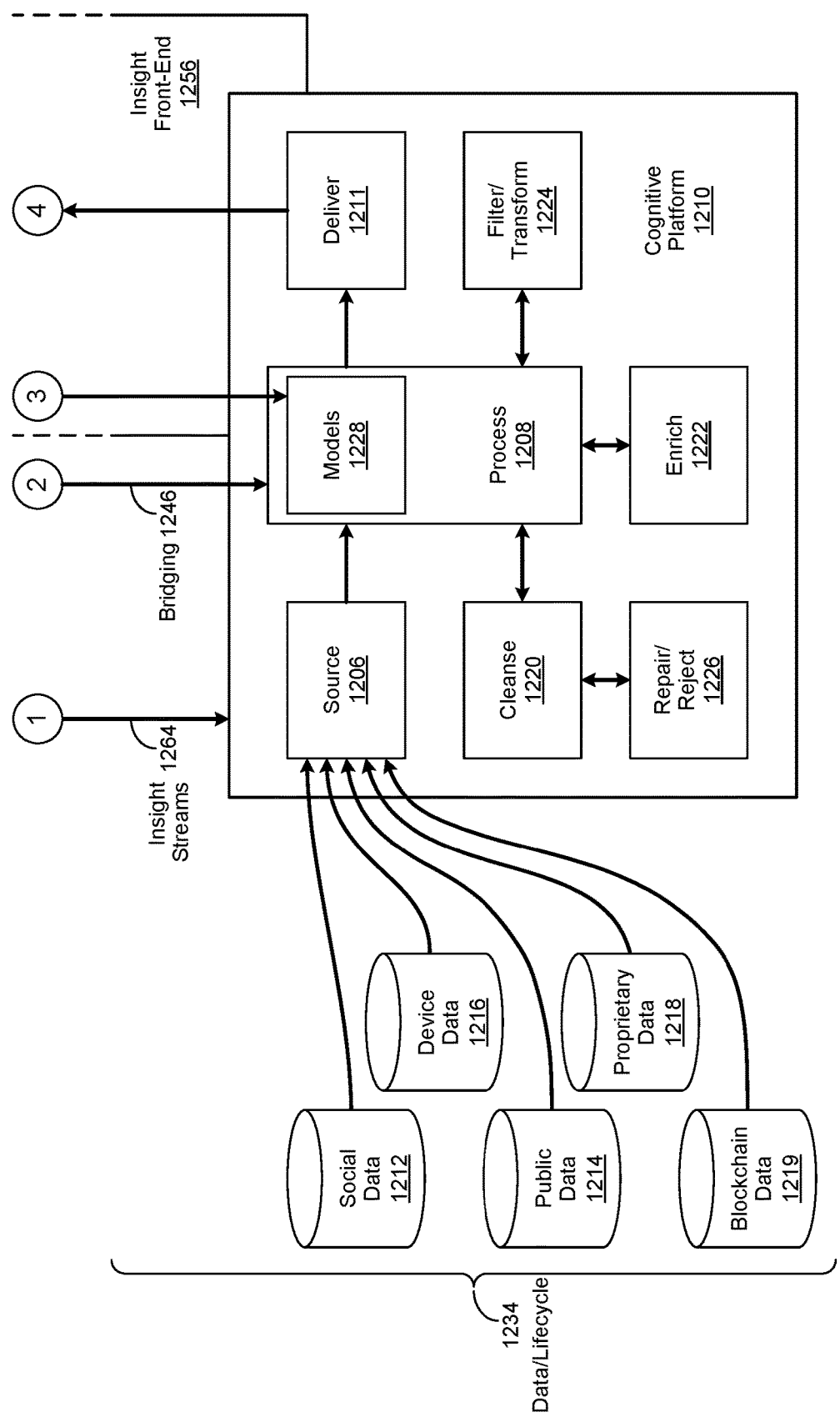

FIGS. 12a and 12b are a simplified process flow diagram showing the generation of blockchain-associated cognitive insights by a Cognitive Inference and Learning System (CILS) implemented in accordance with an embodiment of the invention. As used herein, a blockchain-associated cognitive insight broadly refers to a cognitive insight that is generated at least in part through the use of blockchain data, or alternatively, provided in the form of a blockchain transaction, described in greater detail herein. As likewise used herein, blockchain data broadly refers to any data associated with a given blockchain, whether it is related to the data structure of the blockchain as a whole or its individual elements, the individual data elements it may contain, or its associated metadata. Likewise, blockchain data also broadly refers to the rules and parameters of a corresponding blockchain's operation, the protocols related to its interaction with applications and other blockchains, or its corresponding Application Program Interface (API).

In various embodiments, insight agents use a cognitive graph, such as an application cognitive graph 1282, and various cognitive blockchain knowledge repositories '1' through 'n' 1278, described in greater detail herein, as their data sources to respectively generate individual blockchain-associated cognitive insights. In certain embodiments, the blockchain knowledge repositories '1' through 'n' 1278 are implemented as a cognitive graph. As used herein, an application cognitive graph 1282 broadly refers to a cognitive graph that is associated with a particular cognitive application 304. In various embodiments, different cognitive applications 304 may interact with different application cognitive graphs 1282, and various cognitive blockchain knowledge repositories '1' through 'n' 1278, to generate individual blockchain-associated cognitive insights for a user. In certain embodiments, the resulting individual blockchain-associated cognitive insights are then composed to generate a set of blockchain-associated cognitive insights, which in turn is provided to a user in the form of a cognitive insight summary 1248.

In various embodiments, the orchestration of the selected insight agents is performed by the cognitive insight/learning engine 330 shown in FIGS. 3 and 4*a*. In certain embodiments, a subset of insight agents is selected to provide blockchain-associated cognitive insights to satisfy a graph query 1244, a contextual situation, or some combination thereof. For example, it may be determined, as likewise described in greater detail herein, that a particular subset of insight agents may be suited to provide a blockchain-associated cognitive insight related to a particular user of a particular device, at a particular location, at a particular time, for a particular purpose.

In certain embodiments, the insight agents are selected for orchestration as a result of receiving direct or indirect input data 1242 from a user. In various embodiments, the direct user input data 1242 may be a natural language inquiry. In certain embodiments, the indirect user input data 1242 may include the location of a user's device or the purpose for which it is being used. As an example, the Geographical Positioning System (GPS) coordinates of the location of a user's mobile device may be received as indirect user input data 1242. As another example, a user may be using the integrated camera of their mobile device to take a photograph of a location, such as a restaurant, or an item, such as a food product.

In certain embodiments, the direct or indirect user input data 1242 may include personal information that can be used to identify the user. In various embodiments, a cognitive identity management module 1284 is implemented to manage personal information associated with the user. In certain embodiments, the cognitive identity management module 1284 is implemented to manage the provision of certain personal information associated with the user for inclusion in a blockchain-associated cognitive insight. In various embodiments, the cognitive identity management module 1284 is implemented to interact with one or more cognitive applications 304. In certain of these embodiments, the cognitive identity management module 1284 is implemented encrypt certain personal information associated with a user prior to its inclusion in a blockchain-associated cognitive insight. Skilled practitioners of the art will recognize that many such embodiments are possible. Accordingly, the foregoing is not intended to limit the spirit, scope or intent of the invention.

In various embodiments, blockchain-associated cognitive insight generation and associated feedback operations may be performed in various phases. In this embodiment, these phases include a data lifecycle 1234 phase, a learning 1238 phase, and an application/insight composition 1240 phase. In the data lifecycle 1234 phase, an instantiation of a cognitive platform 1210 sources social data 1212, public data 1214, device data 1216, proprietary data 1218, and blockchain data 1219 from various sources as described in greater detail herein. In various embodiments, an example of a cognitive platform 1210 instantiation is the cognitive platform 310 shown in FIGS. 3, 4*a*, and 4*b*. In this embodiment, the instantiation of a cognitive platform 1210 includes a source 1206 component, a process 1208 component, a deliver 1211 component, a cleanse 1220 component, an enrich 1222 component, a filter/transform 1224 component, and a repair/reject 1226 component. Likewise, as shown in FIG. 12*a*, the process 1208 component includes a repository of models 1228, described in greater detail herein.

In various embodiments, the process 1208 component is implemented to perform various blockchain-associated insight generation and other processing operations described in greater detail herein. In these embodiments, the process 1208 component is implemented to interact with the source 1206 component, which in turn is implemented to perform various data sourcing operations described in greater detail herein. In various embodiments, the sourcing operations are performed by one or more sourcing agents, as likewise described in greater detail herein. The resulting sourced data is then provided to the process 1208 component. In turn, the process 1208 component is implemented to interact with the cleanse 1220 component, which is implemented to perform various data cleansing operations familiar to those of skill in the art. As an example, the cleanse 1220 component may perform data normalization or pruning operations, likewise known to skilled practitioners of the art. In certain embodiments, the cleanse 1220 component may be implemented to interact with the repair/reject 1226 component, which in turn is implemented to perform various data repair or data rejection operations known to those of skill in the art.

Once data cleansing, repair and rejection operations are completed, the process 1208 component is implemented to interact with the enrich 1222 component, which is implemented in various embodiments to perform various data enrichment operations described in greater detail herein. Once data enrichment operations have been completed, the process 1208 component is likewise implemented to interact with the filter/transform 1224 component, which in turn is implemented to perform data filtering and transformation operations described in greater detail herein.

In various embodiments, the process 1208 component is implemented to generate various models, described in greater detail herein, which are stored in the repository of models 1228. The process 1208 component is likewise implemented in various embodiments to use the sourced data to generate one or more cognitive graphs, such as an application cognitive graph 1282 and the repository of cognitive blockchain knowledge '1' through 'n' 1278, as likewise described in greater detail herein. In various embodiments, the process 1208 component is implemented to gain an understanding of the data sourced from the sources of social data 1212, public data 1214, device data 1216, proprietary data 1218, and blockchain data 1219, which assist in the automated generation of the application cognitive graph 1282 and the repository of cognitive blockchain knowledge '1' through 'n' 1278.

The process 1208 component is likewise implemented in various embodiments to perform bridging 1246 operations, described in greater detail herein, to access the application cognitive graph 1282 and the repository of cognitive blockchain knowledge '1' through 'n' 1278. In certain embodiments, the bridging 1246 operations are performed by bridging agents, likewise described in greater detail herein. In various embodiments, the application cognitive graph 1282 and the repository of cognitive blockchain knowledge '1' through 'n' 1278 is accessed by the process 1208 component during the learn 1238 phase of the blockchain-associated cognitive insight generation operations.

In various embodiments, a cognitive application 304 is implemented to receive input data associated with an individual user or a group of users. In these embodiments, the input data may be direct, such as a user query or mouse click, or indirect, such as the current time or Geographical Positioning System (GPS) data received from a mobile device associated with a user. In various embodiments, the indirect input data may include contextual data, described in greater detail herein. Once it is received, the input data 1242 is then submitted by the cognitive application 304 to a graph query engine 326 during the application/insight composition 1240 phase. In various embodiments, an inferred learning style, described in greater detail herein, is implemented by the CILS to perform cognitive learning operation. In certain embodiments, the CILS is likewise implemented to interpret the results of the cognitive learning operations such that they are consumable by a recipient, and by extension, present them in a form that this actionable in act 1170 phase. In various embodiments, the act 1170 phase is implemented to support an interaction 950, described in greater detail herein.

The submitted input data 1242 is then processed by the graph query engine 326 to generate a graph query 1244, as described in greater detail herein. The graph query 1244 is then used to query the application cognitive graph 1282, which results in the generation of one or more blockchain-associated cognitive insights, likewise described in greater detail herein. In certain embodiments, the graph query 1244 uses knowledge elements stored in the universal knowledge repository 1280 and the repository of cognitive blockchain knowledge '1' through 'n' 1278 when querying the application cognitive graph 1282 to generate the one or more blockchain-associated cognitive insights.

In various embodiments, the graph query 1244 results in the selection of a cognitive persona from a repository of cognitive personas '1' through 'n' 1272, according to a set of contextual information associated with a user. As used herein, a cognitive persona broadly refers to an archetype user model that represents a common set of attributes associated with a hypothesized group of users. In various embodiments, the common set of attributes may be described through the use of demographic, geographic, psychographic, behavioristic, and other information. As an example, the demographic information may include age brackets (e.g., 25 to 34 years old), gender, marital status (e.g., single, married, divorced, etc.), family size, income brackets, occupational classifications, educational achievement, and so forth. Likewise, the geographic information may include the cognitive persona's typical living and working locations (e.g., rural, semi-rural, suburban, urban, etc.) as well as characteristics associated with individual locations (e.g., parochial, cosmopolitan, population density, etc.).

The psychographic information may likewise include information related to social class (e.g., upper, middle, lower, etc.), lifestyle (e.g., active, healthy, sedentary, reclusive, etc.), interests (e.g., music, art, sports, etc.), and activities (e.g., hobbies, travel, going to movies or the theatre, etc.). Other psychographic information may be related to opinions, attitudes (e.g., conservative, liberal, etc.), preferences, motivations (e.g., living sustainably, exploring new locations, etc.), and personality characteristics (e.g., extroverted, introverted, etc.) Likewise, the behavioristic information may include information related to knowledge and attitude towards various manufacturers or organizations and the products or services they may provide.

In various embodiments, one or more cognitive personas may be associated with a user. In certain embodiments, a cognitive persona is selected and then used by a CILS to generate one or more blockchain-associated cognitive insights as described in greater detail herein. In these embodiments, the blockchain-associated cognitive insights that are generated for a user as a result of using a first cognitive persona may be different than the blockchain-associated cognitive insights that are generated as a result of using a second cognitive persona.

In various embodiments, provision of the blockchain-associated cognitive insights results in the CILS receiving feedback 1762 data from various individual users and other sources, such as a cognitive application 304. In one embodiment, the feedback 1762 data is used to revise or modify the cognitive persona. In another embodiment, the feedback 1762 data is used to create a new cognitive persona. In yet another embodiment, the feedback 1762 data is used to create one or more associated cognitive personas, which inherit a common set of attributes from a source cognitive persona. In one embodiment, the feedback 1762 data is used to create a new cognitive persona that combines attributes from two or more source cognitive personas. In another embodiment, the feedback 1762 data is used to create a cognitive profile, described in greater detail herein, based upon the cognitive persona. Those of skill in the art will realize that many such embodiments are possible. Accordingly, the foregoing is not intended to limit the spirit, scope or intent of the invention.

In certain embodiments, the universal knowledge repository 1280 includes the repository of personas '1' through 'n' 1272. In various embodiments, a repository of cognitive profiles '1' through 'n' 1274 is included in the repository of personas '1' through 'n' 1272. In certain embodiments, the universal knowledge repository 1280 may contain a repository of session graphs '1' through 'n' 1252. In various embodiments, the universal knowledge repository 1280 may contain the repository of cognitive blockchain knowledge '1' through 'n' 1278. In certain embodiments, the repository of personas '1' through 'n' 1272, the repository of cognitive profiles '1' through 'n' 1274, and the repository of cognitive blockchain knowledge '1' through 'n' 1278 are implemented as cognitive graphs.

In various embodiments, individual nodes within cognitive personas stored in the repository of personas '1' through 'n' 1272 are linked 1254 to corresponding nodes in the universal knowledge repository 1280. In certain embodiments, individual nodes within cognitive personas stored in the repository of personas '1' through 'n' 1272 are linked 1254 to corresponding nodes in the repository of cognitive profiles '1' through 'n' 1274. In various embodiments, individual nodes within the repository of personas '1' through 'n' 1272, and individual nodes within the cognitive profiles '1' through 'n' 1274, are linked 1254 to corresponding nodes in the repository of cognitive blockchain knowledge '1' through 'n' 1278. In certain embodiments, individual nodes within the repository of cognitive profiles '1' through 'n' 1274 are linked 1254 to corresponding nodes within the universal knowledge repository 1280, which are likewise linked 1254 to corresponding nodes within the cognitive application graph 1282.

As used herein, contextual information broadly refers to information associated with a location, a point in time, a user role, an activity, a circumstance, an interest, a desire, a perception, an objective, or a combination thereof. In various embodiments, the contextual information is likewise used in combination with the selected cognitive persona to generate one or more blockchain-associated cognitive insights for a user. In certain embodiments, the contextual information may likewise be used in combination with the selected cognitive persona to perform one or more associated cognitive learning operations. In various embodiments, the blockchain-associated cognitive insights that are generated for a user as a result of using a first set of contextual information may be different than the blockchain-associated cognitive insights that are generated as a result of using a second set of contextual information.

In one embodiment, the result of using a first set of contextual information in combination with the selected cognitive persona to perform an associated cognitive learning operation may be different than the result of using a second set of contextual information in combination with the selected cognitive persona to perform the same cognitive learning operation. In another embodiment, the blockchain-associated cognitive insights that are generated for a user as a result of using a set of contextual information with a first cognitive persona may be different than the blockchain-associated cognitive insights that are generated as a result of using the same set of contextual information with a second cognitive persona. In yet another embodiment, the result of using a set of contextual information in combination with a first cognitive persona to perform an associated cognitive learning operation may be different than the result of using the same set of contextual information in combination with a second cognitive persona to perform the same cognitive learning operation.

As an example, a user may have two associated cognitive personas, "purchasing agent" and "retail shopper," which are respectively selected according to two sets of contextual information. In this example, the "purchasing agent" cognitive persona may be selected according to a first set of contextual information associated with the user performing business purchasing activities in their office during business hours, with the objective of finding the best price for a particular commercial inventory item. Conversely, the "retail shopper" cognitive persona may be selected according to a second set of contextual information associated with the user performing cognitive personal shopping activities in their home over a weekend, with the objective of finding a decorative item that most closely matches their current furnishings.

Those of skill in the art will realize that the blockchain-associated cognitive insights generated as a result of combining the first cognitive persona with the first set of contextual information will likely be different than the blockchain-associated cognitive insights generated as a result of combining the second cognitive persona with the second set of contextual information. Likewise, the result of a cognitive learning operation that uses the first cognitive persona in combination with the first set of contextual information will likely be different that the result of a cognitive learning operation that uses a second cognitive persona in combination with a second set of contextual information.

In various embodiments, the graph query 1244 results in the selection of a cognitive profile from a repository of cognitive profiles '1' through 'n' 1274 according to identification information associated with a user. As used herein, a cognitive profile refers to an instance of a cognitive persona that references personal data associated with a user. In various embodiments, the personal data may include the user's name, address, Social Security Number (SSN), age, gender, marital status, occupation, employer, income, education, skills, knowledge, interests, preferences, likes and dislikes, goals and plans, and so forth. In certain embodiments, the personal data may include data associated with the user's interaction with a CILS, various public and blockchains, such as those shown in FIG. 9, and related blockchain-associated cognitive insights that are generated and provided to the user.

In various embodiments, the personal data may be distributed. In certain of these embodiments, subsets of the distributed personal data may be logically aggregated to generate one or more blockchain-associated cognitive profiles, each of which is associated with the user. In various embodiments, the user's interaction with a CILS may be provided to the CILS as feedback 1762 data. Skilled practitioners of the art will recognize that many such embodiments are possible. Accordingly, the foregoing is not intended to limit the spirit, scope or intent of the invention.

In various embodiments, a cognitive persona or cognitive profile is defined by a first set of nodes in a weighted cognitive graph. In these embodiments, the cognitive persona or cognitive profile is further defined by a set of attributes that are respectively associated with a set of corresponding nodes in the weighted cognitive graph. In various embodiments, an attribute weight is used to represent a relevance value between two attributes. For example, a higher numeric value (e.g., '5.0') associated with an attribute weight may indicate a higher degree of relevance between two attributes, while a lower numeric value (e.g., '0.5') may indicate a lower degree of relevance.

In various embodiments, the numeric value associated with attribute weights may change as a result of the performance of blockchain-associated cognitive insight and feedback 1762 operations described in greater detail herein. In one embodiment, the changed numeric values associated with the attribute weights may be used to modify an existing cognitive persona or cognitive profile. In another embodiment, the changed numeric values associated with the attribute weights may be used to generate a new cognitive persona or cognitive profile. In these embodiments, a cognitive profile is selected and then used by a CILS to generate one or more blockchain-associated cognitive insights for the user as described in greater detail herein. In certain of these embodiments, the selected cognitive profile provides a basis for adaptive changes to the CILS, and by extension, the blockchain-associated cognitive insights it generates. In various embodiments, a cognitive profile may likewise by selected and then used by a CILS to perform one or more cognitive learning operations as described in greater detail herein. In certain of these embodiments, the results of the one or more cognitive learning operations may likewise provide a basis for adaptive changes to the CILS, and by extension, the blockchain-associated cognitive insights it generates.

In various embodiments, provision of the blockchain-associated cognitive insights results in the CILS receiving feedback 1262 information related to an individual user. In one embodiment, the feedback 1262 information is used to revise or modify a cognitive persona. In another embodiment, the feedback 1262 information is used to revise or modify a cognitive profile associated with a user. In yet another embodiment, the feedback 1262 information is used to create a new cognitive profile, which in turn is stored in the repository of cognitive profiles '1' through 'n' 1274. In still yet another embodiment, the feedback 1262 information is used to create one or more associated cognitive profiles, which inherit a common set of attributes from a source cognitive profile. In another embodiment, the feedback 1262 information is used to create a new cognitive profile that combines attributes from two or more source cognitive profiles. In various embodiments, these persona and profile management operations 1276 are performed through interactions between the cognitive application 304, the cognitive identity management module 1284, the repository of cognitive personas '1' through 'n' 1272, the repository of cognitive profiles '1' through 'n' 1274, the repository of cognitive blockchain knowledge '1' through 'n' 1278, repository of cognitive session graphs '1' through 'n' 1252, the universal knowledge repository 1280, or some combination thereof.

In various embodiments, the feedback 1262 is generated as a result of an interaction 950. In various embodiments, the interaction 950 may be between any combination of devices, applications, services, processes, or users. In certain embodiments, the interaction 950 may be explicitly or implicitly initiated by the provision of input data to the devices, applications, services, processes or users. In various embodiments, the input data may be provided in response to a blockchain-associated cognitive insight provided by a CILS. In one embodiment, the input data may include a user gesture, such as a key stroke, mouse click, finger swipe, or eye movement. In another embodiment, the input data may include a voice command from a user.

In yet another embodiment, the input data may include data associated with a user, such as biometric data (e.g., retina scan, fingerprint, body temperature, pulse rate, etc.). In yet still another embodiment, the input data may include environmental data (e.g., current temperature, etc.), location data (e.g., geographical positioning system coordinates, etc.), device data (e.g., telemetry data, etc.), or other data provided by a device, application, service, process or user. In these embodiments, the feedback 1262 may be used to perform various cognitive learning operations, the results of which are used to update a cognitive persona or profile associated with a user. Those of skill in the art will realize that many such embodiments are possible. Accordingly, the foregoing is not intended to limit the spirit, scope or intent of the invention.

In various embodiments, a cognitive profile associated with a user may be either static or dynamic. As used herein, a static cognitive profile refers to a cognitive profile that contains identification information associated with a user that changes on an infrequent basis. As an example, a user's name, Social Security Number (SSN), or passport number may not change, although their age, address or employer may change over time. To continue the example, the user may likewise have a variety of financial account identifiers and various travel awards program identifiers which change infrequently.

As likewise used herein, a dynamic cognitive profile refers to a cognitive profile that contains information associated with a user that changes on a dynamic basis. For example, a user's interests and activities may evolve over time, which may be evidenced by associated interactions 950 with the CILS. In various embodiments, these interactions 950 result in the provision of various blockchain-associated cognitive insights to the user. In certain embodiments, these interactions 950 may likewise be used to perform one or more associated cognitive learning operations, the results of which may in turn be used to generate a particular blockchain-associated cognitive insight. In these embodiments, the user's interactions 950 with the CILS, and the resulting blockchain-associated cognitive insights that are generated, are used to update the dynamic cognitive profile on an ongoing basis to provide an up-to-date representation of the user in the context of the cognitive profile used to generate the blockchain-associated cognitive insights.

In various embodiments, a cognitive profile, whether static or dynamic, is selected from the repository of cognitive profiles '1' through 'n' 1774 according to a set of contextual information associated with a user. In certain embodiments, the contextual information is likewise used in combination with the selected cognitive profile to generate one or more blockchain-associated cognitive insights for the user. In various embodiments, the contextual information may likewise be used in combination with the selected cognitive profile to perform one or more associated cognitive learning operations. In one embodiment, the blockchain-associated cognitive insights that are generated as a result of using a first set of contextual information in combination with the selected cognitive profile may be different than the blockchain-associated cognitive insights that are generated as a result of using a second set of contextual information with the same cognitive profile. In another embodiment, the result of using a first set of contextual information in combination with the selected cognitive profile to perform an associated cognitive learning operation may be different than the result of using a second set of contextual information in combination with the selected cognitive profile to perform the same cognitive learning operation.

In various embodiments, one or more cognitive profiles may be associated with a user. In certain embodiments, the blockchain-associated cognitive insights that are generated for a user as a result of using a set of contextual information with a first cognitive profile may be different than the blockchain-associated cognitive insights that are generated as a result of using the same set of contextual information with a second cognitive profile. In one embodiment, the result of using a set of contextual information in combination with a first cognitive profile to perform an associated cognitive learning operation may be different than the result of using the same set of contextual information in combination with a second cognitive profile to perform the same cognitive learning operation.

As an example, a user may have two associated cognitive profiles, "runner" and "foodie," which are respectively selected according to two sets of contextual information. In this example, the "runner" cognitive profile may be selected according to a first set of contextual information associated with the user being out of town on business travel and wanting to find a convenient place to run close to where they are staying. To continue this example, the contextual information may be booking and payment information contained within a blockchain transaction associated with the user. To further continue this example, two blockchain-associated cognitive insights may be generated and provided to the user in the form of a cognitive insight summary 1248. The first may be suggesting a running trail the user has used before and liked, but needs directions to find again. The second may be suggesting a new running trail that is equally convenient, but wasn't available the last time the user was in town.

Conversely, the "foodie" cognitive profile may be selected according to a second set of contextual information associated with the user being at home and expressing an interest in trying either a new restaurant or an innovative cuisine. In furtherance of this example, the user's "foodie" cognitive profile may be processed by the CILS to determine which restaurants and cuisines the user has tried in the last eighteen months. In this example, the contextual information may be ordering and payment information contained in various blockchain transactions associated with the user. As a result, two blockchain-associated cognitive insights may be generated and provided to the user in the form of a cognitive insight summary 1248. The first may be a suggestion for a new restaurant that is serving a cuisine the user has enjoyed in the past, as well as a corresponding promotional offer in the form of a smart contract for ordering online or physical presentment through the use of a mobile device. The second may be a suggestion for a restaurant familiar to the user that includes a promotional offer, likewise in the form of a smart contract, for a seasonal menu featuring Asian fusion dishes the user has not tried before.

Those of skill in the art will realize that the blockchain-associated cognitive insights generated as a result of combining the first cognitive profile with the first set of contextual information will likely be different than the blockchain-associated cognitive insights generated as a result of combining the second cognitive profile with the second set of contextual information. Likewise, the result of a cognitive learning operation that uses the first cognitive profile in combination with the first set of contextual information will likely be different that the result of a cognitive learning operation that uses a second cognitive profile in combination with a second set of contextual information.

In various embodiments, a user's cognitive profile, whether static or dynamic, may reference data that is proprietary to the user, a group, an organization, or some combination thereof. As used herein, proprietary data broadly refers to data that is owned, controlled, or a combination thereof, by an individual user, group, or organization, which is deemed important enough that it gives competitive advantage to that individual or organization. In certain embodiments, the organization may be a governmental, non-profit, academic or social entity, a manufacturer, a wholesaler, a retailer, a service provider, an operator of a cognitive inference and learning system (CILS), and others.

In various embodiments, an organization may or may not grant a user the right to obtain a copy of certain proprietary information referenced by their cognitive profile. In certain embodiments, access to the proprietary information may be controlled through the implementation of a cognitive identity management module 1284. In various embodiments, a first organization may or may not grant a user the right to obtain a copy of certain proprietary information referenced by their cognitive profile and provide it to a second organization. As an example, the user may not be granted the right to provide travel detail information (e.g., travel dates and destinations, etc.) associated with an awards program provided by a first travel services provider (e.g., an airline, a hotel chain, a cruise ship line, etc.) to a second travel services provider. In various embodiments, the user may or may not grant a first organization the right to provide a copy of certain proprietary information referenced by their cognitive profile to a second organization. Those of skill in the art will recognize that many such embodiments are possible. Accordingly, the foregoing is not intended to limit the spirit, scope or intent of the invention.

In various embodiments, a set of contextually-related interactions between a cognitive application 304 and the application cognitive graph 1282 are represented as a corresponding set of nodes in a cognitive session graph, which is then stored in a repository of cognitive session graphs '1' through 'n' 1252. As used herein, a cognitive session graph broadly refers to a cognitive graph whose nodes are associated with a cognitive session. As used herein, a cognitive session broadly refers to a user, group of users, theme, topic, issue, question, intent, goal, objective, task, assignment, process, situation, requirement, condition, responsibility, location, period of time, a block in a blockchain, a blockchain transaction associated with a blockchain block, or any combination thereof. In various embodiments, the results of a cognitive learning operation, described in greater detail herein, may be stored in a session graph.

In certain embodiments, a cognitive session graph is used in combination with data associated with one or more blockchains to generate a blockchain-associated cognitive insight for a user. As an example, the application cognitive graph 1282 may be unaware of a particular user's preferences, which are likely stored in a corresponding user profile. To further the example, a user may typically choose a particular brand or manufacturer when shopping for a given type of product, such as cookware, thereby indicating their preferences. A record of each query regarding that brand of cookware, or its selection, is iteratively stored in a session graph that is associated with the user and stored in a repository of session graphs '1' through 'n' 1252. Continuing the example further, a blockchain-associated cognitive insight, each of which includes a promotional offer relevant to the preferred brand of cookware, is generated and provided to the user. As a result, the preference of that brand of cookware is ranked higher, and a blockchain-associated cognitive insight containing promotional offer for that brand of cookware is presented in response to the contextually-related queries, even when the preferred brand of cookware is not explicitly referenced by the user. To continue the example, the user may make a number of queries over a period of days or weeks. However, the queries, and their corresponding blockchain-associated cognitive insights, are associated with the same cognitive session graph that is associated with the user. Furthermore, the queries and their corresponding blockchain-associated cognitive insights are respectively stored in the repository of session graphs '1' through 'n' 1252 and the repository of cognitive blockchain knowledge '1' through 'n' 1278, regardless of when each query is made. In this example, the record of each query, and their corresponding blockchain-associated cognitive insight, is used to perform an associated cognitive learning operation, the results of which may be stored in an associated session graph.

As another example, a user may submit a query to a cognitive application 304 during business hours to find an upscale restaurant located close their place of business. As a result, a first cognitive session graph stored in a repository of cognitive session graphs '1' through 'n' 1252 is associated with the user's query, which results in the provision of blockchain-associated cognitive insights related to restaurants suitable for business meetings. To continue the example, the same user queries the same cognitive application 304 during the weekend to locate a casual restaurant located close to their home. As a result, a second cognitive session graph stored in a repository of cognitive session graphs '1' through 'n' 1252 is associated with the user's query, which results in the provision of blockchain-associated cognitive insights related to restaurants suitable for family meals. In these examples, the first and second cognitive session graphs are both associated with the same user, but for two different purposes, which results in the provision of two different sets of blockchain-associated cognitive insights.

As yet another example, a group of customer support representatives is tasked with resolving technical issues customers may have with a product. In this example, the product and the group of customer support representatives are collectively associated with a cognitive session graph stored in a repository of cognitive session graphs '1' through 'n' 1252. To continue the example, individual customer support representatives may submit queries related to the product to a cognitive application 304, such as a knowledge base application. In response, a cognitive session graph stored in a repository of cognitive session graphs '1' through 'n' 1252 is used, along with cognitive blockchain knowledge repositories '1' through 'n' 1278, the universal knowledge repository 1280, and application cognitive graph 1282, to generate individual blockchain-associated or composite cognitive insights to resolve a technical issue for a customer. In this example, the cognitive application 304 may be queried by the individual customer support representatives at different times during some time interval, yet the same cognitive session graph stored in a repository of cognitive session graphs '1' through 'n' 1252 is used to generate blockchain-associated cognitive insights related to the product. To continue the example, the blockchain-associated cognitive insight may contain computer-executable code to deliver a problem resolution message to a particular customer.

In various embodiments, each cognitive session graph associated with a user, and stored in a repository of cognitive session graphs '1' through 'n' 1252, includes one or more direct or indirect user queries represented as nodes, and the time at which they were asked, which are in turn linked 1254 to nodes that appear in the application cognitive graph 1282. In certain embodiments, each individual cognitive session graph that is associated with the user and stored in a repository of cognitive session graphs '1' through 'n' 1252 introduces edges that are not already present in the application cognitive graph 1282. More specifically, each of the cognitive session graphs that is associated with the user and stored in a repository of cognitive session graphs '1' through 'n' 1252 establishes various relationships that the application cognitive graph 1282 does not already have.

In various embodiments, individual cognitive profiles in the repository of cognitive profiles '1' through 'n' 1274 are respectively stored as session graphs in the repository of session graphs 1252. In these embodiments, nodes within each of the individual cognitive profiles are linked 1254 to nodes within corresponding cognitive session graphs stored in the repository of cognitive session graphs '1' through 'n' 1254. In certain embodiments, individual nodes within each of the cognitive profiles are likewise linked 1254 to corresponding nodes within various cognitive personas stored in the repository of cognitive personas '1' through 'n' 1272.

In various embodiments, individual graph queries 1244 associated with a session graph stored in a repository of cognitive session graphs '1' through 'n' 1252 are likewise provided to insight agents to perform various kinds of analyses. In certain embodiments, each insight agent performs a different kind of analysis. In various embodiments, different insight agents may perform the same, or similar, analyses. In certain embodiments, different agents performing the same or similar analyses may be competing between themselves.

For example, a user may be a realtor that has a young, upper middle-class, urban-oriented clientele that typically enjoys eating at trendy restaurants that are in walking distance of where they live. As a result, the realtor may be interested in knowing about new or popular restaurants that are in walking distance of their property listings that have a young, middle-class clientele. In this example, the user's queries may result the assignment of insight agents to perform analysis of various social media interactions to identify such restaurants that have received favorable reviews. To continue the example, the resulting blockchain-associated insights may be provided as a ranked list of candidate restaurants, with associated promotional offers in the form of smart contracts, that may be suitable venues for the realtor to meet his clients.

In various embodiments, the process 1208 component is implemented to provide these blockchain-associated cognitive insights to the deliver 1211 component, which in turn is implemented to deliver the blockchain-associated cognitive insights in the form of a cognitive insight summary 1248 to the cognitive business processes and applications 304. In these embodiments, the cognitive platform 1210 is implemented to interact with an insight front-end 1256 component, which provides a composite insight and feedback interface with the cognitive application 304. In certain embodiments, the insight front-end 1256 component includes an insight Application Program Interface (API) 1258 and a feedback API 1260, described in greater detail herein. In these embodiments, the insight API 1258 is implemented to convey the cognitive insight summary 1248 to the cognitive application 304. Likewise, the feedback API 1260 is used to convey associated direct or indirect user feedback 1262 to the cognitive platform 1210. In certain embodiments, the feedback API 1260 provides the direct or indirect user feedback 1262 to the repository of models 1228 described in greater detail herein.

To continue the preceding example, the user may have received a list of candidate restaurants that may be suitable venues for meeting his clients. However, one of his clients has a pet that they like to take with them wherever they go. As a result, the user provides feedback 1262 that he is looking for a restaurant that is pet-friendly. The provided feedback 1262 is in turn provided to the insight agents to identify candidate restaurants that are also pet-friendly. In this example, the feedback 1262 is stored in the appropriate cognitive session graph 1252 associated with the user and their original query.

In various embodiments, as described in the descriptive text associated with FIGS. 5, 10, 11*a* and 11*b*, cognitive learning operations are iteratively performed during the learn 1238 phase to provide more accurate and useful blockchain-associated cognitive insights. In certain of these embodiments, feedback 1262 received from the user is stored in a session graph that is associated with the user and stored in a repository of session graphs '1' through 'n' 1252, which is then used to provide more accurate blockchain-associated cognitive insights in response to subsequent contextually-relevant queries from the user. In various embodiments, the feedback 1262 received from the user is used to perform cognitive learning operations, the results of which are then stored in a session graph that is associated with the user. In these embodiments, the session graph associated with the user is stored in a repository of session graphs '1' through 'n' 1252.

As an example, blockchain-associated cognitive insights provided by a particular insight agent related to a first subject may not be relevant or particularly useful to a user of a cognitive application 304. As a result, the user provides feedback 1262 to that effect, which in turn is stored in the appropriate session graph that is associated with the user and stored in a repository of session graphs '1' through 'n' 1252. Accordingly, subsequent blockchain-associated cognitive insights provided by the insight agent related the first subject may be ranked lower, or not provided, within a cognitive insight summary 1248 provided to the user. Conversely, the same insight agent may provide excellent blockchain-associated cognitive insights related to a second subject, resulting in positive feedback 1262 being received from the user. The positive feedback 1262 is likewise stored in the appropriate session graph that is associated with the user and stored in a repository of session graphs '1' through 'n' 1252. As a result, subsequent blockchain-associated cognitive insights provided by the insight agent related to the second subject may be ranked higher within a cognitive insight summary 1248 provided to the user.

In various embodiments, the blockchain-associated cognitive insights provided in each cognitive insight summary 1248 to the cognitive application 304, and corresponding feedback 1262 received from a user in return, is provided to an associated session graph 1252 in the form of one or more insight streams 1264. In these and other embodiments, the insight streams 1264 may contain information related to the user of the cognitive application 304, the time and date of the provided blockchain-associated cognitive insights and related feedback 1262, the location of the user, and the device used by the user.

As an example, a query related to upcoming activities that is received at 10:00 AM on a Saturday morning from a user's home may return blockchain-associated cognitive insights related to entertainment performances scheduled for the weekend. Conversely, the same query received at the same time on a Monday morning from a user's office may return blockchain-associated cognitive insights related to business functions scheduled during the work week. In various embodiments, the information contained in the insight streams 1264 is used to rank the blockchain-associated cognitive insights provided in the cognitive insight summary 1248. In certain embodiments, the blockchain-associated cognitive insights are continually re-ranked as additional insight streams 1264 are received. Skilled practitioners of the art will recognize that many such embodiments are possible. Accordingly, the foregoing is not intended to limit the spirit, scope or intent of the invention.

Although the present invention has been described in detail, it should be understood that various changes, substitutions and alterations can be made hereto without departing from the spirit and scope of the invention as defined by the appended claims.

What is claimed is:

1. A cognitive information processing system comprising:
   a processor;
   a data bus coupled to the processor; and
   a non-transitory, computer-readable storage medium embodying computer program code, the non-transitory, computer-readable storage medium being coupled to the data bus, the computer program code interacting with a plurality of computer operations and comprising instructions executable by the processor and configured for:
   receiving data from a plurality of data sources, the plurality of data sources comprising a blockchain data source, the blockchain data source providing blockchain data;
   processing the blockchain data to generate a plurality of knowledge elements, the processing being performed via a cognitive inference and learning system, the cognitive inference and learning system executing on a hardware processor of an information processing system and interacting with the plurality of data sources, the cognitive inference and learning system comprising a cognitive platform, the cognitive platform comprising
   a cognitive graph, the cognitive graph being derived from the plurality of data sources, the cognitive graph comprising an application cognitive graph, the application cognitive graph comprising a cognitive graph associated with a cognitive application, interactions between the cognitive application and the application cognitive graph being represented as a set of nodes in the cognitive graph, and,
   a cognitive engine, the cognitive engine comprising a dataset engine, a graph query engine and an insight/learning engine;
   performing a cognitive operation via the cognitive inference and learning system using the blockchain data, the cognitive learning operation implementing a cognitive learning technique according to a cognitive learning framework, the cognitive learning framework comprising a plurality of cognitive learning styles and a plurality of cognitive learning categories, each of the plurality of cognitive learning styles comprising a generalized learning approach implemented by the cognitive inference and learning system to perform the cognitive learning operation, each of the plurality of cognitive learning categories referring to a source of information used by the cognitive inference and learning system when performing the cognitive learning operation, an individual cognitive learning technique being associated with a primary cognitive learning style and bounded by an associated primary cognitive learning category, the cognitive learning operation applying the cognitive learning technique via a machine learning algorithm to generate a cognitive learning result;
   processing the blockchain data to generate cognitive blockchain data;
   updating a knowledge model using the cognitive learning result, the updating being performed via the cognitive platform of the cognitive inference and learning system;
   storing the plurality of knowledge elements and the cognitive blockchain data within the cognitive graph; and,
   processing the plurality of knowledge elements to generate a cognitive insight associated with a compliance requirement.

2. The cognitive information processing system of claim 1, wherein:
   the compliance requirement is related to at least one of a governance compliance requirement, a regulatory compliance requirement and an anti-fraud compliance requirement.

3. The cognitive information processing system of claim 2, wherein the instructions are further configured for:
   generating a cognitive session graph, the cognitive session graph being associated with a session, the cognitive session graph comprising at least some enriched data; and,
   associating a cognitive blockchain with the cognitive session graph.

4. The cognitive information processing system of claim 3, wherein the instructions are further configured for:
   using the block chain data to establish an identity of an entity; and,
   validating legitimacy of a blockchain transaction based upon the identity of the entity.

5. The cognitive information processing system of claim 4, wherein the instructions are further configured for:
   validating veracity of a blockchain transaction based upon at least some of the knowledge elements and at least some of the cognitive blockchain data.

6. The cognitive information processing system of claim 1, wherein:

the cognitive insight associated with the compliance requirement enables a user to perform a single step compliance operation, the single step compliance operation allowing the user to assure compliance via a single interaction with a cognitive inference and learning system (CILS);

the single step compliance operation is tailored to a specific industry; and, the single interaction with the cognitive inference and learning system generates an industry specific insight.

7. A non-transitory, computer-readable storage medium embodying computer program code, the computer program code comprising computer executable instructions configured for:

receiving data from a plurality of data sources, the plurality of data sources comprising a blockchain data source, the blockchain data source providing blockchain data;

processing the blockchain data to generate a plurality of knowledge elements, the processing being performed via a cognitive inference and learning system, the cognitive inference and learning system executing on a hardware processor of an information processing system and interacting with the plurality of data sources, the cognitive inference and learning system comprising a cognitive engine, the cognitive engine comprising a cognitive platform, the cognitive platform comprising a cognitive graph, the cognitive graph being derived from the plurality of data sources, the cognitive graph comprising an application cognitive graph, the application cognitive graph comprising a cognitive graph associated with a cognitive application, interactions between the cognitive application and the application cognitive graph being represented as a set of nodes in the cognitive graph, and a dataset engine, a graph query engine and an insight/learning engine;

performing a cognitive learning operation via the cognitive inference and learning system using the blockchain data, the cognitive learning operation implementing a cognitive learning technique according to a cognitive learning framework, the cognitive learning framework comprising a plurality of cognitive learning styles and a plurality of cognitive learning categories, each of the plurality of cognitive learning styles comprising a generalized learning approach implemented by the cognitive inference and learning system to perform the cognitive learning operation, each of the plurality of cognitive learning categories referring to a source of information used by the cognitive inference and learning system when performing the cognitive learning operation, an individual cognitive learning technique being associated with a primary cognitive learning style and bounded by an associated primary cognitive learning category, the cognitive learning operation applying the cognitive learning technique via a machine learning algorithm to generate a cognitive learning result;

processing the blockchain data to generate cognitive blockchain data;

updating a knowledge model using the cognitive learning result, the updating being performed via the cognitive platform of the cognitive inference and learning system;

storing the plurality of knowledge elements and the cognitive blockchain data within the cognitive graph; and, processing the plurality of knowledge elements to generate a cognitive insight associated with a compliance requirement.

8. The non-transitory, computer-readable storage medium of claim 7, wherein the instructions are further configured for:

the compliance requirement is related to at least one of a governance compliance requirement, a regulatory compliance requirement and an anti-fraud compliance requirement.

9. The non-transitory, computer-readable storage medium of claim 8, wherein the instructions are further configured for:

generating a cognitive session graph, the cognitive session graph being associated with a session, the cognitive session graph comprising at least some enriched data; and, associating a cognitive blockchain with the cognitive session graph.

10. The non-transitory, computer-readable storage medium of claim 9, wherein the instructions are further configured for:

using the block chain data to establish an identity of an entity; and, validating legitimacy of a blockchain transaction based upon the identity of the entity.

11. The non-transitory, computer-readable storage medium of claim 10, wherein the instructions are further configured for:

validating veracity of a blockchain transaction based upon at least some of the knowledge elements and at least some of the cognitive blockchain data.

12. The non-transitory, computer-readable storage medium of claim 11, wherein:

the cognitive insight associated with the compliance requirement enables a user to perform a single step compliance operation, the single step compliance operation allowing the user to assure compliance via a single interaction with a cognitive inference and learning system (CILS);

the single step compliance operation is tailored to a specific industry; and, the single interaction with the cognitive inference and learning system generates an industry specific insight.

* * * * *